(12) United States Patent
Tang et al.

(10) Patent No.: US 12,430,328 B1
(45) Date of Patent: Sep. 30, 2025

(54) GENERATION OF SYNTHETIC DATA FOR QUERY GENERATION

(71) Applicant: Microsoft Technology Licensing, LLC, Redmond, WA (US)

(72) Inventors: Xinye Tang, Issaquah, WA (US); Mahan Das, San Jose, CA (US); Ye Xing, Wellesley, MA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 18/622,170

(22) Filed: Mar. 29, 2024

(51) Int. Cl.
| | |
|---|---|
| G06F 7/00 | (2006.01) |
| G06F 16/23 | (2019.01) |
| G06F 16/242 | (2019.01) |
| G06N 3/0895 | (2023.01) |

(52) U.S. Cl.
CPC ........ G06F 16/243 (2019.01); G06F 16/2365 (2019.01); G06N 3/0895 (2023.01)

(58) Field of Classification Search
CPC .......... G06F 16/3344; G06F 16/24564; G06F 16/24522; G06F 16/2425; G06F 16/243; G06F 16/248; G06F 16/9024; G06F 16/90335; G06F 16/8365; G06F 16/835; G06N 20/00; G06N 5/04; G06N 3/082; G06N 3/04; G06N 3/045; G06N 3/044
See application file for complete search history.

(56) References Cited

U.S. PATENT DOCUMENTS

| | | | |
|---|---|---|---|
| 2020/0410011 A1* | 12/2020 | Shi | G06F 16/90332 |
| 2021/0191925 A1* | 6/2021 | Sianez | G06N 20/00 |
| 2022/0058191 A1* | 2/2022 | Chen | G06F 16/3344 |
| 2023/0196033 A1* | 6/2023 | Robert Jose | G06F 40/30 |
| | | | 704/9 |
| 2024/0135232 A1* | 4/2024 | Betteridge | G06N 20/00 |

FOREIGN PATENT DOCUMENTS

WO 2023223044 A1 11/2023

OTHER PUBLICATIONS

U.S. Appl. No. 19/042,852, filed Jan. 31, 2025.
U.S. Appl. No. 18/622,336, filed Mar. 29, 2024.
Shorten, et al., "Querying Databases with Function Calling", arXiv:2502.00032v1, Jan. 23, 2025, 23 Pages.
International Search Report and Written Opinion received for PCT Application No. PCT/US2025/014392, May 12, 2025, 22 pages.

* cited by examiner

*Primary Examiner* — Mohammad A Sana
(74) *Attorney, Agent, or Firm* — Weaver IP L.L.C.

(57) ABSTRACT

Systems, methods, devices, and computer readable storage media described herein provide techniques for generating synthetic data for use in query generation. In an aspect, a pair comprising a natural language (NL) query and a query language (QL) query and predicted catalog information are used to prompt a large language model (LLM) to generate an augmented pair that is a variation of the pair. Synthetic data is generated comprising the augmented pair. In another aspect, an indication of feedback for a QL query generated by a LLM is received and a corrected pair is generated based on the indication and a corresponding NL query, the corrected pair comprises a corrected QL query and the NL query. The corrected QL query is a syntactically valid conversion of the NL query. The corrected pair is determined to satisfy criteria of a data store and is stored as synthetic data of the data store.

20 Claims, 13 Drawing Sheets

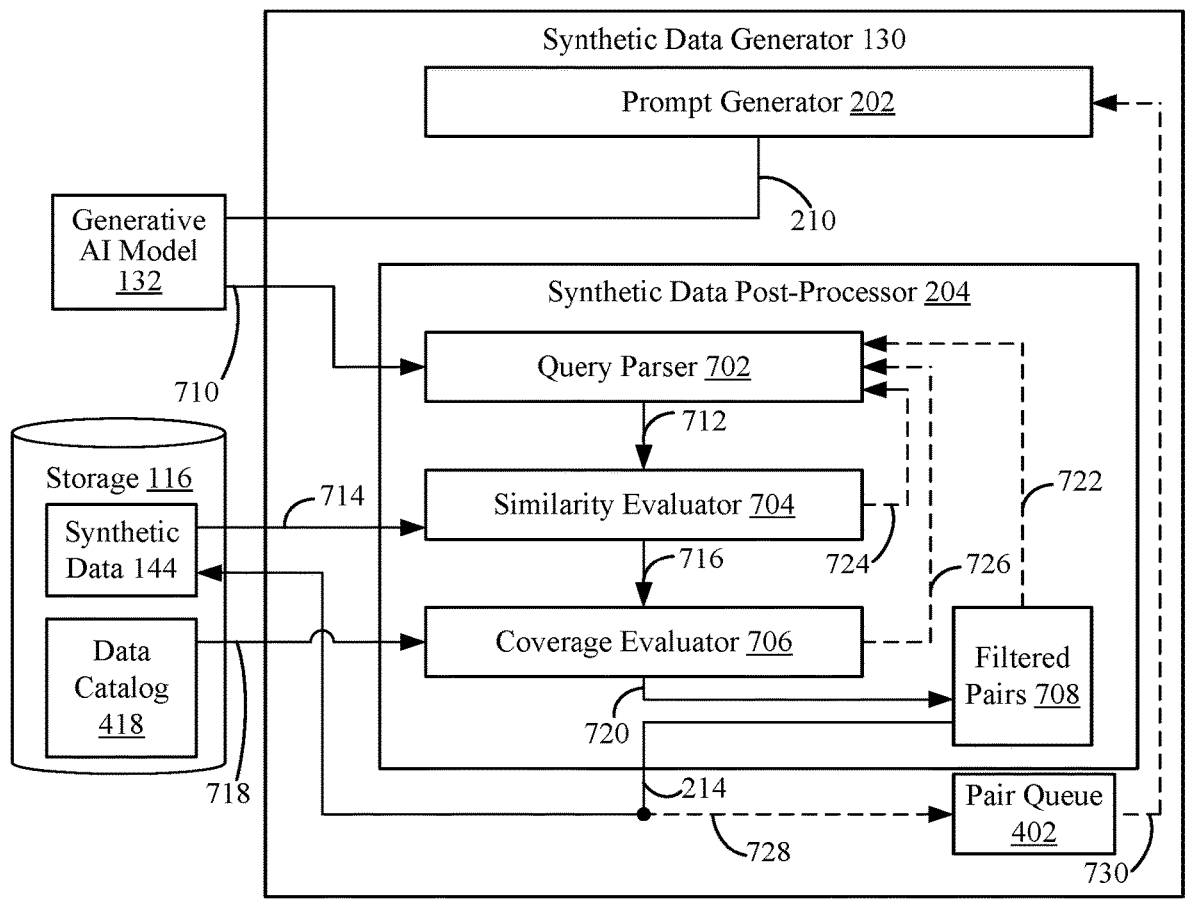

802 Provide the first prompt to the LLM to cause the LLM to generate a set of augmented pairs comprising the first augmented pair and a second augmented pair, the second augmented pair comprising a second augmented natural language query and a second augmented query language query, the second augmented natural language query another variation of the first natural language query and the second augmented query language query another variation of the first query language query 804 Filter the second augmented pair from the set of augmented pairs to generate a set of filtered pairs 806 Generate the synthetic data comprising the set of filtered pairs

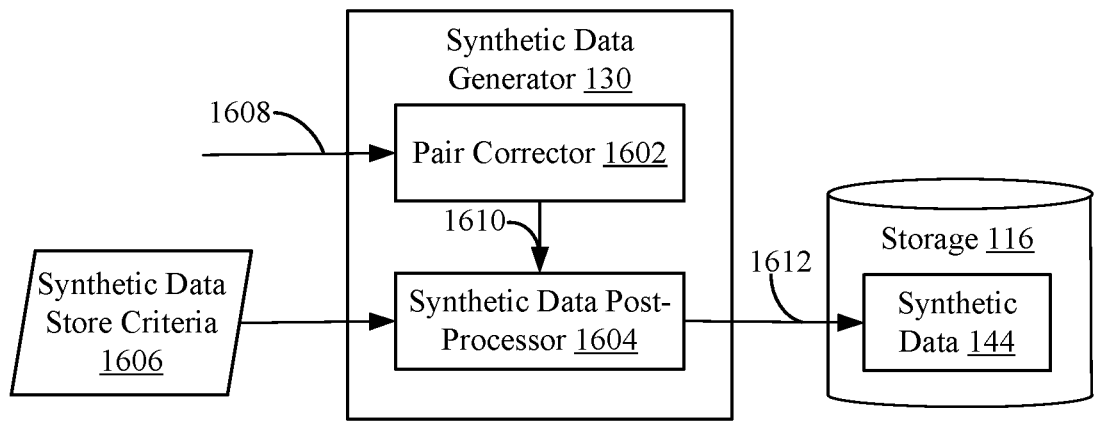

1702 Receive an indication of negative feedback for a first query language query generated by a large language model (LLM) based on a first natural language query 1704 Generate a corrected pair based on the indication and the first natural language query, the corrected pair comprising the first natural language query and a corrected query language query, the corrected query language query a syntactically valid conversion of the first natural language query 1706 Determine the corrected pair satisfies criteria of a synthetic data store 1708 Store the corrected pair as synthetic data in the synthetic data store

| Determine the first natural language query is eligible to be converted based on at least one of a permission of a user account or an available table in a database | 2202 |

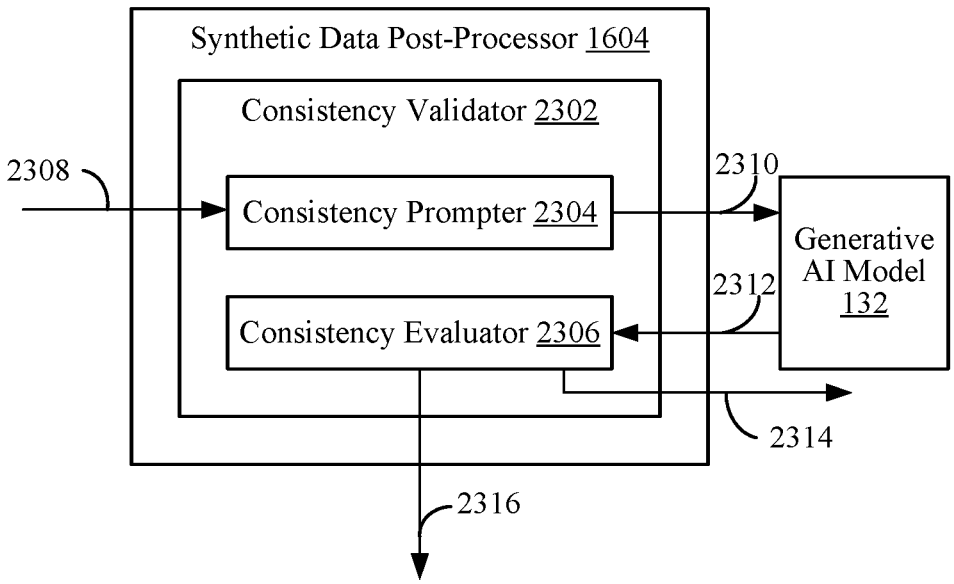

| Generate a prompt to cause the LLM to generate a candidate natural language query based on the corrected query language query | 2402 |

| Determine a similarity between the first natural language query and the candidate natural language query satisfies a consistency criteria | 2404 |

FIG. 24

GENERATION OF SYNTHETIC DATA FOR QUERY GENERATION

BACKGROUND

Queries made in a query language can be used for performing database operations such as retrieving and/or transforming records within a database. A query language query relies on two sources of knowledge: knowledge of the language and knowledge of the database. A system for generating queries in the query language may have parametric knowledge of the language. For instance, a system utilizes a generative AI model trained on a large corpus of information to generate a query language query. The large corpus of information may or may not be specialized to the knowledge of the database.

Generative AI models may experience "hallucination" where the generative AI model generates incorrect or misleading results. Some implementations of query language generation implement pre-processing and post-processing techniques to validate and/or repair queries generated by generative AI models.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments are described herein for generation of synthetic data used in generation of query language (QL) queries. For example, in an aspect of the present disclosure, a dataset pair comprising a natural language (NL) query and a query language query is obtained. The dataset pair and predicted catalog information are used to generate a prompt to cause a generative artificial intelligence (AI) model, such as a large language model (LLM), to generate a variation of the dataset pair. Responsive to providing the prompt to the LLM, an augmented pair is received. The augmented pair comprises an augmented NL query and an augmented QL query. The augmented NL query is a variation of the NL query and the augmented QL query is a variation of the QL query. In this aspect, synthetic data comprising the augmented pair is generated.

In a further embodiment of this first aspect, catalog information is predicted based on a similarity between dataset pairs (or embeddings of dataset pairs) and portions of a database (or embeddings of the portions).

In a further embodiment of this first aspect, generation of augmented pairs is iteratively performed to generate multiple augmented pairs.

In another aspect of the present disclosure, an indication of negative feedback for a QL query generated by a generative AI model based on a NL query is received. A corrected pair is generated based on the indication and the NL query. The corrected pair comprises the NL query and a corrected QL query. The corrected QL query is a syntactically valid conversion of the NL query. A determination of whether the corrected pair satisfies criteria of a synthetic data store is made. If the corrected pair satisfies the criteria, the corrected pair is stored as synthetic data in the synthetic data store.

In a further embodiment of this second aspect, the corrected pair is generated based on session telemetry.

In a further embodiment of this second aspect, the corrected pair is generated utilizing a generative AI model.

In a further embodiment of this second aspect, the corrected pair is generated through iterative utilization of the generative AI model.

In a further embodiment of either aspect, a syntax of, a similarity to existing pairs of, a coverage of a database by, and/or a consistency of conversion of the augmented pair or the corrected pair is evaluated.

In a further embodiment of either aspect, a language conversion engine is caused to generate a prompt based on a natural language input and an augmented pair and/or a corrected pair. The prompt is provided to a generative AI model to cause the generative AI model to generate a QL query.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

FIG. 7 shows a block diagram of a system for generating synthetic data, in accordance with another example embodiment.

FIG. 8 shows a flowchart of a process for generating synthetic data, in accordance with another example embodiment.

FIG. 16 shows a block diagram of a system for generating synthetic data, in accordance with an example embodiment.

FIG. 17 shows a flowchart of a process for generating synthetic data, in accordance with an example embodiment.

FIG. 22 shows a flowchart of a process for determining eligibility of a query, in accordance with another example embodiment.

FIG. 23 shows a block diagram of a system for evaluating a consistency of a corrected pair, in accordance with an example embodiment.

FIG. 24 shows a flowchart of a process for evaluating a consistency of a corrected pair, in accordance with an example embodiment.

Figure 1:
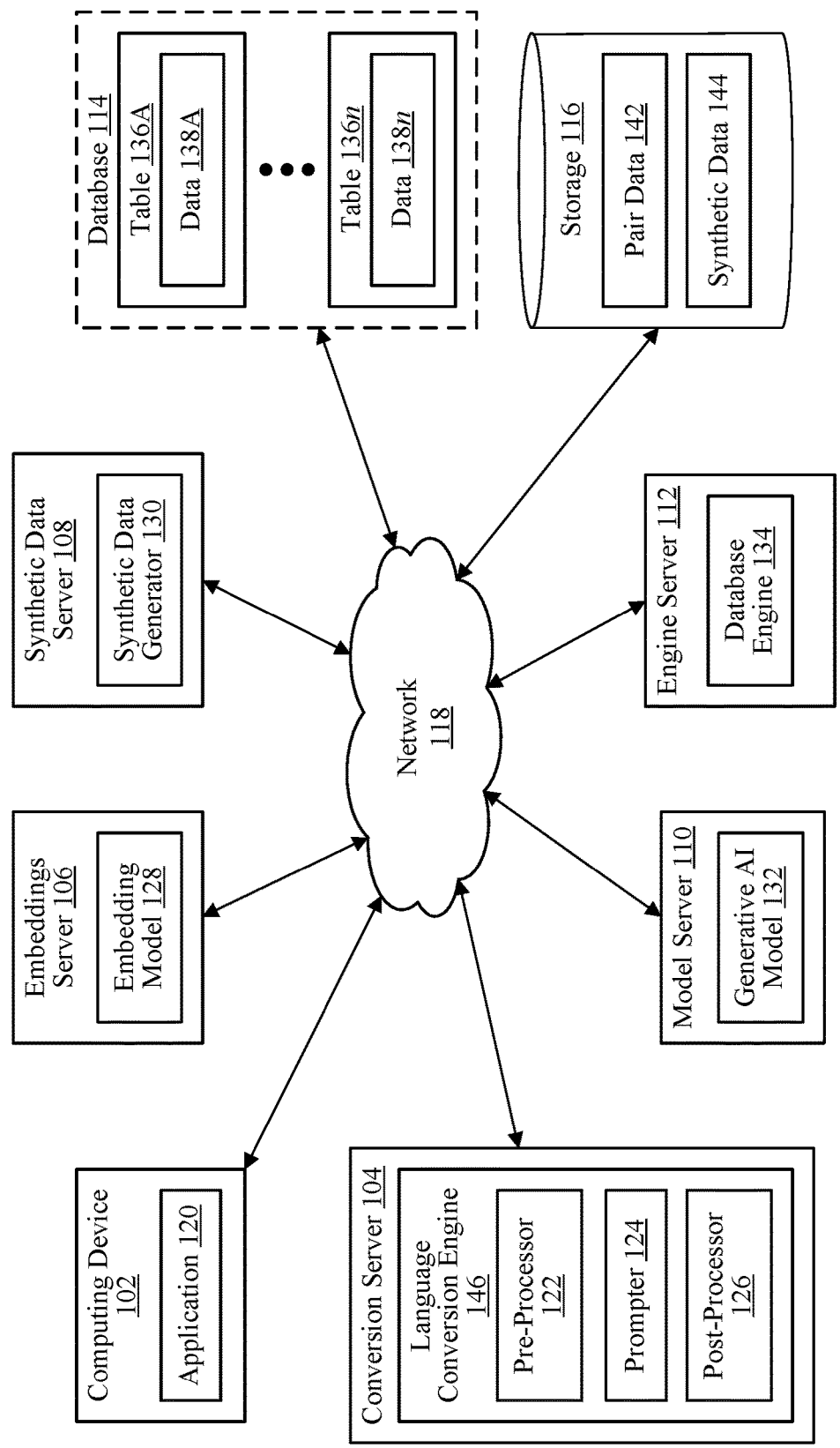
FIG. 1 shows a block diagram of a system for query generation, in accordance with an example embodiment.

The subject matter of the present application will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Embodiments for Query Generation

Embodiments of the present disclosure relate to generation of queries, e.g., query language queries (e.g., Kusto Query Language (KQL) queries, structured query language (SQL) queries, etc.). A query language query (also referred to as a "QL query" herein) is used to perform database operations, such as, but not limited to, retrieving and/or transforming records in a database. For instance, an application (or a user utilizing an application or computing device) may provide a QL query to be executed against a database to retrieve and manipulate data in the database. In accordance with an embodiment, a QL query relies on knowledge of the query language and knowledge of the database being queried. In some implementations of query generation, a natural language to query language engine (also referred to as a "language conversion engine" herein) is utilized to facilitate generation of QL queries to execute against a database. For instance, a user or application provides a query in natural language (i.e., language of ordinary speaking and/or writing) to the language conversion engine. The language conversion engine converts the provided query (also referred to as a "natural language query" or "NL query" herein) to a QL query suitable for execution against a database. In this manner, the language conversion engine simplifies interaction between a user or application desiring to access or manipulate data in a database and the database.

In some implementations of QL query generation, a generative artificial intelligence (AI) model is leveraged to generate a QL query. A generative AI model is a model that generates content that is complex, coherent, and/or original. For instance, a generative AI model can create sophisticated sentences, lists, ranges, tables of data, images, essays, and/or the like. An example of a generative AI model is a language model. For instance, a large language model (LLM) is leveraged by some embodiments described herein. An LLM is a language model that has a high number of model parameters (e.g., weights and biases the model learns during training). An LLM is (pre-) trained using self-supervised learning and/or semi-supervised learning. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks). Additional details regarding transformer-based LLMs (and generative AI models in general) are described with respect to FIG. 28, as well as elsewhere herein.

Techniques leveraging a generative AI model may experience "hallucination" where the generative AI model generates incorrect or misleading results. Furthermore, a generative AI model may generate a QL query that is syntactically valid, but fails to satisfy a user's or calling application's expectation(s). In particular, some implementations of generative AI models may have difficulty generating a QL query if labeled data is scarce (e.g., when dealing with new data sources or customer queries, also referred to as a "cold start"). Some implementations of language conversion engines utilizing generative AI models to generate QL queries utilize synthetic data (also referred to as "few-shots") to augment the prompting process. However, existing synthetic data may not align with a database subject to a user's query. Even if the synthetic data does align with the database, the amount of synthetic data that aligns with a user's query may be limited.

In an aspect of the present disclosure, methods, systems, and computer readable storage medium described herein provide techniques for generating synthetic data that aligns with user queries in an efficient matter. For example, in an embodiment, a dataset pair comprising a NL query and a QL query is obtained. The dataset pair and predicted catalog information are used to generate a prompt to cause a generative AI model, such as an LLM, to generate a variation of the dataset pair. Predicted catalog information comprises descriptions of a database, data stored therein, and/or structure and/or groupings of the stored data that are similar to (e.g., semantically similar to) the dataset pair. Responsive to providing the prompt to the LLM, an augmented pair is received. The augmented pair comprises an augmented NL query and an augmented QL query. The augmented NL query is a variation of the NL query and the augmented QL query is a variation of the QL query. In this aspect, synthetic data comprising the augmented pair is generated.

In another aspect of the present disclosure, methods, systems, and computer readable storage medium described herein provide techniques for generating synthetic data that aligns with user queries based on user feedback. For instance, in an embodiment, an indication of negative feedback for a QL query generated by a generative AI model based on a NL query is received. A corrected pair is generated based on the indication and the NL query. The corrected pair comprises the NL query and a corrected QL query. The corrected QL query is a syntactically valid conversion of the NL query. The corrected pair may be generated in various ways. For instance, in some implementations the corrected pair is generated based on a QL query that was executed against a database. In other implementations, the corrected pair is generated by prompting a generative AI model. In either case, a determination of whether the corrected pair satisfies criteria of a synthetic data store is made. If the corrected pair satisfies the criteria, the corrected pair is stored as synthetic data in the synthetic data store.

Systems, devices, and apparatuses may be configured in various ways for generating synthetic data and/or generating QL queries based on natural language. For example, FIG. 1 shows a block diagram of a system 100 for query generation, in accordance with an example embodiment. System 100 comprises a computing device 102, a conversion server 104, an embeddings server 106, synthetic data server 108, a model server 110, an engine server 112, a database 114 and a storage 116. Computing device 102, conversion server 104, embeddings server 106, synthetic data server 108, model server 110, engine server 112, database 114, and storage 116 are communicatively coupled via a network 118. In examples, network 118 comprises one or more networks such as local area networks (LANs), wide area networks (WANs), enterprise networks, the Internet, etc. In examples, network 118 comprises one or more wired and/or wireless portions. The features of system 100 are described in detail as follows.

Database 114 is configured to store data. Examples of database 114 include, but are not limited to unstructured databases (e.g., binary large object (blob) storages), structured databases (e.g., SQL databases), and semi-structured database. In implementations, database 114 includes any amount of data organized in various ways. For instance, as shown in FIG. 1, database 114 comprises tables 136A-136n storing respective sets of data 138A-138n. Each table of tables 136A-136n comprise one or more columns in which respective data of data 138A-138n is organized. In accordance with an embodiment, tables of tables 136A-136n are grouped into "clusters" (not shown in FIG. 1 for brevity). In accordance with an embodiment, database 114 implemented as a cloud-based storage (e.g., cloud-based data lake storage, cloud-based file system, cloud-based database, etc.). In this context, database 114 is stored by one or more servers in a networked-server infrastructure (not shown in FIG. 1 for brevity).

Storage 116 stores data used by and/or generated by computing device 102, conversion server 104, embeddings server 106, synthetic data server 108, model server 110, engine server 112, and/or components thereof and/or services executing thereon. For instance, as shown in FIG. 1, storage 116 stores pair data 142 and synthetic data 144. Pair data 142 stores dataset pairs of NL queries and QL queries. For instance, a dataset pair of pair data 142 represents a conversion of a NL query to a QL query. In examples, dataset pairs are obtained from manually generated pairs, evaluations of executed QL queries, analyst surveys, user feedback, and/or any other suitable source for mapping a natural language input to a QL query. Synthetic data 144 represents synthetic data generated by synthetic data server 108 (or a service executed thereby), as described elsewhere herein. In examples, synthetic data 144 comprises synthetic pairs of NL and QL queries. In this context, a synthetic pair is a pair generated by synthetic data server 108 (or a service executed thereby), as described elsewhere herein. In accordance with an embodiment, all or a portion of synthetic data 144 is a sub-set of pair data 142.

As shown in FIG. 1, storage 116 is external to computing device 102, conversion server 104, embeddings server 106, synthetic data server 108, model server 110, engine server 112, and database 114. In an alternative example embodiment, all or a portion of storage 116 is internal to computing device 102, conversion server 104, embeddings server 106, synthetic data server 108, model server 110, engine server 112, and/or database 114. In accordance with an embodiment, storage 116 is a remote storage accessible over network 118 (e.g., a web storage, a blob storage, a networked file system, a cloud storage, etc.).

In examples, computing device 102 is any type of stationary or mobile processing device, including, but not limited to, a desktop computer, a server, a mobile or handheld device (e.g., a tablet, a personal data assistant (PDA), a smart phone, a laptop, etc.), an Internet-of-Things (IoT) device, etc. In accordance with an embodiment, computing device 102 is associated with a user (e.g., an individual user, a group of users, an organization, a family user, a customer user, an employee user, an admin user (e.g., a service team user, a developer user, a management user, etc.), etc.). Computing device 102 is configured to execute an application 120. In accordance with an embodiment, application 120 enables a user to interface with conversion server 104, embeddings server 106, synthetic data server 108, model server 110, engine server 112, database 114, and/or storage 116.

Conversion server 104, embeddings server 106, synthetic data server 108, model server 110, and engine server 112 are network-accessible servers (or other types of computing devices). In accordance with an embodiment, one or more of conversion server 104, embeddings server 106, synthetic data server 108, model server 110, and engine server 112 are incorporated in a network-accessible server set (e.g., a cloud-based environment, an enterprise network server set, and/or the like). Furthermore, as shown in FIG. 1, each of conversion server 104, embeddings server 106, synthetic data server 108, model server 110, and engine server 112 are a single server or other computing device. In an alternative example embodiment, any of conversion server 104, embeddings server 106, synthetic data server 108, model server 110, and engine server 112 are implemented across multiple servers or computing devices (e.g., as a distributed service). Each of conversion server 104, embeddings server 106, synthetic data server 108, model server 110, and engine server 112 are configured to execute services and/or store data. For instance, as shown in FIG. 1, conversion server 104 is configured to execute a language conversion engine 146 and an embedding model interface 140, embeddings server 106 is configured to execute an embeddings model 128, synthetic data server 108 is configured to execute a synthetic data generator 130, model server 110 is configured to execute a generative AI model 132, and engine server 112 is configured to execute a database engine 134. In accordance with an embodiment, application 120 interfaces with language conversion engine 146, embedding model 128, generative AI model 132, and/or database engine 134 over network 118.

Application 120 comprises an application configured to utilize language conversion engine 146 to generate a QL query, utilize embedding model 128 to generate embeddings, utilize synthetic data generator 130 to generate synthetic data, and/or cause the execution of QL queries against database 114 (e.g., utilizing database engine 134). For example, application 110 in accordance with an embodiment is a developer or admin application for generating synthetic data to be utilized in QL query generation. For instance, an example of such an embodiment of application 120 causes synthetic data generator 130 to generate synthetic data 144.

In other examples, application 120 is an application for analyzing cyberthreats, benchmark testing data, analyzing customer data, and/or any other type of application suitable for causing queries to be executed against database 114. In this context, an embodiment of such an application 120 sends a request to query a database to language conversion engine 146 to cause generation of a QL query. In accordance with an embodiment, the request comprises a NL query. In examples, an NL query takes form of a question, a request, or some other form of natural language input that causes language conversion engine 146 to generate a QL query, as described elsewhere herein. In accordance with an embodiment, application 120 receives QL queries generated by language conversion engine 146 and transmits them to database engine 134 for execution thereof. Alternatively, QL queries generated by language conversion engine 146 are provided to database engine 134 automatically.

In other examples (or in examples wherein application 120 is utilized to send requests to generate QL queries), application 120 is an application for generating feedback for a QL query generated by language conversion engine 146. In this context, an embodiment of application 120 provides the feedback to synthetic data generator 130 for generation of synthetic data based on the feedback, as described elsewhere herein.

Embedding model 128 is a model configured to generate embeddings for use in machine learning. The embeddings generated by embedding model 128 are information dense representations of semantic meaning of an input (e.g., a piece of text). For instance, in accordance with an embodiment, an embedding is a vector of floating-point numbers such that the distance between two embeddings in vector space is correlated with semantic similarity between two inputs in their original format (e.g., text format). As an example, if two texts are similar, their vector representations should also be similar. In this manner, embeddings generated by embedding model 128 provide representation of data usable by systems described herein for performing various functions associated with data represented by embeddings. For instance, synthetic data generator 130 in accordance with an embodiment utilizes embeddings to predict catalog information (e.g., as described with respect to FIGS. 4-6, as well as elsewhere herein).

Synthetic data generator 130 is configured to generate synthetic data. In accordance with an embodiment, synthetic data generator 130 generates synthetic data in response to a request for synthetic data from language conversion engine 146. In accordance with another embodiment, synthetic data generator 130 generates synthetic data when invoked by an application of a developer of synthetic data generator 130, language conversion engine 146, and/or database 114. In accordance with another embodiment, synthetic data generator 130 generates synthetic data on a periodic basis (once a week, once a month, once a quarter, etc.) and/or an otherwise routine basis (e.g., subsequent to a database (e.g., database 114) being updated, as part of maintenance to language conversion engine 146, and/or the like) . . . .

Language conversion engine 146 is configured to convert natural language input (e.g., an NL query) to a QL query. As shown in FIG. 1, language conversion engine 146 is a service executed by conversion server 104. Alternatively, one or more components of language conversion engine 146 are implemented by application 120 (or another application executing on computing device 102 not shown in FIG. 1 for brevity). As shown in FIG. 1, language conversion engine 146 includes a pre-processor 122, a prompter 124, and a post-processor 126. Pre-processor 122 comprises logic for receiving requests to generate QL queries, refining schema, selecting synthetic data to include in a prompt, determining additional context to include in a prompt to generative AI model 132, and/or performing any other operations with respect to pre-processing information for use in generating a prompt to generative AI model 132 to cause generative AI model 132 to generate a QL query. In accordance with an embodiment, pre-processor 122 comprises an interface for communicating with embedding model 128 via network 118. Additional details regarding pre-processor 122 are described with respect to FIGS. 25-27, as well as elsewhere herein.

Prompter 124 comprises logic for providing a prompt to generative AI model 132 to cause the generative AI model 132 to generate a QL query. In accordance with an embodiment, prompter 124 provides the prompt to generative AI model 132 as an application programming interface (API) call of generative AI model 132. In accordance with an embodiment, prompter 124 includes an interface for communicating with generative AI model 132 via network 118. Additional details regarding prompter 124 are described with respect to FIGS. 25 and 26, as well as elsewhere herein.

Post-processor 126 comprises logic for parsing QL queries, repairing QL queries, providing responses on behalf of generative AI models, causing execution of QL queries (e.g., by providing a QL query to database engine 134), and/or performing any other operations with respect to post-processing QL queries generated by generative AI model 132. In accordance with an embodiment, post-processor 126 comprises respective interfaces for communicating with embedding model 128, generative AI model 132, and/or database engine 134 via network 118. Additional details regarding post-processor 126 are described with respect to FIG. 25, as well as elsewhere herein.

Generative AI model 132 is configured to generate QL queries based on a received prompt. In examples, generative AI model 132 is any type of generative AI model capable of generating QL queries based on prompts received from prompter 124, generating pairs of NL and QL queries, and/or generating a corrected query. In accordance with an embodiment, generative AI model 132 is an LLM. In an example, generative AI model 132 is trained using public information (e.g., information collected and/or scrubbed from the Internet) and/or data stored by an administrator of model server 110 (e.g., stored in memory of model server 110 and/or memory accessible to model server 110). In accordance with an embodiment, generative AI model 132 is an "off the shelf" model trained to generate complex, coherent, and/or original content based on (e.g., any) prompts. In alternative example embodiments, generative AI model 132 is a specialized model trained to generate QL queries, pairs of natural language and QL queries, and/or corrected queries. In accordance with an embodiment generative AI model 132 and embedding model 128 are the same model. Additional details regarding the operation and training of generative AI models such as generative AI model 132 are described in Section VI of the present disclosure, as well as elsewhere herein.

Database engine 134 is configured to execute queries against a database (e.g., database 114) to generate query results. In some embodiments, database engine 134 implements query optimization techniques. As shown in FIG. 1, database engine 134 is executed by engine server 112. Alternatively, database engine 134 is implemented by an application executed by computing device 102 (e.g., application 120). In another alternative embodiment, database engine 134 is implemented as a component of language conversion engine 146 (e.g., as a sub-component of post-processor 126 or as a separate component of language conversion engine 146).

Thus, system 100 has been described with respect to generating synthetic data for use in query generation, generating QL queries, and executing the queries against a database. Additional details regarding generating synthetic data and prompting a generative AI model to generate a QL query are described in the following sections (as well as elsewhere herein).

III. Embodiments for Synthetic Data Generation Based on Dataset Pairs

Embodiments of synthetic data generator 130 are configured to generate synthetic data. In examples, a language conversion engine, such as language conversion engine 146, selects synthetic data generated by synthetic data generator 130 to include in a prompt to generative AI model 132 to cause generative AI model 132 to generate a QL query. In these examples, the selected synthetic data provides additional context for the QL query to be generated through example conversions of similar natural language input to QL queries. In this manner, embodiments improve the quality of QL queries generated by generative AI model 132 and reduce the possibility of generative AI model 132 hallucinating during the query generation process.

Figure 2:
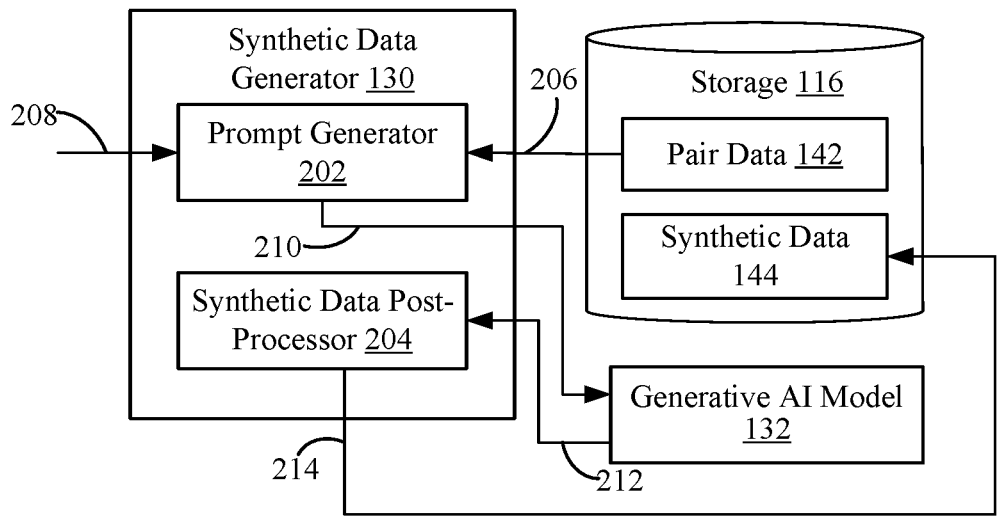
FIG. 2 shows a block diagram of a system for generating synthetic data, in accordance with an example embodiment.
Figure 3:
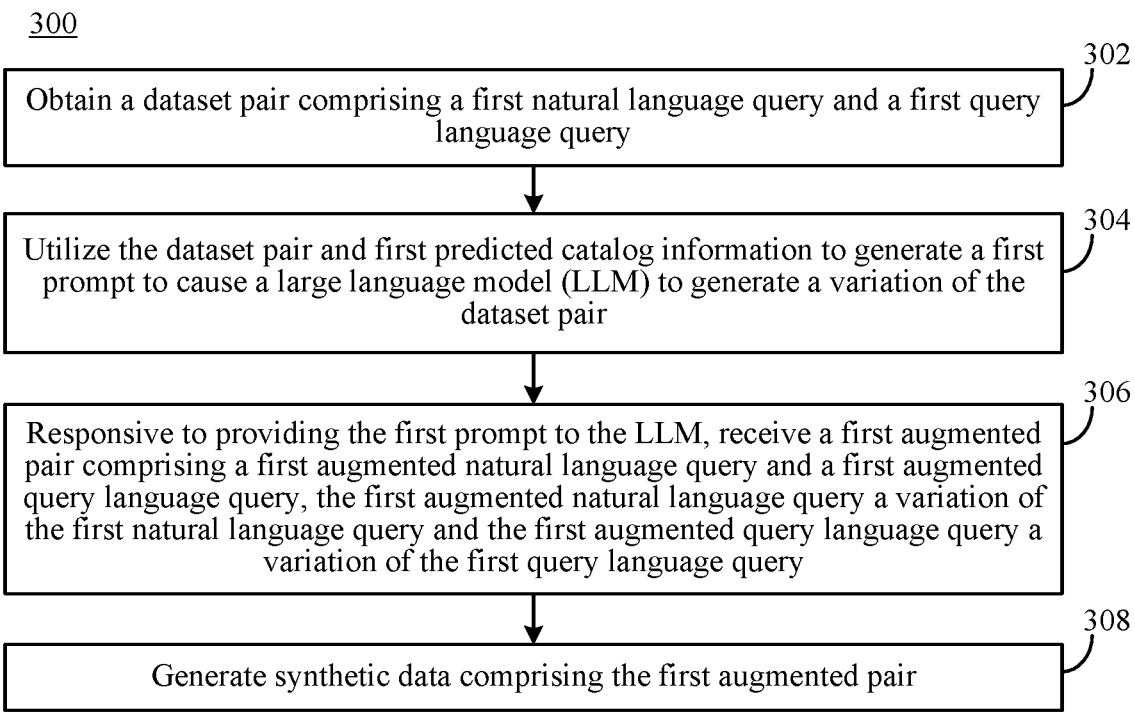
FIG. 3 shows a flowchart of a process for generating synthetic data, in accordance with an example embodiment.

Examples of synthetic data generator 130 are configured in various ways to generate synthetic data. For example, synthetic data generator 130 in accordance with one or more embodiments is configured to generate synthetic data based on dataset pairs of pair data 142. To better understand such embodiments, FIG. 2 is described herein. FIG. 2 shows a block diagram of a system 200 for generating synthetic data, in accordance with an example embodiment. As shown in FIG. 2, system 200 comprises storage 116 (storing pair data 142 and synthetic data 144), synthetic data generator 130, and generative AI model 132, as described with respect to FIG. 1. As also shown in FIG. 2, synthetic data generator 130 comprises a prompt generator 202 and a synthetic data post-processor 204, each of which are implemented as components and/or sub-services of synthetic data generator 130. To better understand the operation of system 200, FIG. 2 is described with respect to FIG. 3. FIG. 3 shows a flowchart 300 of a process for generating synthetic data, in accordance with an example embodiment. In accordance with an embodiment, synthetic data generator 130 operates according to flowchart 300. Not all steps of flowchart 300 need be performed in all embodiments. Further structural and operational embodiments will be apparent to persons skilled in the relevant art(s) based on the following descriptions of FIGS. 2 and 3.

Flowchart 300 begins with step 302. In step 302, a dataset pair comprising a first natural language query and a first query language query is obtained. For example, prompt generator 202 of FIG. 2 obtains (or otherwise receives) a dataset pair 206 from pair data 142. Dataset pair 206 comprises a first natural language query and a first QL query. In examples, dataset pair 206 is a manually generated dataset pair, a dataset pair obtained from published data, or a dataset pair previously generated by synthetic data generator 130 (or by another synthetic data generator). A non-limiting example of dataset pair 206 is shown in Table 1 as follows:

TABLE 1

| Natural Language Input | Query Language Query |
|---|---|
| Show first 10000 logon events details for timestamp between 2022-10-05 20:44 and 2022-10-05 20:49 | DeviceLogonEvents\n\| top 10000 by Timestamp asc\n \| where LastSeenTime >= datetime(2022-10-05T20:44:00)\n \| where LastSeenTime <= datetime (2022-10-05T20:49:00) |

In step 304, the dataset pair and first predicted catalog information are used to generate a first prompt to cause a LLM to generate a variation of the dataset pair. For example, prompt generator 202 of FIG. 2 generates a prompt 210 based on dataset pair 206 and predicted catalog information 208 and provides prompt 210 to generative AI model 132 to cause generative AI model 132 to generate a variation of dataset pair 206. In accordance with an embodiment, prompt 210 comprises instructions to include a particular number of variations of dataset pair 206 (e.g., one variation, two variations, tens of variations, and/or any other number of variations). In examples, the number of variations instructed in prompt 210 is predetermined based on a configuration of prompt generator 202, determined based on a number of dataset pairs synthetic data generator 130 is to generate synthetic data from (e.g., if there are a number of dataset pairs above a threshold in a queue of pairs to generate synthetic data from, prompt generator 202 in accordance with an embodiment lowers the number of variations requested), determined based on instructions provided to synthetic data generator 130 (not shown in FIG. 2) that cause synthetic data generator 130 to generate synthetic data (e.g., instructions received from a developer application), determined based on a coverage of data by existing synthetic data (e.g., if coverage is sparse, prompt generator 202 in an example requests additional variations), or determined based on storage space available in storage 116 (e.g., if a size of synthetic data 144 is near a limit, prompt generator 202 lowers the number of variations requested).

As shown in FIG. 2, prompt generator 202 receives predicted catalog information 208. Predicted catalog information 208 comprises descriptions of a database, data stored therein, and/or structure and/or groupings of the stored data that are similar to (e.g., semantically similar to) dataset pair 206. In accordance with an embodiment, predicted catalog information 208 comprises most of or all of catalog information for database 114. Alternatively, predicted catalog information 208 comprises a portion of catalog information for database 114. In an example of this alternative, predicted catalog information 208 is included in pair data 142 (e.g., mapped to dataset pair 206). In another example of this alternative, predicted catalog information 208 is determined by a sub-component of synthetic data generator 130 and/or another component of system 200 communicatively, not shown in FIG. 2 for brevity. For instance, an example of a component of synthetic data generator 130 configured to predict predicted catalog information 208 is described with respect to FIG. 4, as well as elsewhere herein.

In step 306, responsive to providing the first prompt to the LLM, a first augmented pair comprising a first augmented natural language query and a first augmented query language query is received, the first augmented natural language query a variation of the first natural language query and the first augmented query language query a variation of the first query language query. For example, synthetic data post-processor 204 receives augmented pair 212. Augmented pair 212 comprises an augmented NL query that is a variation of the NL query of dataset pair 206 and an augmented QL query that is a variation of the QL query of dataset pair 206. As shown in FIG. 2, synthetic data post-processor 204 receives a single augmented pair from generative AI model 132. Alternatively, synthetic data post-processor 204 receives multiple augmented pairs (e.g., a set of augmented pairs) from generative AI model 132 based on prompt 210. For example, suppose the dataset pair shown in Table 1 was provided to generative AI mode 132. As a continued non-limiting example, in accordance with an embodiment, synthetic data post-processor 204 receives augmented pairs shown in Table 2 as follows:

TABLE 2

| Augmented Natural Language Input | Augmented Query Language Query |
|---|---|
| Show the top 5000 logon events for the account name 'JohnDoe' From the IdentityLogonEvents Table. | IdentityLogonEvents\n \| where AccountName == 'JohnDoe'\n\| top 5000 by Timestamp desc |
| Display the first 10000 device logon events where the logon type was 'Interactive' and the protocol used was 'PROTOCOL 123' | DeviceLogonEvents\n \| where LogonType == 'Interactive' and Protocol == 'PROTOCOL123'\n\| top 10000 by Timestamp asc |
| Show the top 5000 access management sign-in events where the application used was 'ApplicationABC' and the error code was 50071 | ApplicationABCSignInEventsBeta\n\| where Application == 'ApplicationABC' and ErrorCode == 50071\n top 5000 by Timestamp desc |

As shown in Table 2, generative AI model 132 in this non-limiting example generated three augmented pairs from the dataset pair of Table 1.

In step 308, synthetic data comprising the first augmented pair is generated. For example, synthetic data post-processor 204 of FIG. 2 generates synthetic data 214. Synthetic data 214 comprises the augmented pair (or augmented pairs) received in step 306. In accordance with an embodiment, and as further discussed with respect to FIGS. 7-11 (as well as elsewhere herein), synthetic data post-processor 204 filters one or more augmented pairs from augmented pairs generated by generative AI model 132 to generate synthetic data 214. As shown in FIG. 2, synthetic data post-processor 204 stores synthetic data 214 in storage 116 as synthetic data 144. Alternatively, or additionally, synthetic data post-processor 204 provides synthetic data 214 to language conversion engine 146 of FIG. 1 (e.g., for use in generating a query).

Figure 4:
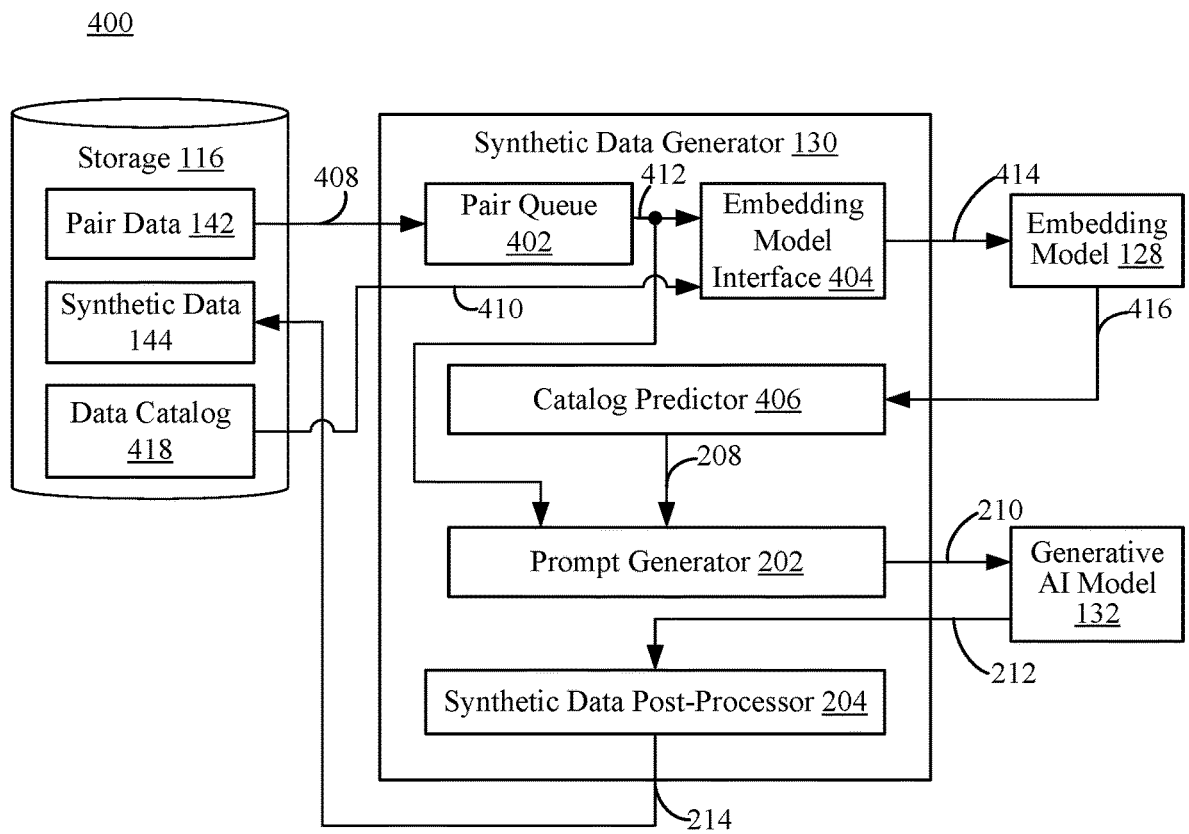
FIG. 4 shows a block diagram of a system for generating synthetic data, in accordance with another example embodiment.

As described herein, synthetic data generator 130 is configured in various ways to generate synthetic data (e.g., synthetic data 144), in examples. For instance, as described with respect to step 304 of flowchart 300 of FIG. 3, prompt generator 202 of FIG. 2 generates a prompt based on predicted catalog information (and a dataset pair) and provides the prompt to generative AI model 132 to cause generative AI model 132 to generate one or more augmented pair(s) that are used to generate synthetic data. In some examples, synthetic data generator 130 utilizes an embedding model to generate embeddings and predicts catalog information in generating synthetic data. Examples of synthetic data generator 130 are configured in various ways to generate embeddings and/or predict catalog information. For example, FIG. 4 shows a block diagram of a system 400 for generating synthetic data, in accordance with another example embodiment. As shown in FIG. 4, system 400 comprises storage 116, embedding model 128, synthetic data generator 130, and generative AI model 132, as described with respect to FIG. 1. As also shown in FIG. 4, synthetic data generator 130 comprises prompt generator 202 and synthetic data post-processor 204, as described with respect to FIG. 2, as well as a pair queue 402, an embedding model interface 404, and a catalog predictor 406, each of which are implemented as components and/or sub-services of synthetic data generator 130, in examples. In accordance with an embodiment, pair queue 402 is configured to store dataset pairs waiting to be processed by embedding model interface 404 and/or prompt generator 202. In examples, embedding model interface 404 is configured to utilize embedding model 128 to generate embeddings. In examples, catalog predictor 406 is configured to predict catalog information associated with a query.

As also shown in FIG. 4, storage 116 stores pair data 142 and synthetic data 144, as described with respect to FIG. 1, and a data catalog 418. Data catalog 418 comprises descriptions of database 114, data stored therein, and/or the structure and/or groupings of the stored data (e.g., clusters, tables, columns, etc.), also referred to as "catalog information" in examples herein. In examples, data catalog 418 is a "source" of catalog information of database 114. Examples of data catalog 418 include, but are not limited to, product information describing database 114 and/or data stored therein, an index of database 114, a description of code related to database 114, and/or any other type of description suitable for determining embeddings of database 114, as described elsewhere herein and/or as would otherwise be understood by a person ordinarily skilled in the relevant art(s) having benefit of this disclosure. In accordance with an embodiment, data catalog 418 comprises a single source of catalog information of database 114. In accordance with another embodiment, data catalog 418 comprises multiple sources of catalog information of database 114. For instance, in a non-limiting example, data catalog 418 comprises separate sources for different portions of database 114 (e.g., different clusters of data catalog 418, different sub-groups of data catalog 418, and/or the like).

Figure 5:
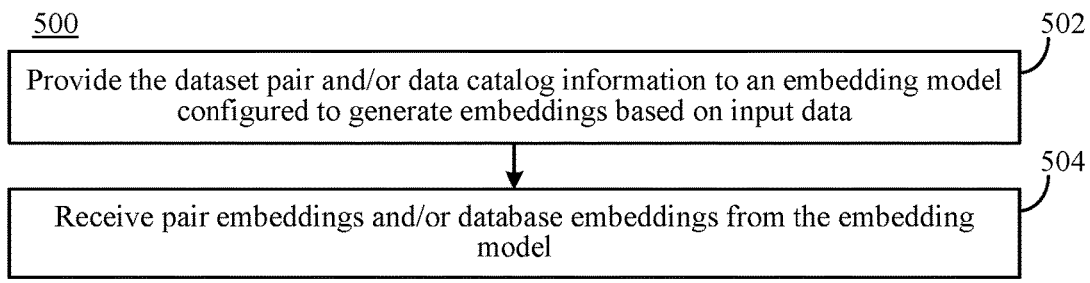
FIG. 5 shows a flowchart of a process for receiving embeddings, in accordance with an example embodiment.

Embodiments of synthetic data generator 130 of FIG. 4 operate in various ways to obtain or otherwise receive pair and/or database embeddings. To better understand an operation of system 400 receiving embeddings from an embedding model, FIG. 4 is described with respect to FIG. 5. FIG. 5 shows a flowchart 500 of a process for receiving embeddings, in accordance with an example embodiment. In accordance with an embodiment, synthetic generator 130 of FIG. 4 operates according to flowchart 500. Not all steps of flowchart 500 need be performed in all embodiments. Further structural and operational embodiments will be apparent to persons skilled in the relevant art(s) based on the following descriptions of FIGS. 4 and 5.

Flowchart 500 begins with step 502. In step 502, dataset pair and/or catalog information are provided to an embedding model configured to generate embeddings based on input data. For example, embedding model interface 404 of FIG. 4 provides an embedding request 414 to embedding model 128, which is configured to generate embeddings based on input data. In implementations, embedding request 414 comprises one or more dataset pair(s) and/or catalog information. In embodiments, embedding model interface 404 receives dataset pair(s) to include in embedding request 414 from pair queue 402, pair data 142, and/or synthetic data post-processor 204. For example, as shown in FIG. 4, pair queue 402 receives one or more dataset pairs 408 ("dataset pairs 408") from pair data 142. In this context, pair queue 402 queues dataset pairs 408 for further processing by embedding model interface 404 and/or prompt generator 202. In examples, dataset pairs 408 are queued in a randomized order or a determined order (e.g., based on the order they are stored in pair data 142, in a first-in-last-out order of pairs received by pair queue 402, in a first-in-first-out order of pairs received by pair queue 402, and/or in any other type of determined or predetermined order in which pairs are queued in pair queue 402, as described elsewhere herein and/or as would otherwise be understood by person(s) ordinarily skilled in the relevant art(s) having benefit of this disclosure). In an example, pair queue 402 provides the next queued pair 412 ("dataset pair 412") to embedding model interface 404. Dataset pair 412 is an example of dataset pair 206, as described with respect to FIG. 2. In an example, pair queue 402 automatically provides dataset pair 412 to embedding model interface 404. In another example, pair queue 402 provides dataset pair 412 in response to a request and/or indication generated by embedding model interface 404. In another example, pair queue 402 provides dataset pair 412 on a periodic/routine basis.

In embodiments, embedding model interface 404 receives catalog information to include in embedding request 414 from data catalog 418. For example, as shown in FIG. 4, embedding model interface 404 receives catalog information 410 from data catalog 418. Depending on the implementation, catalog information 410 represents the entirety of data catalog 418 or a portion of data catalog 418. In an example embodiment, embedding model interface 404 provides catalog information 410 alongside dataset pair 412 in embedding request 414. In an alternative embodiment, embedding model interface 404 provides dataset pair 412 and catalog information 410 in separate embedding requests to embedding model 128. For instance, in a non-limiting example, embedding model interface 404 provides catalog information 410 to embedding model 128 prior to receiving dataset pair 412. In this context, embeddings are generated for catalog information 410 "offline" from embedding generation for dataset pairs. In accordance with an embodiment, catalog information 410 represents updated portions of data catalog 418 (e.g., portions of data catalog 418 that have been added, revised, deleted, and/or otherwise modified since the last time embeddings were generated for that portion of data catalog 418).

In step 504, pair embeddings and/or database embeddings are received from the embedding model. For example, catalog predictor 406 of FIG. 4 receives one or more embeddings 416 ("embeddings 416" herein) from embedding model 128. Embeddings 416 comprises pair embeddings generated by embedding model 128 based on one or more dataset pairs provided thereto (e.g., dataset pair 412 included in embedding request 414, as described with respect to step 502) and/or database embeddings generated by embedding model 128 based on catalog information provided thereto (e.g., catalog information 410 included in embedding request 414, as described with respect to step 502). A pair embedding describes a context of a corresponding dataset pair and a database embedding describes a context of a corresponding portion of database 114. Examples of database embeddings include, but are not limited to, database embeddings that describe a context of the database, cluster embeddings that describe a context of a corresponding cluster in the database, table embeddings that describe a context of a corresponding table in the database, column embeddings that describe a context of a corresponding column in a table of the database, value embeddings that describe a context of a corresponding value in a column of a table of the database. As described elsewhere herein, embeddings 416 are vectors of floating-point numbers such that the distance between two embeddings in vector space is correlated with semantic similarity between two inputs in their original format.

As shown in FIG. 4, catalog predictor 406 receives embeddings 416 from embedding model 128. In accordance with an alternative embodiment, catalog predictor 406 receives one or more embeddings of embeddings 416 from a data store (e.g., storage 116). For instance, suppose, in a non-limiting example, embedding model 128 generates pair embeddings as dataset pairs are queued in pair queue 402 and generates database embeddings as catalog information of data catalog 418 is updated and/or otherwise provided to embedding model 128 for generation of database embeddings. In this context, embedding model 128 stores database embeddings in a data store for (e.g., later) access by catalog predictor 406. In a further example, embedding model 128 provides pair embeddings to catalog predictor 406 and (e.g., responsive to, simultaneously to, or subsequent to providing the pair embeddings) catalog predictor 406 receives stored database embeddings from the data store. In some examples, embedding model 128 stores pair embeddings in the data store. In this context, catalog predictor 406 is enabled to receive pair and database embeddings at a later time than when embedding model 128 generated the embeddings.

Figure 6:
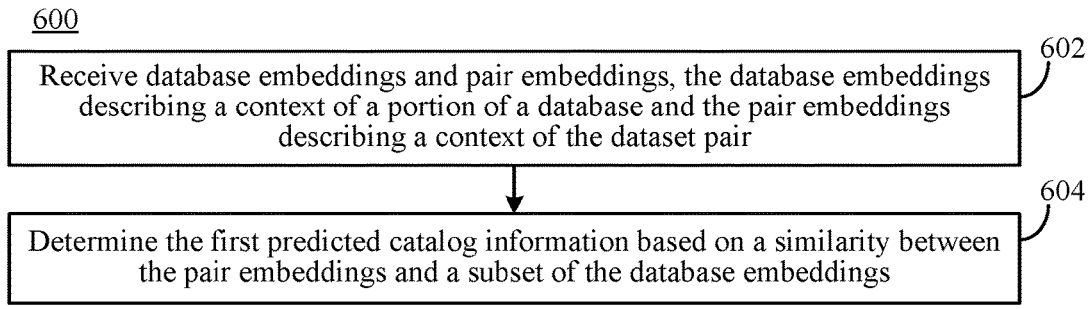
FIG. 6 shows a flowchart of a process for predicting catalog information, in accordance with an example embodiment.

Embodiments of synthetic data generator 130 operate in various ways to predict catalog information. For instance, in accordance with an embodiment, catalog predictor 406 of FIG. 4 predicts catalog information based on embeddings received from embedding model (e.g., as described with respect to flowchart 500 of FIG. 5). To better understand an operation of synthetic data generator 130 predicting catalog information based on embeddings, FIG. 4 is further described with respect to FIG. 6. FIG. 6 shows a flowchart 600 of a process for predicting catalog information, in accordance with an example embodiment. In accordance with an embodiment, catalog predictor 406 operates according to flowchart 600. Not all steps of flowchart 600 need be performed in all embodiments. Further structural and operational embodiments will be apparent to persons skilled in the relevant art(s) based on the following descriptions of FIGS. 4 and 6.

Flowchart 600 begins with step 602. In step 602, database and pair embeddings are received, the database embeddings describing a context of a portion of a database and the pair embeddings describing a context of a dataset pair. For example, catalog predictor 406 of FIG. 4 receives database and/or pair embeddings in any of the manners described with respect to step 504 of flowchart 500 of FIG. 5.

In step 604, the first predicted catalog information is determined based on similarity between the pair embeddings and a subset of the database embeddings. For example, catalog predictor 406 of FIG. 4 determines predicted catalog information 208 based on similarity between pair embeddings and database embeddings. For instance, suppose catalog predictor 406 receives a pair embedding corresponding to dataset pair 412. In this example, catalog predictor 406 measures similarity between the pair embedding and one or more database embeddings in order to determine which database embeddings have a similarity to the pair embedding that satisfies catalog similarity criteria. In an embodiment, catalog similarity criteria specifies a threshold to be satisfied by a measure of similarity between the pair embedding and a database embedding. In accordance with an embodiment, catalog predictor 406 selects the database embedding that is most similar to the pair embedding for determining predicted catalog information. In accordance with another embodiment, catalog predictor 406 selects multiple database embeddings that are similar to the pair embedding for determining predicted catalog information (e.g., all of the database embeddings that satisfy catalog similarity criteria, the top n (a predetermined number) of database embeddings that satisfy catalog similarity criteria, the top n similar database embeddings (e.g., without having to satisfy catalog similarity criteria), and/or the like). Example measures of similarity include, but are not limited to, Euclidean distance similarity, cosine similarity, dot product similarity, Jaccard similarity, Levenshtein similarity, and/or any other technique suitable for measuring similarity between embeddings.

Thus, flowchart 600 of FIG. 6 is described with respect to system 400 of FIG. 4. As shown in FIG. 4, catalog predictor 406 receives embeddings from embedding model 128 as a result of embedding model interface 404 providing pairs and/or catalog information to embedding model 128. In an alternative embodiment, catalog predictor 406 receives embeddings 414 from embedding model interface 404 as a result of a component other than a subcomponent of synthetic data generator 130 providing pairs and/or catalog information to embedding model 128. For instance, in an example where the dataset pair comprises a previously executed QL query converted from natural language provided to language conversion engine 146, a component of language conversion engine 146 provides query information to embedding model 128 to generate the embeddings. In this alternative, the generated embeddings are included in pair data 142 or otherwise mapped to the dataset pair. In another alternative, embeddings are generated as a result of a developer providing input to embedding model 128. In another example, embeddings of portions of data catalog 418 are included in storage 116 and mapped to the corresponding portions of the catalog.

Furthermore, embodiments of catalog predictors have been described with respect to system 400 of FIG. 4 and flowchart 600 of FIG. 6 as predicting catalog information relevant to a query based on embeddings of the query and the catalog information. However, embodiments described herein are not so limited. For example, in accordance with an embodiment, a catalog predictor of synthetic data generator 130 evaluates text of a dataset pair and text of a portion of catalog information to determine a score representative of a similarity between the text (also referred to as a "similarity score"). Depending on the implementations, such a catalog predictor matches characters, words, and/or phrases between the dataset pair and the portion of catalog information. In this example, a higher score represents a greater match between text of the dataset pair and text of the portion of catalog information. In this manner, a catalog predictor determines predicted catalog information without the use of embedding model 128.

In implementations of synthetic data generation described with respect to FIG. 4, subsequent to generation of predicted catalog information 208, flow continues in a manner described with respect to flowchart 300 of FIG. 3. For instance, as shown in FIG. 4, prompt generator 202 receives dataset pair 412 from pair queue 402 and predicted catalog information 208 from catalog predictor 406. Prompt generator 202 generates a prompt 210 from dataset pair 412 and predicted catalog information 208 (e.g., in a manner as described with respect to step 304 of flowchart 300) and provides prompt 210 to generative AI model 132 to cause generative AI model 132 to generate augmented pair 212. Synthetic data post-processor 204 receives augmented pair 212 (e.g., in a manner as described with respect to step 306 of flowchart 300) and generates synthetic data 214 (e.g., in a manner as described with respect to step 308 of flowchart 300).

In some examples, synthetic data generator 130 generates synthetic data from multiple augmented pairs. Such examples of synthetic data generator 130 are configured in various ways to generate synthetic data from multiple augmented pairs, in embodiments. For example, FIG. 7 shows a block diagram of a system 700 for generating synthetic data, in accordance with another example embodiment. As shown in FIG. 7, system 700 comprises storage 116 (storing synthetic data 144 and data catalog 418), synthetic data generator 130 (comprising prompt generator 202, synthetic data post-processor 204, and pair queue 402), and generative AI model 132, as described with respect to FIGS. 1, 2, 4, and elsewhere herein. As also shown in FIG. 7, synthetic data post-processor 204 includes a query parser 702, a similarity evaluator 704, a coverage evaluator 706, and filtered pairs 708, each of which are implemented as sub-services/components of synthetic data post-processor 204. Query parser 702 is configured to parse queries generated by generative AI model 132 to determine if the query is valid. As shown in FIG. 7, query parser 702 is a sub-service/component of synthetic data post-processor 204. In an alternative embodiment, query parser 702 is a separate component of system 700 (e.g., a separate component of synthetic data generator 130 or a component external to synthetic data generator 130). For example, in accordance with an embodiment query parser 702 is configured to parse augmented queries generated by generative AI model 132 as a result of operation of synthetic data generator 130 and to parse queries generated by generative AI model 132 as a result of operation of language conversion engine 146 of FIG. 1. In an example of this alternative embodiment, query parser 702 is a sub-component of post-processor 126 and/or otherwise accessible to post-processor 126. Similarity evaluator 704 is configured to evaluate a similarity between an augmented pair and existing dataset pairs (e.g., dataset pairs of pair data 142 and/or of synthetic data 144). Coverage evaluator 706 is configured to evaluate a percentage of or portion of data catalog 418 covered by an augmented pair and existing dataset pairs. Filtered pairs 708 are augmented pairs filtered by query parser 702, similarity evaluator 704, and/or coverage evaluator 706. In embodiments, filtered pairs 708 are generated as synthetic data 214 by synthetic data generator 130.

In embodiments, system 700 generates synthetic data from multiple augmented pairs. In some embodiments, system 700 filters an augmented pair from the multiple augmented pairs to generate synthetic data. To better understand this operation of system 700, FIG. 7 is described with respect to FIG. 8. FIG. 8 shows a flowchart 800 of a process for generating synthetic data, in accordance with another example embodiment. In accordance with an embodiment, system 700 operates according to flowchart 800. Not all steps of flowchart 800 need be performed in all embodiments. Further structural and operational embodiments will be apparent to persons skilled in the relevant art(s) based on the following descriptions of FIGS. 7 and 8.

Flowchart 800 begins with step 802. In step 802, the first prompt is provided to the LLM to cause the LLM to generate a set of augmented pairs comprising the first augmented pair and a second augmented pair, the second augmented pair comprising a second augmented natural language query and a second augmented query language query, the second augmented natural language query another variation of the first natural language query and the second augmented natural language query another variation of the first query language query. For example, prompt generator 202 of FIG. 7 provides prompt 210 to generative AI model 132 to cause generative AI model 132 to generate a plurality of augmented pairs 710 ("augmented pairs 710"). Prompt generator 202 generates prompt 210 in any of the manners described elsewhere herein (e.g., as described with respect to step 304 of flowchart 300 of FIG. 3). Augmented pairs 710 comprises any number of augmented pairs that generative AI model 132 generates from prompt 210. In examples, the number is specified in prompt 210 or based on a configuration of generative AI model 132. Each of augmented pairs 710 comprises an augmented NL query and an augmented QL query. The augmented NL queries are variations of the NL query included in prompt 210, and the QL queries are variations of the QL query included in prompt 210. As shown in FIG. 7, synthetic data post-processor 204 (or a component thereof) receives augmented pairs 710 and flow continues to step 804.

In step 804, the second augmented pair is filtered from the set of augmented pairs to generate a set of filtered pairs. For example, synthetic data post-processor 204 (or a component thereof) of FIG. 7 filters an augmented pair from augmented pairs 710 to generate filtered pairs 708. In examples, synthetic data post-processor 204 of FIG. 7 operates in various ways to filter one or more augmented pairs from augmented pairs 710. In some embodiments, synthetic data post-processor 204 filters through augmented pairs 710 simultaneously, in batches, or one at a time. Further examples of filtering an augmented pair from augmented pairs 710 are described with respect to FIGS. 9-11, as well as elsewhere herein.

In step 806, synthetic data comprising the set of filtered pairs is generated. For example, synthetic data post-processor 204 generates synthetic data 214 comprising filtered pairs 708. In accordance with an embodiment, synthetic data post-processor 204 stores synthetic data 214 in storage 116 (e.g., by adding synthetic data 214 to synthetic data 144). In accordance with another embodiment, synthetic data post-processor 204 adds synthetic data 214 to pair queue 402. Further details regarding adding synthetic data to a pair queue are described with respect to FIG. 12, as well as elsewhere herein.

Figure 9:
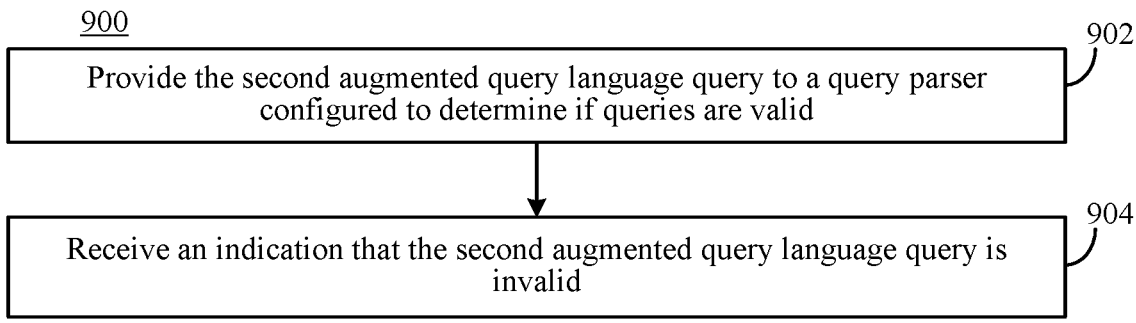
FIG. 9 shows a flowchart of a process for filtering an augmented pair from a set of augmented pairs, in accordance with an example embodiment.

As described with respect to step 804, synthetic data post-processor 204 filters an augmented pair from augmented pairs 710 in various ways. For instance, in accordance with an embodiment, synthetic data post-processor 204 filters an augmented pair from augmented pairs 710 based on an invalidity of the augmented pair. As shown in FIG. 7, synthetic data post-processor 204 comprises query parser 702. Query parser 702 operates in various ways to parse queries. To better understand synthetic data post-processor 204 utilizing query parser 702 to filter augmented pairs, FIG. 7 is further described with respect to FIG. 9. FIG. 9 shows a flowchart 900 of a process for filtering an augmented pair from a set of augmented pairs, in accordance with an example embodiment. In accordance with an embodiment, synthetic data post-processor 204 operates according to flowchart 900. Flowchart 900 is a further embodiment of step 804 of flowchart 800. Not all steps of flowchart 900 need be performed in all embodiments. Further structural and operational embodiments will be apparent to persons skilled in the relevant art(s) based on the following description of FIG. 9 with respect to FIG. 7.

Flowchart 900 begins with step 902. In step 902, the second augmented QL query is provided to a query parser configured to determine if queries are valid. For example, query parser 702 of FIG. 7 receives augmented pairs 710 and determines if QL queries in augmented pairs 710 are valid. In accordance with an embodiment, query parser 710 validates multiple queries at a time (e.g., simultaneously, or sequentially). In an alternative embodiment, synthetic data post-processor 204 filters through augmented pairs 710 in a sequential manner. In this alternative embodiment, query parser 710 determines if an augmented QL query of an augmented pair is valid. In embodiments, if an augmented QL query is invalid, flowchart 900 proceeds to step 904. If the augmented QL query is valid, as shown in FIG. 7, query parser 702 provides a validity signal 712 to similarity evaluator 704. In an alternative embodiment (e.g., wherein synthetic data post-processor 204 does not comprise a similarity evaluator), query parser 702 provides validity signal 712 indicating the validity (and comprising the augmented pair) to coverage evaluator 706. In another alternative embodiment (e.g., wherein synthetic data post-processor 204 does not comprise a similarity evaluator or a coverage evaluator), query parser 702 includes the augmented pair in filtered pairs 708, and query parser 702 parses the next augmented pair.

In step 904, an indication that the second augmented QL query is invalid is received. For example, suppose query parser 702 of FIG. 7 determined the augmented QL query is invalid. In this context, query parser 702 filters the augmented pair comprising the invalid augmented QL query from augmented pairs 710 (e.g., by discarding the pair) and parses the next augmented pair of augmented pairs 710 (e.g., in a manner similar to that described with respect to step 902). By filtering augmented pairs comprising invalid QL queries, embodiments of query parser 702 prevent generation of synthetic data based on invalid QL queries, thereby increasing the quality of synthetic data generated by synthetic data post-processor 204, and therefore increasing the quality of prompts provided to a generative AI model 132 by language conversion engine 146 of FIG. 1.

Figure 10:
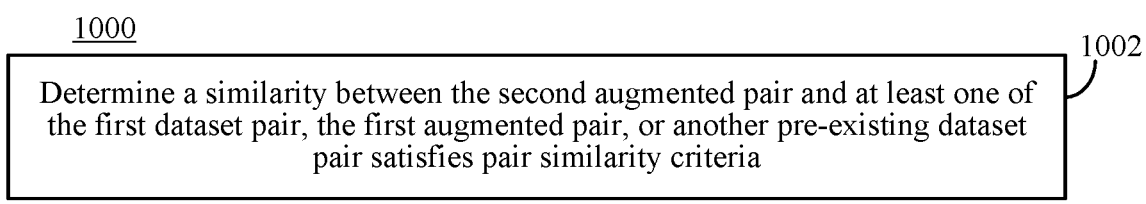
FIG. 10 shows a flowchart of a process for filtering an augmented pair from a set of augmented pairs, in accordance with another example embodiment.

As described herein, synthetic post-processor 204 of FIG. 7 operates in various ways to filter augmented pairs from a set of augmented pairs. For instance, as shown in FIG. 7, synthetic data post-processor 204 comprises similarity evaluator 704. Similarity evaluator 704 operates in various ways to evaluate similarities between augmented pairs and existing dataset pairs and/or synthetic data. To better understand the operation of similarity evaluator 704, FIG. 7 is further described with respect to FIG. 10. FIG. 10 shows a flowchart 1000 of a process for filtering an augmented pair from a set of augmented pairs, in accordance with another example embodiment. In accordance with an embodiment, synthetic data post-processor 204 operates according to flowchart 1000. Flowchart 1000 is a further embodiment of step 804 of flowchart 800 of FIG. 8. Note that flowchart 1000 need not be performed in all embodiments. Further structural and operational embodiments will be apparent to persons skilled in the relevant art(s) based on the following description of FIG. 10 with respect to FIG. 7.

Flowchart 1000 comprises step 1002. In step 1002, a similarity between the second augmented pair and at least one of the first dataset pair, the first augmented pair, or another pre-existing dataset pair is determined to satisfy pair similarity criteria. For example, similarity evaluator 704 receives validity signal 712 (comprising a validated augmented pair of augmented pairs 710) and one or more dataset pairs 714 ("dataset pairs 714" herein). Similarity evaluator 704 determines if a similarity between the augmented pair and any of dataset pairs 714 satisfies pair similarity criteria. In accordance with an embodiment, pair similarity criteria is a threshold to be satisfied by a measure of similarity between the augmented pair and a dataset pair of dataset pairs 714. In accordance with an embodiment, similarity evaluator 704 measures similarity between text of augmented pair and text of dataset pair to determine if the similarity satisfies pair similarity criteria. In an alternative embodiment, similarity evaluator 704 measures similarity between pair embeddings of the augmented pair and pair embeddings of the dataset pair. In this context, similarity evaluator 704 utilizes the embeddings to determine if a semantic similarity between the augmented pair and a dataset pair satisfies pair similarity criteria. In some embodiments, pair embeddings of the dataset pair are stored in storage 116 (e.g., included in synthetic data 144 or stored separately from synthetic data 144). In other embodiments, similarity evaluator 704 provides the dataset pair to an embedding model (e.g., embedding model 128), not shown in FIG. 7, to generate pair embeddings for the dataset pair. In accordance with an embodiment, similarity evaluator 704 provides the augmented pair to an embedding model to generate pair embeddings for the augmented pair.

As shown in FIG. 7, similarity evaluator 704 receives dataset pairs 714 from synthetic data 144. In accordance with an embodiment, similarity evaluator 704 receives all dataset pairs of synthetic data 144 as dataset pairs 714. In accordance with another embodiment, similarity evaluator 704 receives one of dataset pairs 714 at a time, determines if a similarity between the pair and the augmented pair satisfies pair similarity criteria, if so, filters the augmented pair from augmented pairs 710, and, if not, receives the next dataset pair of dataset pairs 714. In this embodiment, the process continues until either the augmented pair is filtered from augmented pairs 710 or similarities to the augmented pair for all of dataset pairs 714 have been evaluated. In accordance with another embodiment, similarity evaluator 704 searches synthetic data 144 for one or more dataset pairs with a similarity to the augmented pair that satisfies pair similarity criteria utilizing (e.g., embeddings describing context of) the augmented pair as an index.

In embodiments, if similarity evaluator 704 determines pair similarity criteria is satisfied (i.e., the augmented pair is (e.g., too) similar to an existing dataset pair), similarity evaluator 704 filters the augmented pair from augmented pairs 710 and the next augmented pair is evaluated. For instance, as shown in FIG. 7, similarity evaluator 704 provides an indication 724 indicating the augmented pair is filtered (or is to be filtered) to query parser 702 and query parser 702 parses the next augmented query. In an alternative embodiment (e.g., wherein synthetic data post-processor 204 does not utilize a query parser), similarity evaluator 704 evaluates the next augmented query. By filtering augmented pairs that are similar with existing dataset pairs, synthetic data generator 130 comprising similarity evaluator 704 produces diverse synthetic data for a database. Furthermore, by reducing overlap in dataset pairs, embodiments of similarity evaluator 704 reduce storage space consumed by synthetic data 144.

In embodiments, if similarity evaluator 704 determines pair similarity criteria is not satisfied, similarity evaluator 704 provides a dissimilarity signal 716 to coverage evaluator 706. In examples, dissimilarity signal 716 includes the augmented pair and/or indicates similarity between the augmented pair and existing pairs does not satisfy pair similarity criteria. In an alternative embodiment, (e.g., wherein synthetic data post-processor 204 does not comprise a coverage evaluator), similarity evaluator 704 includes the augmented pair in filtered pairs 708, and the next augmented pair is processed (e.g., parsed by query parser 702 and/or has a similarity evaluated by similarity evaluator 704).

Figure 11:
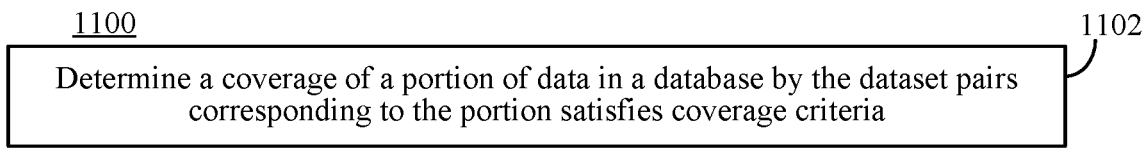
FIG. 11 shows a flowchart of a process for filtering an augmented pair from a set of augmented pairs, in accordance with another example embodiment.

As described herein, synthetic post-processor 204 of FIG. 7 operates in various ways to filter augmented pairs from a set of augmented pairs. For instance, as shown in FIG. 7, synthetic data post-processor 204 comprises coverage evaluator 706. Similarity evaluator 704 operates in various ways to evaluate similarities between augmented pairs and portions of database 114 already covered by existing dataset pairs and/or synthetic data and/or portions of database 114 not covered by existing pairs or synthetic data. To better understand the operation of coverage evaluator 706, FIG. 7 is further described with respect to FIG. 11. FIG. 11 shows a flowchart of a process for filtering an augmented pair from a set of augmented pairs, in accordance with another example embodiment. In accordance with an embodiment, synthetic data post-processor 204 operates according to flowchart 1100. Note flowchart 1100 need not be performed in all embodiments. Further structural and operational embodiments will be apparent to persons skilled in the relevant art(s) based on the following description of FIG. 11 with respect to FIG. 7.

Flowchart 1100 comprises step 1102. In step 1102, a coverage of a portion of data in a database by the dataset pairs corresponding to the portion is determined to satisfy coverage criteria. For example, coverage evaluator 706 of FIG. 7 receives dissimilarity signal 716 (comprising the validated and dissimilar augmented pair of augmented pairs 710) and catalog information 718. In accordance with an embodiment, coverage evaluator 706 receives catalog information 718 based on the augmented pair included in dissimilarity signal 716 (or otherwise corresponding to dissimilarity signal 716). For instance, coverage evaluator 706 in accordance with an embodiment compares embeddings of the augmented pair to embeddings of data in data catalog 418 to obtain a subset of catalog information that is semantically similar to the embeddings of the augmented pair (e.g., catalog information 718, in this example). In accordance with another embodiment, coverage evaluator 706 receives predicted catalog information utilized to generate the augmented pair (e.g., predicted catalog information 208) as catalog information 718. In a further example of this embodiment, coverage evaluator 706 determines a portion of the predicted catalog information that is semantically similar to the augmented pair to determine catalog information 718.

With continued reference to step 1102, coverage evaluator 706 determines if a coverage of a portion of data of database 114 corresponding to catalog information 718 is satisfied by existing dataset pairs of synthetic data 144. In accordance with an embodiment, coverage criteria is a threshold to be satisfied by a measure of similarity between dataset pairs (e.g., dataset pairs 714 and/or other dataset pairs of synthetic data 144) and a portion of data of database 114 corresponding to catalog information 718. In accordance with an embodiment, coverage evaluator 706 measures similarity between text of the dataset pairs and text of catalog information 718. In accordance with another embodiment, coverage evaluator 706 measures the number of dataset pairs that reference data corresponding to catalog information 718. In accordance with another embodiment, coverage evaluator 706 measures similarity between pair embeddings of the dataset pairs and embeddings of catalog information 718. In accordance with an embodiment, coverage criteria is satisfied if (e.g., at least) a percentage of catalog information 718 is covered by the dataset pairs. In accordance with another embodiment, coverage criteria is satisfied if a predetermined number of dataset pairs are semantically similar to catalog information 718.

In some embodiments, coverage evaluator 706 receives dataset pairs from synthetic data 144. In other embodiments, the dataset pairs are included in dissimilarity signal 716 (e.g., dataset pairs 714). In accordance with an embodiment, coverage evaluator 706 determines if dataset pairs cover data corresponding to catalog information 718 in groups (e.g., segments of dataset pairs, all dataset pairs at once, and/or the like). In accordance with another embodiment, coverage evaluator 706 evaluates whether or not a dataset pair covers a portion (or all) of catalog information 718 one at a time until either the augmented pair is filtered out from augmented pairs 710 (e.g., because enough of catalog information 718 is covered) or all dataset pairs have been evaluated for coverage of catalog information 718. In accordance with another embodiment, coverage evaluator 706 searches synthetic data 144 for one or more dataset pairs with a similarity to catalog information 718 that satisfies coverage criteria utilizing (e.g., embeddings describing context of) catalog information 718 as an index.

In embodiments, if coverage evaluator 706 determines coverage criteria is satisfied (i.e., (e.g., enough of) catalog information 718 corresponding to the augmented pair is already covered by existing dataset pair(s)), coverage evaluator 706 filters the augmented pair from augmented pairs 710 and the next augmented pair is evaluated. For instance, as shown in FIG. 7, coverage evaluator 706 provides an indication 726 indicating the augmented pair is filtered (or is to be filtered) to query parser 702 and query parser 702 parses the next augmented query. In an alternative embodiment (e.g., wherein synthetic data post-processor 204 does not utilize a query parser), indication 726 is provided to similarity evaluator 704 and similarity evaluator 704 evaluates the next augmented query. In another alternative embodiment (e.g., wherein synthetic data post-processor 204 does not utilize a query parser or a similarity evaluator, or wherein the query is parsed and/or similarity of the query is evaluated after coverage evaluation), coverage evaluator 706 evaluates the next augmented query. By filtering augmented pairs that cover a portion of data in a database already covered (in a satisfying quantity or manner) by existing dataset pairs, synthetic data generator 130 comprising coverage evaluator 706 produces diverse synthetic data for a database. Furthermore, by reducing overlap in coverage of database 114 by dataset pairs, embodiments of coverage evaluator 706 reduce storage space consumed by synthetic data 144.

In embodiments, if coverage evaluator 706 determines coverage criteria is not satisfied, coverage evaluator 706 provides includes the augmented pair in filtered pairs 708 and the next augmented pair is processed. In accordance with an alternative embodiment, wherein further post-processing occurs subsequent to coverage evaluation, coverage evaluator provides a new coverage signal (not shown in FIG. 7) to another component of synthetic data post-processor 204. In such examples, the new coverage signal includes the augmented pair and/or indicates coverage of database 114 by the augmented pair is not already satisfied by existing dataset pairs. If the last augmented pair is evaluated, flow continues to step 806 of flowchart 800 of FIG. 8. Alternatively, if the last augmented pair is evaluated, the next pair in pair queue 402 is provided to prompt generator 202 for generation of a prompt to generative AI model 132, as described elsewhere herein.

Thus, example embodiments of processes for filtering an augmented pair from a set of augmented pairs have been described with respect to FIGS. 7-11. In some embodiments, synthetic data post-processor 204 (and/or components thereof) iterate through each augmented pair until either each pair is filtered out of the augmented pairs (in which case, no synthetic data is generated) or each pair has been evaluated. As shown in FIG. 7, the remaining augmented pairs are included in filtered pairs 708 and synthetic data post-processor 204 generates synthetic data comprising filtered pairs 708 (e.g., as described with respect to step 806 of flowchart 800 of FIG. 8).

Figure 12:
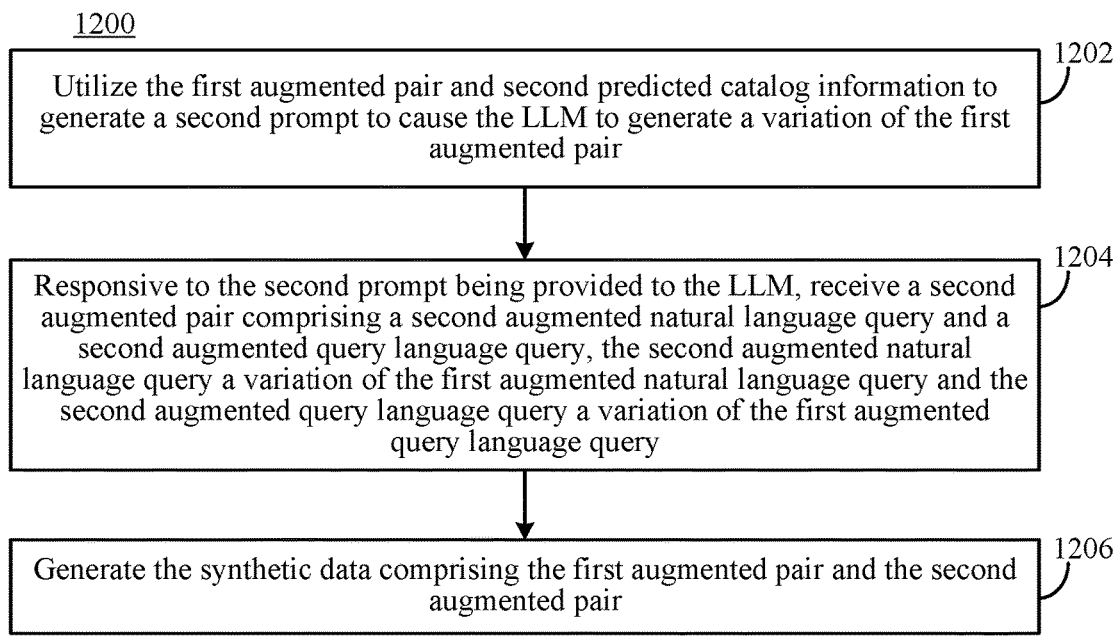
FIG. 12 shows a flowchart of a process for iteratively generating synthetic data, in accordance with an example embodiment.

In accordance with one or more embodiments, system 700 of FIG. 7 is configured to iteratively generate synthetic data. For instance, synthetic data post-processor 204 in accordance with an embodiment is configured to generate additional augmented pairs from previously generated augmented pairs. For example, as shown in FIG. 7 and indicated via the dotted line 728, synthetic data post-processor 204 in accordance with an embodiment adds validated augmented pairs (e.g., filtered pairs 708) to pair queue 402. In this context, additional augmented pairs are generated from the validated augmented pairs added to pair queue 402. To better understand the operation of system 700 iteratively generating synthetic data, FIG. 7 is further described with respect to FIG. 12. FIG. 12 shows a flowchart 1200 of a process for iteratively generating synthetic data, in accordance with another example embodiment. In accordance with an embodiment, system 700 operates according to flowchart 1200. Note not all steps of flowchart 1200 need be performed in all embodiments. Further structural and operational embodiments will be apparent to persons skilled in the relevant art(s) based on the following description of FIG. 12 with respect to FIG. 7.

Flowchart 1200 begins with step 1202. In step 1202, the first augmented pair and second predicted catalog information is utilized to generate a second prompt to cause the LLM to generate a variation of the first augmented pair. For example, suppose filtered pairs 708 are added to pair queue 402 (e.g., as indicated by via line 728 of FIG. 7). In this example, pair queue 402 provides an augmented pair 730 to prompt generator 202 and prompt generator 202 generates a new prompt from augmented pair 730 and predicted catalog information. In accordance with an embodiment, prompt generator 202 generates the new prompt from augmented pair 730 and the same predicted catalog information utilized to generate the prompt that caused generative AI model 132 to generate augmented pair 730 (e.g., predicted catalog information 208 of FIG. 2). In accordance with another embodiment, catalog predictor 406 of FIG. 4 determines predicted catalog information for augmented pair 730. In an example of this embodiment, catalog predictor 406 determines the predicted catalog information by matching text of augmented pair 730 to portions of data catalog 418. In an alternative example of this embodiment, augmented pair 730 is provided to embedding model 128 to cause embedding model 128 to generate pair embeddings for augmented pair 730 (e.g., in a manner as described with respect to FIGS. 4 and 5) and catalog predictor 406 determines the predicted catalog information for augmented pair 730 based on database embeddings and the pair embeddings (e.g., in a manner as described with respect to FIGS. 4 and 6).

In step 1204, responsive to the second prompt being provided to the LLM, a second augmented pair comprising a second augmented natural language query and a second augmented query language query is received, the second augmented natural language query a variation of the first augmented natural language query and the second augmented query language query a variation of the first augmented query language query. For example, synthetic data post-processor 204 of FIG. 7 receives one or more additional augmented pairs ("additional augmented pairs") from generative AI model 132 that were generated from the prompt including augmented pair 730. In this context, the additional augmented pairs comprise augmented NL queries that are variations of the augmented NL query of augmented pair 730 and augmented QL queries that are variations of the augmented QL query of augmented pair 730.

In step 1206, synthetic data comprising the first augmented pair and the second augmented pair is generated. For example, synthetic data post-processor 204 generates synthetic data 214 comprising augmented pair 730 (and other augmented pairs from the initial iteration of synthetic data generation) and augmented pairs received in step 1206. In accordance with an embodiment, synthetic data post-processor 204 stores synthetic data 214 as synthetic data 144 in batches (e.g., stores the first set of augmented pairs subsequent to generation of filtered pairs 708 in a first transmission to storage 116, stores the second set of augmented pairs generated based on augmented pair 730 in a second transmission to storage 116, etc.). In accordance with an alternative embodiment, synthetic data post-processor 204 collects synthetic data for a synthetic data generation "session" and stores the synthetic data in storage 116 as a single transmission. For instance, synthetic data post-processor 204 in accordance with an embodiment iterates through each augmented pair and subsequent augmented pairs and, once iterations are complete and a final set of synthetic data is generated from the augmented pairs, transmits the synthetic data to storage 116 for storage thereof (e.g., by including the synthetic data in synthetic data 144). In accordance with an embodiment, synthetic data post-processor 204 (or a component thereof) filters the augmented pairs generated from a prompt comprising augmented pair 730 (e.g., in a manner similar to the processes described with respect to FIGS. 8-11).

Thus, an example of iteratively generating synthetic data is described with respect to system 700 of FIG. 7 and flowchart 1200 of FIG. 12. In examples, synthetic data generator 130 generates additional augmented pairs from previously generated augmented pairs until a limit on the number of generated pairs is reached, a limit on the number of "branches" from an augmented pair is reached (e.g., the number of subsequent augmented pairs originating from the augmented pair), no more augmented pairs are generated that have not been filtered by synthetic data post-processor 204, and/or the like. In this context, synthetic data generator 130 of FIG. 7 generates a "tree" of augmented pairs, where the first augmented pairs branch from the first dataset pair and subsequent augmented pairs further branch from the first augmented pairs. An example tree of augmented pairs is described with respect to FIG. 15.

Figure 13:
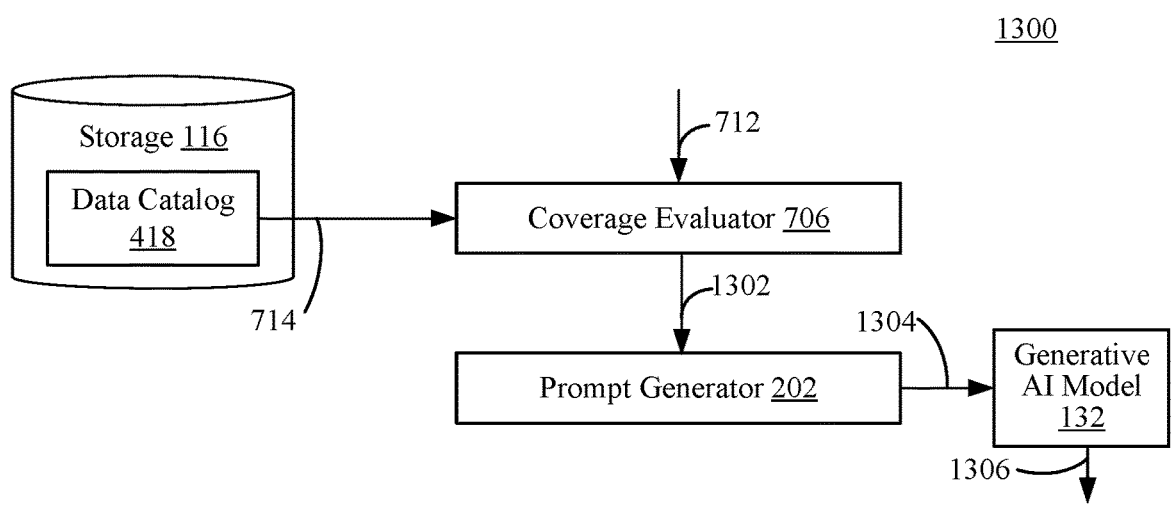
FIG. 13 shows a block diagram of a system for iteratively generating synthetic data, in accordance with another example embodiment.
Figure 14:
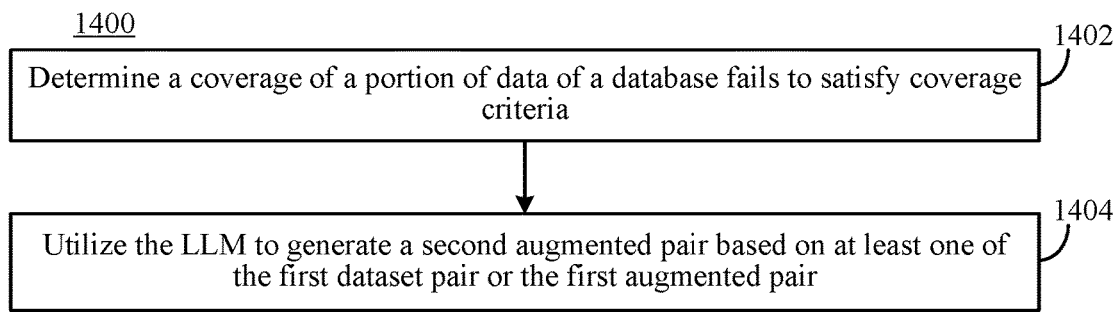
FIG. 14 shows a flowchart of a process for iteratively generating synthetic data, in accordance with another example embodiment.

As described herein, in some examples, a synthetic data post-processor comprises a coverage evaluator. For instance, as shown in FIG. 7, synthetic data post-processor 204 comprises coverage evaluator 706, as described with respect to FIGS. 7 and 11. In some embodiments, coverage evaluator 706 is configured to cause synthetic data generator 130 to reiterate generation of synthetic data. For instance, FIG. 13 shows a block diagram of a system 1300 for iteratively generating synthetic data, in accordance with an example embodiment. As shown in FIG. 13, system 1300 comprises storage 116 (comprising data catalog 418), generative AI model 132, prompter 202, and coverage evaluator 706, as respectively described in the descriptions of FIGS. 1, 2, 4, and 7, as well as elsewhere herein. To better understand the operation of system 1300, FIG. 13 is described with respect to FIG. 14. FIG. 14 shows a flowchart 1400 of a process for iteratively generating synthetic data, in accordance with an example embodiment. In accordance with an embodiment, system 1300 operates according to flowchart 1400. Not all steps of flowchart 1400 need be performed in all embodiments. Further structural and operational embodiments will be apparent to persons skilled in the relevant art(s) based on the following descriptions of FIGS. 13 and 14.

Flowchart 1400 begins with step 1402. In step 1402, a coverage of a portion of data of a database is determined to fail to satisfy coverage criteria. For example, as shown in FIG. 13, coverage evaluator 706 receives validity signal 712 indicating an augmented pair is valid and dataset pairs 714. In this example, coverage evaluator 706 determines a coverage of a portion of data of database 114 by dataset pairs 714 and the augmented pair fail to satisfy coverage criteria. In examples, coverage evaluator 706 determines the coverage criteria is not satisfied based on a percentage of the data of database 114 covered by the pairs, a number of pairs associated with the portion of data (e.g., a number of pairs with embeddings that have a similarity to embeddings of the portion of data that satisfies a data similarity criteria), and/or any other criteria suitable for determining a coverage of data by the pairs is unsatisfactory or additional pairs for the corresponding portion(s) should be generated. As shown in FIG. 13, coverage evaluator 706 transmits a low coverage signal 1302 to prompt generator 202 and flow continues to step 1404. In accordance with an embodiment, low coverage signal 1302 includes an indication of the portion of data for which coverage criteria is not satisfied, the augmented pair, dataset pairs 714, and/or predicted catalog information for the portion of data.

In step 1404, the LLM is utilized to generate a second augmented pair based on at least one of the first dataset pair or the first augmented pair. For example, prompt generator 202 of FIG. 13 generates a prompt 1304 based on (or otherwise in response to) low coverage signal 1302 and provides prompt 1304 to generative AI model 132. In examples, prompt 1304 comprises predicted catalog information for the portion of data the pair is to be generated for, previous pairs generated by generative AI model 132, other dataset pairs (e.g., pairs in pair queue 402, pairs of pair data 142), and/or other information suitable for providing to generative AI model 132 to cause generative AI model 132 to generate an augmented pair, as described elsewhere herein. As also shown in FIG. 13, generative AI model 132 generates a second augmented pair 1306 ("augmented pair 1306" herein) based on a pair included in prompt 1304. For instance, in examples, generative AI model 132 generates augmented pair 1306 based on one or more of an augmented pair of augmented pairs 710, a dataset pair of dataset pairs 408, and/or any other pair of an NL query and a QL query described herein. In an alternative embodiment, generative AI model 132 generates multiple augmented pairs (e.g., comprising augmented pair 1306) responsive to prompt 1304.

Figure 15:
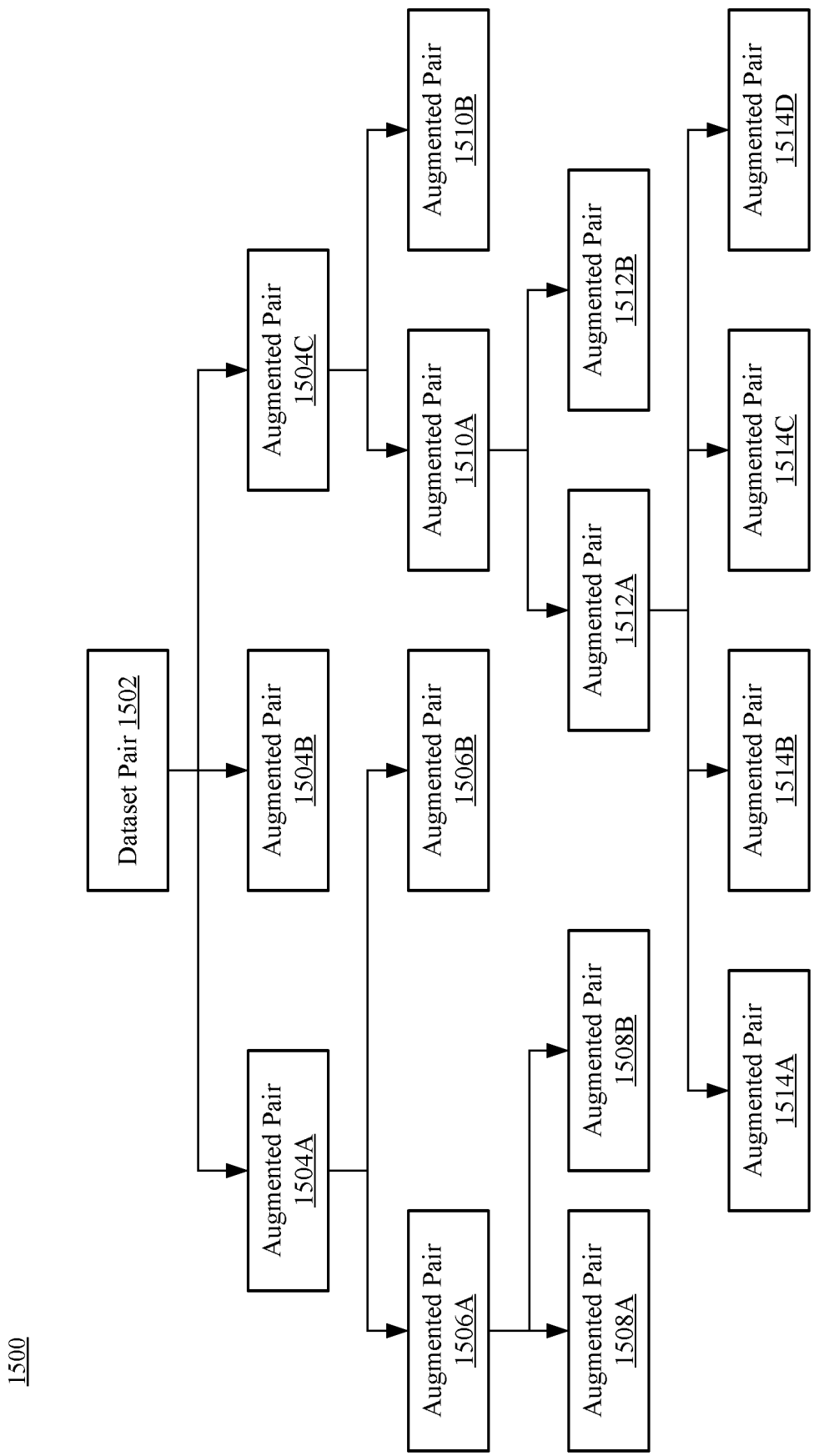
FIG. 15 illustrates an example tree of augmented pairs 1500 ("tree 1500" herein), in accordance with an embodiment.

Example embodiments of synthetic data generator 130 have been described as "tree-based" synthetic data generation. In this context, synthetic data generator 130 generates branches of augmented pairs from dataset pairs in order to increase coverage of data of database 114 by synthetic data 144. In this context, the quality of queries generated by generative AI model 132 (e.g., or by language conversion engine 146 leveraging generative AI model 132) are improved through efficient alignment of synthetic data and queries. In order to better understand tree-based synthetic data generation, FIG. 15 is described herein. FIG. 15 illustrates an example tree of augmented pairs 1500 ("tree 1500" herein), in accordance with an embodiment. Further structural and operational examples will be apparent to persons skilled in the relevant art(s) based on the following descriptions. Tree 1500 is described as follows with respect to system 400 of FIG. 4.

Tree 1500 as illustrated details how augmented pairs are generated through iterative pair generation (e.g., as described with respect to flowchart 1200 of FIG. 12). In examples, augmented pairs are generated based on dataset pairs or previously generated augmented pairs. For instance, tree 1500 shows augmented pairs 1504A-1504C generated from dataset pair 1502. Dataset pair 1502 is an example of dataset pair 412 of FIG. 4. In accordance with an embodiment, prompt generator 202 of FIG. 4 generated a prompt (e.g., prompt 210) comprising dataset pair 412 to cause generative AI model 132 to generate augmented pairs 1504A-1504C as variations of dataset pair 412. In this context, synthetic data post-processor 204 post-processes augmented pairs 1504A-1504C to determine if any them are to be filtered out of the generated synthetic data. For instance, suppose synthetic data post-processor 204 filters augmented pair 1504B out of the augmented pairs in any of the manners described herein. In this context, synthetic data generator 130 includes augmented pairs 1504A and 1504C in pair queue 402. The process repeats with prompt generator 202 generating a prompt from the next pair in pair queue 402 (e.g., until synthetic data generator 130 (or a subcomponent thereof) determines not to generate any more augmented pairs from this branch of dataset pair 1502).

As shown in FIG. 15, augmented pairs 1506A and 1506B are generated from augmented pair 1504A, augmented pairs 1510A and 1510B are generated from augmented pair 1504C, augmented pairs 1508A and 1508B are generated from augmented pair 1506A, augmented pairs 1512A and 1512B are generated from augmented pair 1510A, and augmented pairs 1514A-1514D are generated from augmented pair 1510A. In accordance with an example embodiment, augmented pairs 1504B, 1506B, 1508A, 1508B, 1510B, 1512B, 1514A, 1514B, 1514C, and/or 1514D are filtered out of the augmented pairs and synthetic data generator 130 generates synthetic data 214 from the filtered augmented pairs (e.g., augmented pairs 1504A, 1504C, 1506A, 1510A, 1512A). In accordance with an alternative embodiment, one or more of augmented pairs 1504B, 1506B, 1508A, 1508B, 1510B, 1512B, 1514A, 1514B, 1514C, and/or 1514D are included in the filtered augmented pairs utilized to generate synthetic data 214. For instance, synthetic data post-processor 204 (or a component thereof) in an example decides the augmented pair satisfies criteria (e.g., coverage criteria) such that the augmented pair is to be included in synthetic data 214 but further augmented pairs are not to be generated from the augmented pair.

IV. Embodiments for Feedback-Based Synthetic Data Generation

Examples of synthetic data generation have been described with respect to a "tree based" aspect, as well as similar aspects wherein synthetic data is generated based on dataset pairs. However, embodiments described herein are not so limited. For example, some embodiments of synthetic data generator 130 generate synthetic data based on user feedback (e.g., customer feedback). To better understand such embodiments, FIG. 16 is described herein. FIG. 16 shows a block diagram of a system 1600 for generating synthetic data, in accordance with an example embodiment. As shown in FIG. 16, system 1600 comprises synthetic data generator 130 and storage 116 (storing synthetic data 144), as described with respect to FIG. 1, and synthetic data store criteria 1606. In accordance with an embodiment, synthetic data store criteria is a set of rules that synthetic data generated by synthetic data generator 130 is to follow. Additional details regarding synthetic data store criteria 1606 are described with respect to FIGS. 23 and 24, as well as elsewhere herein. As also shown in FIG. 16, synthetic data generator 130 comprises a pair corrector 1602 (also referred to as a "pair correction system" or a "pair correction component") and a synthetic data post-processor 1604, each of which are implemented as subservices/components of synthetic data generator 130. In accordance with an embodiment, synthetic data generator comprises prompt generator 202, as described with respect to FIG. 2, and/or pair queue 402, embedding model 404, and/or catalog predictor 406, as described with respect to FIG. 4. In accordance with an embodiment, synthetic data post-processor 1604 is a further example of synthetic data post-processor 204. Alternatively, synthetic data post-processor 1604 is a separate post-processing circuit from synthetic data post-processor 204.

To better understand the operation of system 1600, FIG. 16 is described with respect to FIG. 17. FIG. 17 shows a flowchart 1700 of a process for generating synthetic data, in accordance with an example embodiment. In accordance with an embodiment, system 1600 operates according to flowchart 1700. Note not all steps of flowchart 1700 need be performed in all embodiments. Further structural and operational embodiments will be apparent to persons skilled in the relevant art(s) based on the following description of FIGS. 16 and 17.

Flowchart 1700 begins with step 1702. In step 1702, an indication of negative feedback for a first query language query generated by a LLM based on a first natural language query is received. For example, pair corrector 1602 receives an indication 1608. In accordance with an embodiment, indication 1608 is an indication of negative feedback for a QL query generated by generative AI model 132 based on an NL query. In accordance with an embodiment, personal identifying information is removed from indication 1608. In accordance with an embodiment, pair corrector 1602 receives indications of negative and/or positive feedback with respect to multiple QL queries at once.

In step 1704, a corrected pair is generated based on the indication and the first natural language query, the corrected pair comprising the first natural language query and a corrected query language query, the corrected query language query a syntactically valid conversion of the first natural language query. For example, pair corrector 1602 generates corrected pair 1610 based on indication 1608 and the NL query corresponding to indication 1608. Corrected pair 1610 comprises the NL query and a corrected QL query. The corrected QL query is a syntactically valid conversion of the NL query. In accordance with an embodiment, and as described with respect to FIG. 19 (as well as elsewhere herein), pair corrector 1602 leverages telemetry data to generate corrected pair 1610. In accordance with another embodiment, and as described with respect to FIG. 20 (as well as elsewhere herein), pair corrector 1602 leverages a generative AI model (e.g., generative AI model 132) to generate corrected pair 1610. In accordance with an embodiment, pair corrector 1602 (or another component of synthetic data generator 130 (e.g., a query parser), not shown in FIG. 16) parses the QL query of corrected pair 1610 to determine if the QL query is valid. In some embodiments, pair corrector 1602 iteratively attempts to correct the pair to generate corrected pair 1610.

In step 1706, the corrected pair is determined to satisfy criteria of a synthetic data store. For example, synthetic data post-processor 1604 of FIG. 16 determines if corrected pair 1610 satisfies synthetic data store criteria 1606. Examples of synthetic data store criteria 1606 include, but are not limited to, coverage criteria suitable for determining if coverage of data of database 114 by corrected pair 1610 overlaps with coverage of data of database 114 by existing synthetic data (e.g., in a manner similar to that described with respect to FIG. 11), pair similarity criteria suitable for determining if corrected pair 1610 is (e.g., too) similar to existing synthetic data (e.g., in a manner similar to that described with respect to FIG. 10), consistency criteria suitable for determining a corrected QL query of corrected pair 1610 is consistent with an expected conversion of an NL query of corrected pair 1610 (e.g., in a manner described further with respect to FIGS. 23 and 24, as well as elsewhere herein), and/or any other criteria suitable for determining corrected pair 1610 is a suitable dataset pair to include as synthetic data of synthetic data 144.

In step 1708, the corrected pair is stored as synthetic data in the synthetic data store. For example, synthetic data post-processor 1604 of FIG. 16 stores corrected pair 1610 as (e.g., a portion of) synthetic data 144 in storage 116. For instance, as shown in FIG. 16, synthetic data post-processor 1604 transmits a storage signal 1612 (comprising corrected pair 1610) to storage 116 to cause corrected pair 1610 to be stored as synthetic data of synthetic data 144. In this context, synthetic data generator 130 automatically generates synthetic data for use in future query generations by language conversion model 146 to cover gaps and/or otherwise improve the quality of query generation.

Flowchart 1700 has been described herein with respect to receiving indications of negative feedback. In some embodiments, synthetic data generator 130 receives an indication of positive feedback. Examples of positive feedback include, but are not limited to, an indication from a customer that a query generated by generative AI model 132 is an acceptable conversion of an NL query, an indication that the customer executed a QL query generated by generative AI model 132 and corresponding to an NL query provided in a prompt to the model, and/or the like. In examples wherein positive feedback is received, synthetic data generator 130 provides the indication to synthetic data post-processor 1604. In this context, synthetic post-processor 1604 validates syntax of the QL query, validates a consistency of the NL query and the QL query, evaluates a similarity between the NL query-QL query pair, evaluates a coverage of database 114 with respect to the QL query, and/or otherwise post-processes the QL query and corresponding NL query for which positive feedback was received. In this context, if the pair is valid and otherwise satisfies criteria of synthetic data post-processor 1604, synthetic data generator 130 (or a component thereof) includes the pair in synthetic data 144. In this context, synthetic data generator 130 expands synthetic data 144 based on successful conversions of NL queries to QL queries, thereby improving quality of future query generations by language conversion engine 146.

Figure 18:
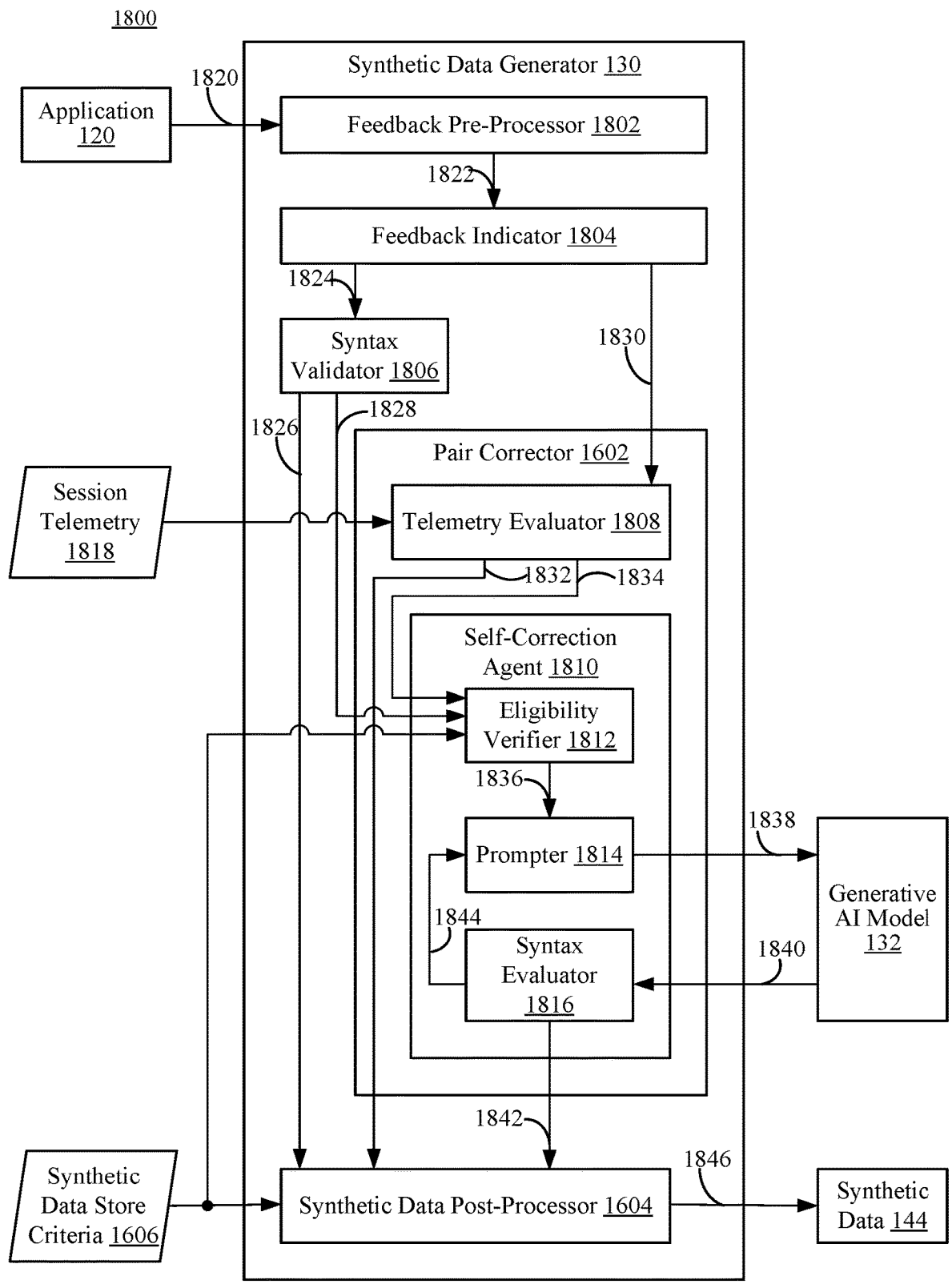
FIG. 18 shows a block diagram of a system for generating synthetic data, in accordance with another example embodiment.

In examples of synthetic data generation based on feedback, synthetic data generator 130 is configured in various ways to generate synthetic data. For example, FIG. 18 shows a block diagram of a system 1800 for generating synthetic data, in accordance with another example embodiment. As shown in FIG. 18, system 1800 comprises application 120, generative AI model 132, and synthetic data 144, as described with respect to FIG. 1, synthetic data generator 130 (comprising pair corrector 1602 and synthetic data post-processor 1604) and synthetic data store criteria 1606, as described with respect to FIG. 16, and session telemetry 1818. Session telemetry 1818 comprises data related to and measurements of use of database 114, database engine 134, language conversion engine 146, and other components of system 100 of FIG. 1, as well as any subcomponents described elsewhere herein (e.g., by applications such as application 120 and/or by users utilizing applications such as application 120). As also shown in FIG. 18, synthetic data generator 130 comprises a feedback pre-processor 1802, a feedback indicator 1804, and a syntax validator 1806, each of which are subservices/components of synthetic data generator 130. Furthermore, pair corrector 1602 of FIG. 18 comprises a telemetry evaluator 1808 and a self-correction agent 1810 (comprising an eligibility verifier 1812, a prompter 1814, and a syntax evaluator 1816), each of which are subservices/components of pair corrector 1602. In one or more alternative examples, eligibility verifier 1812, prompter 1814, and syntax evaluator 1816 are implemented separate from self-correction agent 1810 (e.g., as separate components of pair corrector 1602, synthetic generator 130, and/or system 1800). For instance, in an alternative example, syntax evaluator 1806 performs syntax evaluation for self-correction agent 1810 (e.g., in lieu of syntax evaluator 1816). In accordance with an embodiment, syntax evaluator 1806 and/or syntax evaluator 1816 are further examples of query parser 702 of FIG. 7.

Feedback pre-processor 1802 of FIG. 18 is configured to receive feedback 1820 from application 120 and pre-process feedback 1820. In examples, application 120 generates feedback 1820 in response to user interaction with a user interface (UI) of application 120 (not shown in FIG. 18) to indicate whether or not a QL query generated by language conversion engine 146 is a satisfactory conversion of an NL query. In examples, feedback 1820 comprises the QL query language conversion engine 146 generated (e.g., the QL query for which feedback 1820 is provided for), a binary decision on whether the conversion is satisfactory (e.g., a positive indication indicating it was satisfactory or a negative indication indicating it was not satisfactory), a rating indicating a degree in which the conversion is satisfactory or not satisfactory (e.g., a rating from 1 to 5, a rating from 1 to 10, etc.), one or more comments regarding the user's feedback, answers to one or more questions regarding the generated QL query, and/or any other information associated with feedback with respect to the generated QL query. In accordance with an embodiment, the user is prompted via a UI of application 120 to provide feedback 1820 (e.g., subsequent to generation of the QL query by language conversion engine 146, subsequent to execution of the QL query, subsequent to the user modifying the QL query, as part of a customer satisfaction survey, and/or the like). In accordance with an embodiment, feedback pre-processor 1802 removes personal identifying information from feedback 1820. In accordance with an embodiment, feedback pre-processor 1802 removes information not usable by other components of synthetic data generator 130 (e.g., in order to reduce data transmitted between components). As shown in FIG. 18, feedback pre-processor 1802 processes feedback 1820 into processed feedback 1822.

Feedback indicator 1804 is configured to analyze processed feedback 1822 and determine if processed feedback 1822 is indicative of positive feedback (e.g., the user is satisfied with the generated QL query) or negative feedback (e.g., the user is not satisfied with the generated QL query). In examples, feedback indicator 1804 determines if processed feedback 1822 is indicative of positive or negative feedback based on a binary indication (e.g., a "thumbs up" or "thumbs down", a "yes" or "no", and/or the like), a rating satisfying (or failing to satisfy) a positive or negative feedback threshold (e.g., a 1 or 2 rating on a 1-5 scale in a non-limiting example indicates negative feedback), a long-form answer that indicates the user was satisfied or not satisfied with the QL query, and/or any other type of feedback suitable for analysis to determine if processed feedback 1822 is indicative of whether or not a user (or an application) is satisfied with the generated QL query. As shown in FIG. 18, if feedback indicator 1804 determines processed feedback 1822 is positive, feedback indicator 1804 generates an indication of positive feedback 1824 ("indication 1824" herein). As also shown in FIG. 18, if feedback indicator 1804 determines processed feedback 1822 is negative, feedback indicator 1804 generates an indication of negative feedback 1830 ("indication 1830" herein). Indication 1830 is a further example of indication 1608, as described with respect to FIG. 16.

Synthetic data generator 130 of FIG. 18 operates in various ways, in examples. For instance, as shown in FIG. 18, if feedback indicator 1804 generates indication 1824, indication 1824 is provided to syntax validator 1806. Syntax validator 1806 validates the QL query corresponding to indication 1824 (i.e., the QL query generated by language conversion engine 146). If the QL query is valid, syntax validator 1806 provides a validated query signal 1826 to synthetic data post-processor 1604. In this context, synthetic data post-processor 1604 post-processes the validated QL query and the NL query that the validated QL query was generated from (e.g., in a prompt provided to generative AI model 132 that caused generative AI model 132 to generate the validated QL query, as described elsewhere herein) to determine whether to include the pair in synthetic data 144. If synthetic data post-processor 1604 determines to include the pair in synthetic data 144 (e.g., by determining the pair satisfies synthetic data store criteria 1606), synthetic data post-processor 1604 stores the pair in synthetic data 144 via a storage signal 1846 comprising the pair. If syntax validator 1806 determines the QL query is invalid, syntax validator 1806 provides an invalid query signal 1828 to self-correction agent 1810. In this context, self-correction agent 1810 attempts to generate a corrected pair comprising a corrected QL query, in manners described elsewhere herein, and in particular with respect to FIGS. 20 and 21.

Figure 19:
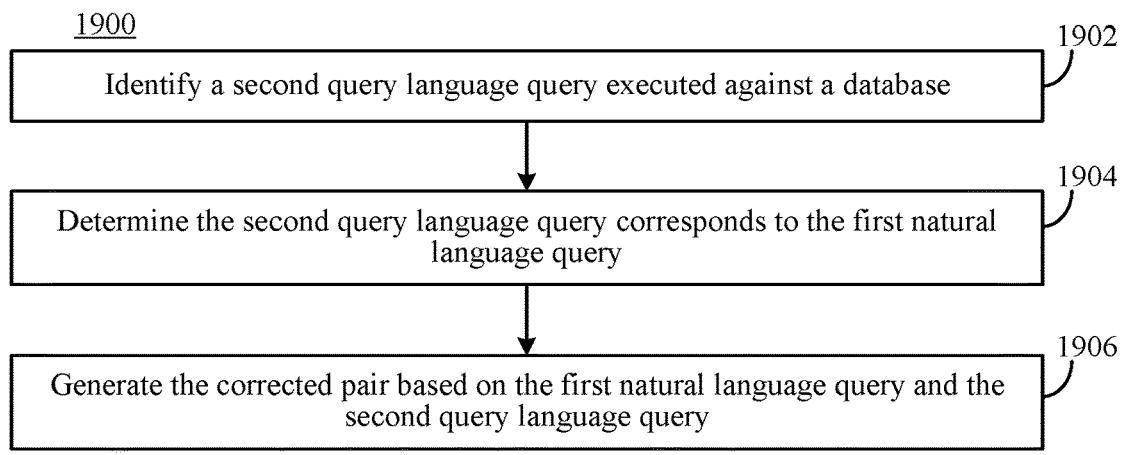
FIG. 19 shows a flowchart of a process for generating a corrected pair, in accordance with an example embodiment.

If feedback indicator 1804 generates indication 1830, indication 1830 is provided to pair corrector 1602. As discussed with respect to FIG. 16 and step 1704 of flowchart 1700 of FIG. 17, pair corrector 1602 is configured to generate a corrected pair (e.g., corrected pair 1610 of FIG. 16) in various ways, in examples. For instance, in some examples, pair corrector 1602 generates a corrected pair based on session telemetry 1818. To better illustrate this example operation of system 1800, FIG. 18 is described with respect to FIG. 19. FIG. 19 shows a flowchart 1900 of a process for generating a corrected pair, in accordance with an example embodiment. In accordance with an embodiment, system 1800 operates according to flowchart 1900. Note not all steps of flowchart 1900 need be performed in all embodiments. Further structural and operational embodiments will be apparent to persons skilled in the relevant art(s) based on the following description of FIG. 19 with respect to FIG. 18.

Flowchart 1900 begins with step 1902. In step 1902, a second query language query executed against a database is identified. For example, telemetry evaluator 1808 receives indication 1830 and session telemetry 1818. In accordance with an embodiment, telemetry evaluator 1808 (e.g., selectively) receives session telemetry 1818 corresponding to a timeframe (e.g., minutes, hours, a day, etc.) or a session in which the QL query that indication 1830 corresponds to was generated. For example, in accordance with an embodiment feedback 1820 comprises a session identifier (ID) for a session in which the QL query is generated. In this example embodiment, telemetry evaluator 1808 obtains a portion of session telemetry 1818 corresponding to the session ID. In an example, telemetry evaluator 1808 identifies one or more queries executed against database 114 during the session based on session telemetry 1818 and flow continues to step 1904. If telemetry evaluator 1808 fails to identify an executed query based on session telemetry 1818, telemetry evaluator 1808 provides an indication 1834 to self-correction agent 1810. In this context, indication 1834 indicates any information included in indication 1830 (e.g., the QL query for which negative feedback was received) and self-correction agent 1810 attempts to generate a corrected pair. Additional details regarding the operation of self-correction agent 1810 are described with respect to FIGS. 20 and 21, as well as elsewhere herein.

In step 1904, the second query language query is determined to correspond to the first natural language query. For example, telemetry evaluator 1808 determines a QL query identified in step 1902 corresponds to the NL query associated with feedback 1820 (i.e., the NL query that language conversion engine 146 generated the QL query with negative feedback (also referred to as the "incorrect QL query" herein) from. In examples, telemetry evaluator 1808 determines a QL query identified in step 1902 corresponds to the NL query based on a proximity in time in which the identity QL query was executed and the incorrect QL query was generated, measure of similarity in text of the NL query and the identified QL query, a measure of similarity in embeddings of the NL query and embeddings of the identified QL query, and/or in any other manner in which a QL query is determined to correspond to an NL query. If a QL query is determined to correspond to the NL query, flow continues to step 1906. If none of the identified QL queries are determined to correspond to the NL query, telemetry evaluator 1808 provides indication 1834 to self-correction 1810. In this context, indication 1834 indicates any information included in indication 1830 and self-correction agent 1810 attempts to generate a corrected pair, as described elsewhere herein.

In step 1906, the corrected pair is generated based on the first natural language query and the second query language query. For example, telemetry evaluator 1808 generates a corrected pair 1832 based on the NL query and the QL query determined to correspond to the NL query in step 1904. In some embodiments, telemetry evaluator 1808 determines in step 1904 that multiple QL queries (e.g., potentially) correspond to the NL query. In this context, telemetry evaluator 1808 in accordance with an embodiment generates multiple corrected pairs, each based on the NL query and a corresponding one of the multiple QL queries. Alternatively, telemetry evaluator 1808 selects the QL query with the greatest similarity (e.g., based on text matching or semantic matching of embeddings) to the NL query and generates corrected pair 1832 based on that QL query and the NL query.

As shown in FIG. 18, telemetry evaluator 1808 provides corrected pair 1832 to synthetic data post-processor 1604. Synthetic data post-processor 1604 determines if corrected pair 1832 satisfies synthetic data store criteria 1606 (e.g., in manners described with respect to step 1706 of flowchart 1700 of FIG. 17, or elsewhere herein) and, if so, stores corrected pair 1832 in synthetic data 144 via storage signal 1846. In accordance with an embodiment wherein telemetry evaluator 1808 generates multiple corrected pairs, synthetic data post-processor 1604 filters the multiple corrected pairs based on synthetic data store criteria 1606 and stores the (e.g., one, or multiple) filtered corrected pair(s) in synthetic data 144 via storage signal 1846.

Figure 20:
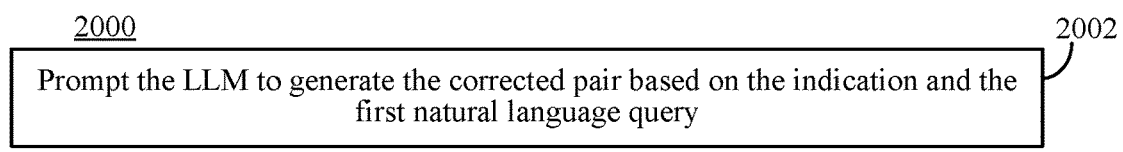
FIG. 20 shows a flowchart of a process for generating a corrected pair, in accordance with another example embodiment.

As described with respect to FIG. 18, pair corrector 1602 generates corrected pairs in various ways. For instance, self-correction agent 1810 operates in a manner to generate a corrected pair. In order to better understand the operation of self-correction agent 1810, FIG. 18 is further described with respect to FIG. 20. FIG. 20 shows a flowchart 2000 of a process for generating a corrected pair, in accordance with another example embodiment. In accordance with an embodiment, system 1800 operates according to flowchart 2000. Note flowchart 2000 need not be performed in all embodiments. Further structural and operational embodiments will be apparent to persons skilled in the relevant art(s) based on the following description of FIG. 20 with respect to FIG. 18.

In some embodiments, and as shown in FIG. 18, self-correction agent 1810 comprises eligibility verifier 1812. Eligibility verifier 1812 determines if an NL query is eligible to be converted to a QL query (e.g., based on synthetic data store criteria 1606 or other criteria). Additional details of eligibility verifier 1812 are described with respect to FIG. 22, as well as elsewhere herein. If the NL query is eligible for conversion, eligibility verifier 1812 provides an eligible query signal 1836 to prompter 1814 and the process proceeds to flowchart 2000 as described further herein.

Flowchart 2000 comprises step 2002. In step 2002, the LLM is prompted to generate the corrected pair based on the indication and the first natural language query. For example, prompter 1814 of FIG. 18 generates a prompt 1838 and provides the prompt to generative AI model 132 to cause generative AI model 132 to generate a corrected pair 1840 based on indication 1830 (and/or indication 1834 and/or invalidity query signal 1828) and the NL query, wherein corrected pair 1840 comprises the NL query and a corrected QL query generated by generative AI model 132. For instance, prompt 1838 in accordance with an embodiment indicates to generative AI model 132 that the incorrect QL query was an unsatisfactory conversion of the NL query. In accordance with an embodiment wherein feedback other than (or in addition to) binary feedback was provided for the incorrect QL query, prompt 1838 includes the feedback. For instance, in such examples, prompt 1838 comprises comments made by users, ratings left by users, and/or the like. In this manner, prompt 1838 provides additional context which generative AI model 132 considers in generation of corrected pair 1840.

As shown in FIG. 18, syntax evaluator 1816 receives corrected pair 1840 and determines if the corrected QL query of corrected pair 1840 is syntactically valid. If so, syntax evaluator 1816 provides a validated corrected pair 1842 (i.e., corrected pair 1840 post-validation, in this context) to synthetic data post-processor 1604. Synthetic data post-processor 1604 determines if validated corrected pair 1842 satisfies synthetic data store criteria 1606 and, if so, stores validated corrected pair 1842 in synthetic data 144 via storage signal 1846.

Figure 21:
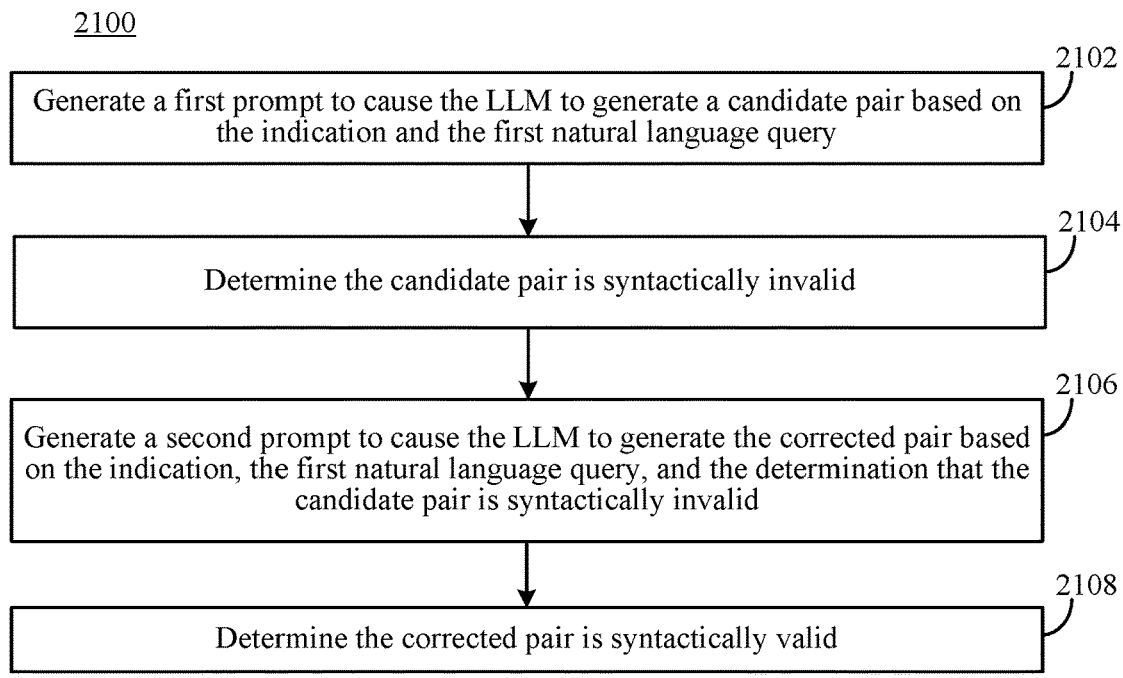
FIG. 21 shows a flowchart of a process for iteratively generating a corrected pair, in accordance with an example embodiment.

If syntax evaluator 1816 determines a corrected QL query is not syntactically valid, self-correction agent 1810 operates in various ways to attempt to regenerate a valid corrected QL query. To better understand such iterative attempts to generate a valid corrected QL query, FIG. 18 is further described with respect to FIG. 21. FIG. 21 shows a flowchart 2100 of a process for iteratively generating a corrected pair, in accordance with an example embodiment. In accordance with an embodiment, system 1800 operates according to flowchart 2100. Note not all steps of flowchart 2100 need be performed in all embodiments. Further structural and operational embodiments will be apparent to persons skilled in the relevant art(s) based on the following description of FIG. 21 with respect to FIG. 18.

Flowchart 2100 starts with step 2102. In step 2102, a first prompt to cause the LLM to generate a candidate pair based on the indication and the first natural language query is generated. For example, suppose prompter 1814 of FIG. 18 generates prompt 1838 and provides prompt 1838 to generative AI model 132 in a manner similar to that described with respect to flowchart 2000. In this context, generative AI model 132 provides corrected pair 1840 (which is referred to, in this example, as a "candidate pair 1840") to syntax evaluator 1816 and flow continues to step 2104.

In step 2104, the candidate pair is determined to be syntactically invalid. For example, suppose syntax evaluator 1816 of FIG. 18 determines candidate pair 1840 is syntactically invalid. In accordance with an embodiment, candidate pair 1840 is determined to be syntactically invalid if syntax evaluator 1816 is unable to successfully parse the corrected QL query (e.g., based on rules of the query language in which the QL query is generated for). As shown in FIG. 18, if candidate pair 1840 is syntactically invalid, syntax evaluator 1816 provides a retry signal 1844 to prompter 1814 and flow continues to step 2106.

In step 2106, a second prompt to cause the LLM to generate the corrected pair based on the indication, the first natural language query, and the determination that the candidate pair is syntactically invalid is generated. For example, prompter 1814 of FIG. 18 generates a second prompt (not shown in FIG. 18) and provides the second prompt to generative AI model 132 to cause generative AI model 132 to generate another corrected pair (not shown in FIG. 18) based on the indication (e.g., indication 1830, indication 1834, and/or invalid query signal 1828), the NL query, and retry signal 1844.

In step 2108, the corrected pair is determined to be syntactically valid. For example, syntax evaluator 1816 of FIG. 18 receives the another corrected pair generated by generative AI model 132 responsive to the second prompt generated in step 2106 and determines if the another corrected pair is syntactically valid. If the another corrected pair is syntactically valid, syntax evaluator 1816 provides the another corrected pair to synthetic data post-processor 1604 as valid corrected pair 1842. In this context, synthetic data post-processor 1604 determines if valid corrected pair 1842 satisfies synthetic data store criteria 1606 and, if so, stores valid corrected pair 1842 in synthetic data 144 via storage signal 1846.

If the another corrected pair is not syntactically valid, syntax evaluator 1816 provides another retry signal to prompter 1814 and the process of flowchart 2100 repeats. In some embodiments, each successive prompt generated by prompter 1814 includes indications of (e.g., any, some of, all of) previously generated candidate QL queries being invalid queries, the NL query, and information related to the indication (e.g., indication 1830, indication 1834, and/or invalid query signal 1828). In accordance with an embodiment, self-correction agent 1810 terminates the iterative attempts to generate a valid corrected pair if a valid corrected pair is not generated after a number of attempts. In examples, the number of attempts is a predetermined number (e.g., set by a developer of self-correction agent 1810, an administrator associated with self-correction agent 1810, an organizational policy associated with self-correction agent 1810, and/or the like), limited based on a backlog of feedback to evaluate being above a threshold, limited based on a resource usage limit (e.g., a number of times generative AI model 132 may be called in a particular session, a budget limit, and/or the like), limited based on the amount of time spent by self-correction agent 1810 attempting to generate a valid corrected pair, and/or determined in any other manner suitable for limiting the number of iterations self-correction agent 1810 attempts to generate a valid corrected pair, as described elsewhere herein and/or otherwise would be understood by a person ordinarily skilled in the relevant art(s) having benefit of this disclosure.

As shown in FIG. 18, self-correction agent 1810 comprises an eligibility verifier 1812. Eligibility verifier 1812 verifies an NL query is eligible to be converted to a QL query. Eligibility operates in various ways, in embodiments. For example, FIG. 22 shows a flowchart 2200 of a process for determining eligibility of a query, in accordance with another example embodiment. In accordance with an embodiment, eligibility evaluator 1812 operates according to flowchart 2200. Note flowchart 2200 need not be performed in all embodiments. Further structural and operational embodiments will be apparent to persons skilled in the relevant art(s) based on the following description of FIG. 22 with respect to FIG. 18.

Flowchart 2200 includes step 2202. In step 2202, the first natural language query is determined to be eligible to be converted based on at least one of a permission of a user account or an available table in a database. For example, eligibility verifier 1812 receives indication 1834 (or indication 1830) and/or invalid query signal 1828 and determines if the corresponding NL query is eligible to be converted into a QL query based on a permission of a user account and/or an available table in database 114. For instance, suppose a user is attempting to generate a QL query to execute with respect to a table of database 114. In this context, eligibility verifier 1812 determines the user's account has authorization to access data (and/or manipulate the data, depending on the type of query to be generated) of the table of database 114. If the user account has authorization, eligibility verifier 1812 generates eligible query signal 1836 and flow continues in a manner as described with respect to flowchart 2000 of FIG. 20. If the user account does not have authorization, eligibility verifier 1812 denies generation of a corrected pair for the NL query. By determining if the user account is authorized, access to data by unauthorized accounts or with respect to account permissions that do not have authorization is prevented. In this way, eligibility verifier 1812 prevents unauthorized users from generating synthetic data associated with queries they are unauthorized to execute, thereby preserving the quality of synthetic data. For instance, a malicious entity is unable to dilute the quality of synthetic data for a portion of database 114 they are otherwise unauthorized to access.

In another example, suppose the NL query references a particular table (or other structure of data of database 114). In this example, eligibility verifier 1812 determines if the NL query is eligible based on whether or not the table exists in database 114. If the table exists (e.g., and the user account is authorized to access it), eligibility verifier 1812 generates eligible query signal 1836 and flow continues in a manner as described with respect to flowchart 2000 of FIG. 20. If the table does not exist, eligibility verifier 1812 prevents generation of a corrected pair. In this manner, compute resources utilized by self-correction agent 1810 are reduced if a table (or other structure of database 114 referenced by the NL query) is not available in the database 114. Furthermore, compute resources utilized by generative AI model 132 are also reduced if the table (or other structure) is not available since self-correction agent 1810 does not prompt generative AI model 132 to generate a corrected pair if the table (or other structure) is not available.

As described herein, synthetic data post-processor 1604 of FIG. 16 post-processes corrected pairs generated by operation of syntax validator 1806 and/or pair corrector 1602 (and/or subcomponents thereof). Synthetic data post-processor 1604, in examples, comprises a query parser, a similarity evaluator, and/or a coverage evaluator, which operate in a similar manner as query parser 702, similarity evaluator 704, and coverage evaluator 706, as described with respect to FIG. 7 (as well as elsewhere herein). For instance, comprises logic that, when executed, parses corrected queries, evaluates similarities between corrected queries and existing dataset pairs, and evaluates coverage by existing dataset pairs and the corrected query, and/or the like. In some embodiments, synthetic data post-processor 1604 is configured to evaluate a corrected pair with respect to other synthetic data store criteria (e.g., in addition to or in lieu of parsing, evaluating similarity, and/or evaluating coverage). For example, FIG. 23 shows a block diagram of a system 2300 for evaluating a consistency of a corrected pair, in accordance with an example embodiment. As shown in FIG. 23, system 2300 comprises generative AI model 132, as described with respect to FIG. 1, and synthetic data post-processor 1604, as described with respect to FIG. 16. As also shown in FIG. 23, synthetic data post-processor 1604 comprises a consistency validator 2302 (comprising a consistency prompter 2304 and a consistency evaluator 2306), which is implemented as subservice/component of synthetic data post-processor 1604. Consistency validator 2302 evaluates a consistency in conversion of the NL query of a corrected pair to the corrected QL query of the corrected pair.

To better understand the operation of system 2300, FIG. 23 is described with respect to FIG. 24. FIG. 24 shows a flowchart 2400 of a process for evaluating a consistency of a corrected pair, in accordance with an example embodiment. In accordance with an embodiment, consistency validator 2302 operates according to flowchart 2400. Note not all steps of flowchart 2400 need be performed in all embodiments. Further structural and operational embodiments will be apparent to persons skilled in the relevant art(s) based on the following description of FIGS. 23 and 24.

Flowchart 2400 begins with step 2402. In step 2402, a prompt to cause the LLM to generate a candidate natural language query based on the corrected query language query is generated. In step 2402, consistency prompter 2304 generates a prompt 2310 to cause generative AI model 132 to generate a candidate NL query 2312 based on the corrected QL query. For example, suppose, as shown in FIG. 23, consistency prompter 2304 receives a corrected pair 2308 (which is a further embodiment of corrected pair 1610, corrected pair 1832, and/or validated corrected pair 1842, as described elsewhere herein). In this context, consistency prompter 2304 generates prompt 2310 from the QL query included in corrected pair 2308 (e.g., without including the NL query in prompt 2310, in some examples). In accordance with an embodiment, prompt 2310 comprises instructions to generate a natural language query from the QL query.

In step 2404, a similarity between the first natural language query and the candidate natural language query is determined to satisfy a consistency criteria. For example, consistency evaluator 2306 determines a similarity between the NL query of corrected pair 2308 and candidate NL query 2312. In accordance with an embodiment, consistency evaluator 2306 measures similarity between the NL query and candidate NL query 2312 based on text matching between the two queries. In accordance with another embodiment, consistency evaluator 2306 measures similarity between embeddings of the NL query and embeddings of candidate NL query 2312. In this context, embeddings of the NL query of corrected pair 2308 are obtained from language conversion engine 146 (e.g., in an implementation wherein language conversion engine 146 generated or otherwise obtained embeddings of the NL query), obtained utilizing embedding model 128 (e.g., in a manner similar to those described elsewhere herein), and/or the like. In implementations, consistency evaluator 2306 obtains embeddings of candidate NL query 2312 from generative AI model 132, utilizing embedding model 128, and/or the like. Examples of consistency criteria include, but are not limited to, a threshold to be satisfied by a measure of similarity between the NL query and the candidate NL query, a threshold to be satisfied by a difference in similarities between the queries, and/or the like. If consistency evaluator 2306 determines the similarity between the NL query and candidate NL query 2312 satisfies a consistency criteria, consistency evaluator 2306 generates consistent pair signal 2316. Alternatively, consistency evaluator 2306 stores the pair in synthetic data 144 (e.g., via storage signal 1846 of FIG. 18). In accordance with an embodiment, other components of synthetic data post-processor 1604 not shown in FIG. 23 (e.g., parsers, similarity evaluators, coverage evaluators, and/or the like) receive consistent pair signal 2316 and further post-process corrected pair 2308, as described elsewhere herein. In the manners described with respect to FIG. 24, embodiments of consistency validator 2302 improve the automatic generation of synthetic data based on negative customer feedback by reverse-engineering a corrected QL query to verify it is a contextually valid conversion of the NL query. In other words, consistency validator 2302 determines the corrected QL query aligns with the intended query language from the NL query.

Consistency validator 2302 is described with respect to flowchart 2400 of FIG. 24 as validating consistency of corrected pairs (e.g., generated by pair corrector 1602 of FIG. 16 and/or its subcomponents), however embodiments of consistency validators described herein are not so limited.

For example, in an alternative (or additional) embodiment, consistency validator 2302 determines a consistency between the QL query of valid query signal 1826. By validating consistency between QL queries that receive positive feedback from users, such embodiments of consistency validator 2302 verify the positively feedback QL query is a contextually valid conversion of the NL query. For instance, if a user incorrectly provided positive feedback, consistency validator 2302 determines a similarity between the NL query and a candidate NL query determined from the QL query does not satisfy consistency criteria and inclusion of the pair in synthetic data 144 is prevented.

Embodiments of consistency validator 2302 have been described with respect to system 1800 of FIG. 18, and in particular with respect to flowchart 2400 of FIG. 24, however embodiments of consistency validators described herein are not so limited. For instance, in accordance with an alternative (or additional) embodiment, consistency validator 2302 (or another consistency validator of synthetic data generator 130) validates a consistency of augmented pairs generated from dataset pairs (e.g., augmented pair 212 of FIG. 2, augmented pairs 710 of FIG. 7, and/or the like). In this context, consistency validator 2302 operates as part of the iterative filtering process described with respect to flowchart 800 of FIG. 8, as a single iteration post-processing process of augmented pair(s), and/or as a post-processing process independent of those described with respect to FIGS. 2, 4, and 7.

V. Embodiments for Query Generation

In examples, a language conversion engine, such as language conversion engine 146, selects synthetic data generated by synthetic data generator 130 to include in a prompt to generative AI model 132 to cause generative AI model 132 to generate a QL query. In these examples, the selected synthetic data provides additional context for the QL query to be generated through example conversions of similar natural language input to QL queries. In this manner, embodiments improve the quality of QL queries generated by generative AI model 132 and reduce the possibility of generative AI model 132 hallucinating during the query generation process.

Figure 25:
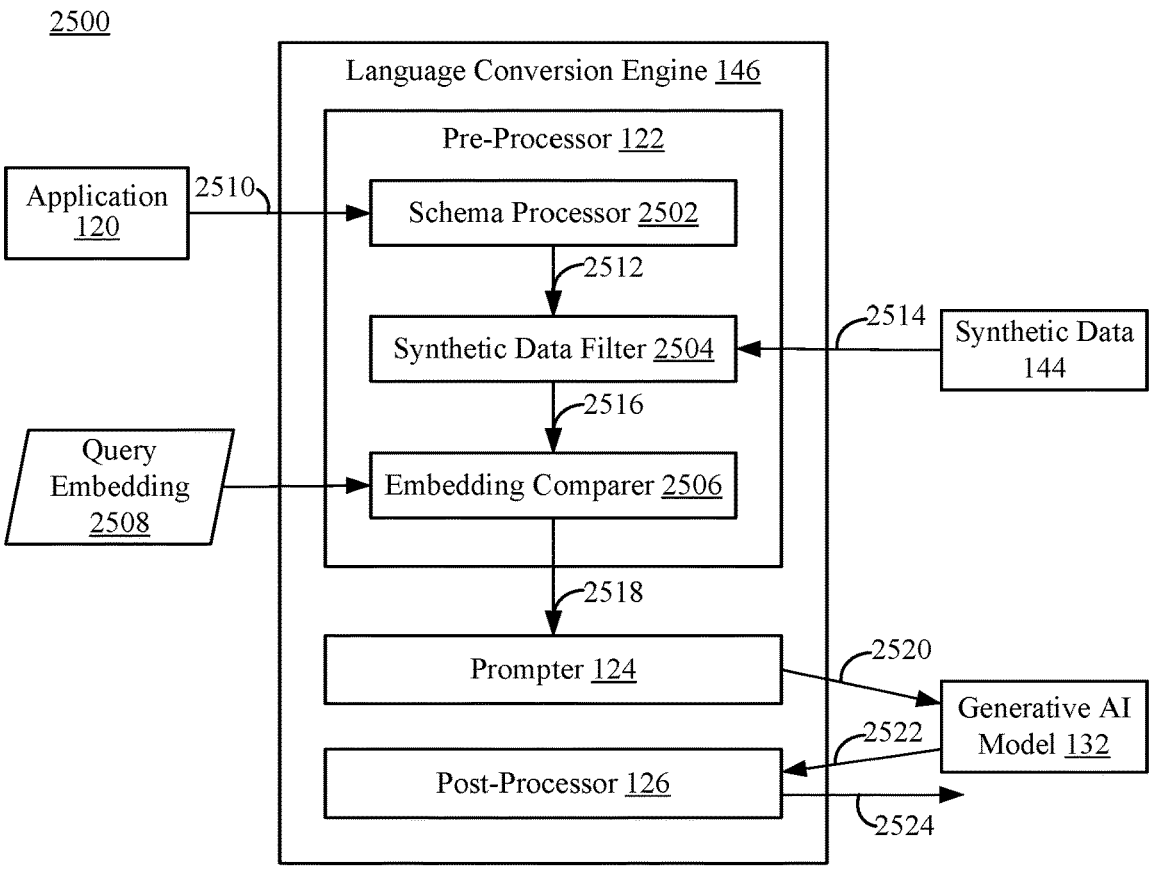
FIG. 25 shows a block diagram of a system for generating a query, in accordance with an example embodiment.

Example embodiments of language conversion engine 146 are configured in various ways to generate QL queries. For example, FIG. 25 shows a block diagram of a system 2500 for generating a query, in accordance with an example embodiment. As shown in FIG. 25, system 2500 comprises application 120, generative AI model 132, synthetic data 144, and language conversion engine 146 (comprising pre-processor 122, prompter 124, and post-processor 126), as described with respect to FIG. 1, and a query embedding 2508. As also shown in FIG. 25, pre-processor 122 comprises a schema processor 2502, a synthetic data filter 2504, and an embedding comparer 2506, each of which are implemented as components and/or subcomponents of pre-processor 122. System 2500 is described as follows.

Schema processor 2502 receives requests to generate QL queries and determines schema of database 114 associated with the request. For instance, as shown in FIG. 25, schema processor 2502 receives an NL query 2510 from application 120, wherein NL query 2510 is a request to generate a QL query based on the NL input of NL query 2510. Depending on the implementation, schema processor 2502 determines the schema based on information included with NL query 2510 (e.g., table names, column names, user account identifiers, etc.), text analysis of NL query 2510, and/or semantic similarities between NL query 2510 and embeddings of database 114 (not shown in FIG. 25) that describe a context of a particular portion of database 114. As shown IN FIG. 25, schema processor 2502 provides a schema signal 2512 to synthetic data filter 2504. Schema signal 2512, in embodiments, comprises NL query 2510, schema determined by schema processor 2502, and/or any information related to QL query generation provided to language conversion engine 146 (e.g., from application 120) and/or generated/determined by schema processor 2502.

Synthetic data filter 2504 filters synthetic data to determine a subset of synthetic data compatible with schema determined by schema processor 2502. For instance, as shown in FIG. 25, synthetic data filter 2504 receives schema signal 2512 from schema processor 2502, receives synthetic data 2514 (e.g., a subset or all) of synthetic data 144 (e.g., from storage 116 of FIG. 1), and generates filtered synthetic data 2516. In accordance with an embodiment, synthetic data filter 2504 selects pairs from synthetic data 2514 based on schema signal 2512 to generate filtered synthetic data 2516. In accordance with another embodiment, synthetic data filter 2504 removes pairs of synthetic data 2514 from consideration based on schema signal 2512 to generate filtered synthetic data 2516. In accordance with another embodiment, synthetic data filter 2504 selectively receives synthetic data 2514 based on schema signal 2512 (e.g., by searching synthetic data 144 for filtered synthetic data 2516 using schema of schema signal 2512 (or embeddings thereof) as an index). In accordance with an embodiment, filtered synthetic data 2516 comprises one or more pairs of synthetic data 2514 that are semantically similar to schema of schema signal 2512. For instance, in accordance with an embodiment, synthetic data filter 2504 generates filtered synthetic data based on (e.g., a comparison of, a measure of similarity between, and/or the like) embeddings of schema of schema signal 2512 and embeddings of synthetic data 2514. In accordance with an embodiment, embeddings of schema of schema signal 2512 are obtained by schema processor 2502, obtained from a data catalog, and/or obtained from an embedding model (e.g., by synthetic data filter 2504 utilizing embedding model 128 or by another component or subcomponent of system 2500 utilizing embedding model 128 of FIG. 1). In accordance with an embodiment, embeddings of synthetic data 2514 are stored as a portion of synthetic data 144 or obtained from an embedding model (e.g., by synthetic data filter 2504 utilizing embedding model 128 or by another component or subcomponent of system 2500 utilizing embedding model 128). As shown in FIG. 25, synthetic data filter 2504 provides filtered synthetic data 2516 to embedding comparer 2506.

Embedding comparer 2506 determines synthetic data to include in a prompt to generative AI model 132 based on embeddings of an NL query. As shown in FIG. 25, embedding comparer 2506 receives filtered synthetic data 2516 from synthetic data filter 2504, receives query embedding 2508, and generates pre-processed signal 2518. In embodiments, query embedding 2508 describes a semantic context of NL query 2510. In accordance with an embodiment, query embedding 2508 is obtained utilizing embedding model 128. In accordance with an embodiment, embedding comparer 2506 selects pairs from filtered synthetic data 2516 that are semantically similar to NL query 2510. For instance, embedding comparer 2506, in examples, selects the pairs based on a measure of similarity between query embedding 2508 and respective embeddings of the pairs. Additional details of comparing query embedding 2508 and embeddings of pairs are described with respect to FIG. 27, as well as elsewhere herein. In examples, pre-process signal 2518 comprises the semantically similar pairs, NL query 2510, and/or any other information determined by pre-processor 122 for use in generating a prompt to generative AI model 132.

Prompter 124 generates prompts to cause generative AI model 132 to generate QL queries. As shown in FIG. 25, prompter 124 receives pre-processed signal 2518 and generates a prompt 2520 based on pre-processed signal 2518. In other words, prompter comparer 2506, schema information determined by schema processor 2502, and/or any other information included in pre-processed signal 2518. In accordance with an embodiment, prompter 124 includes a list of best practices for a query language in prompt 2520.

Generative AI model 132 generates QL queries from natural language based on prompts to generate QL queries. For example, as shown in FIG. 25, generative AI model 132 receives prompt 2520 and generates a QL query 2522 based on the prompt. In this context, QL query 2522 is a conversion of NL query 2510 to a query language suitable for use by database engine 134 of FIG. 1 in executing against database 114.

Post-processor 126 performs post-processing operations on QL queries generated by generative AI model 132. For example, post-processor 126 receives QL query 2522, performs post-processing operations on QL query 2522, and generates a response 2524 comprising the processed QL query. In accordance with an embodiment, post-processor 126 provides response 2524 to application 120. In an alternative embodiment, post-processor provides response 2524 to database engine 134 of FIG. 1 for execution of the processed QL query. Example post-processing applications include, but are not limited to, parsing QL query 2522, repairing QL query 2522, generating a request for user feedback with respect to QL query 2522, causing display of a request or window for providing user feedback in a UI of application 120 or another user device/application.

Figure 26:
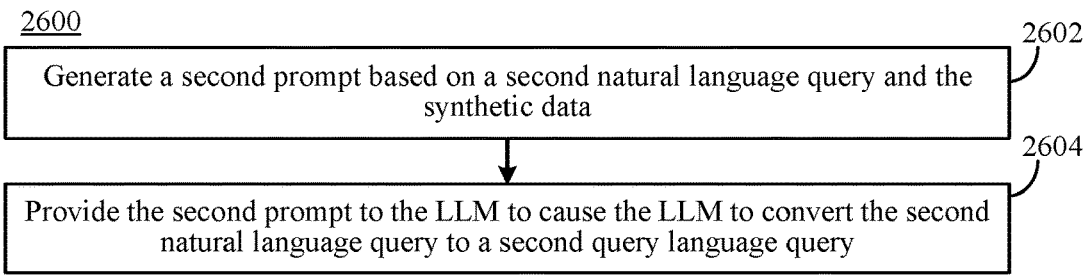
FIG. 26 shows a flowchart of a process for generating a query, in accordance with an example embodiment.

As described herein, examples of prompter 124 of FIG. 25 operates in various ways to generate prompts to cause generative AI model 132 to generate a QL query from a NL query (or other NL input). For example, FIG. 26 shows a flowchart 1500 of a process for generating a query, in accordance with an example embodiment. In accordance with an embodiment, prompter 124 operates according to flowchart 2600. Note not all steps of flowchart 2600 need be performed in all embodiments. Further structural and operational embodiments will be apparent to persons skilled in the relevant art(s) based on the following description of FIG. 26 with respect to FIG. 25.

Flowchart 2600 begins with step 2602. In step 2602, a second prompt is generated based on a second natural language query and synthetic data. For example, as described with respect to FIG. 25, prompter 124 generates a prompt 2520 based on NL query 2510 and synthetic data selected by embedding comparer 2506.

In step 2604, the second prompt is provided to an LLM to cause the LLM to convert the second natural language query to a second query language query. For example, as described with respect to FIG. 25, prompter 124 provides prompt 2520 to generative AI model 132 to cause generative AI model 132 to convert NL query 2510 (included in prompt 2520) to a QL query 2522.

Figure 27:
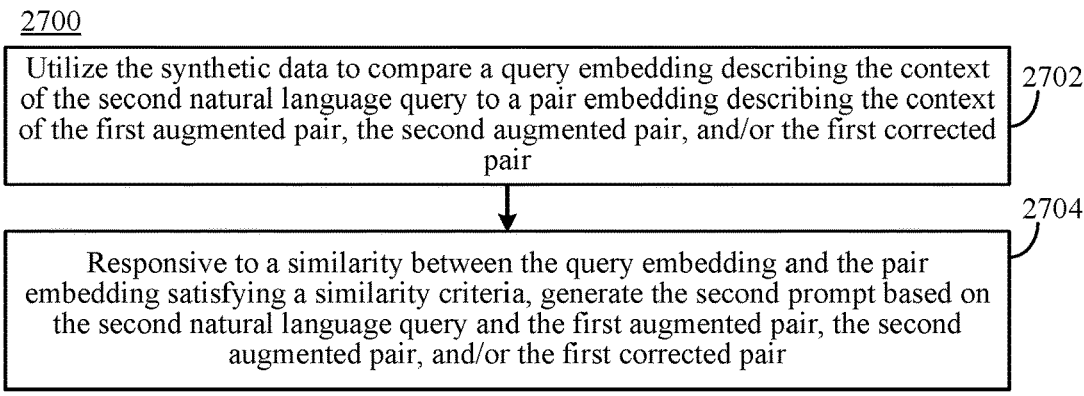
FIG. 27 shows a flowchart of a process for pre-processing a prompt to a generative AI model, in accordance with an example embodiment.

As described herein, examples of pre-processor 122 selects synthetic data and prompter 124 of FIG. 25 generates prompt based on the selected synthetic data in various ways. For instance, FIG. 27 shows a flowchart 2700 of a process for pre-processing a prompt to a generative AI model, in accordance with an example embodiment. In accordance with an embodiment, language conversion engine 146 of FIG. 25 operates according to flowchart 2700. Note not all steps of flowchart 2700 need be performed in all embodiments. Further structural and operational embodiments will be apparent to persons skilled in the relevant art(s) based on the following description of FIG. 27 with respect to FIG. 25.

Flowchart 2700 begins with step 2702. In step 2702, synthetic is utilized to compare a query embedding describing the context of the second natural language query to a pair embedding describing the context of the first augmented pair, the second augmented pair, and/or the first corrected pair. For example, as described with respect to FIG. 25, embedding comparer 2506 compares query embedding 2508 to a pair embedding describing a context of a (e.g., augmented or corrected) pair of synthetic data 144 (e.g., or filtered synthetic data 2516, in embodiments that include synthetic data filter 2504).

Step 2704 in accordance with an embodiment is a further step of step 2604 of flowchart 2600 of FIG. 26. In step 2704, responsive to a similarity between the query embedding and the pair embedding satisfying a similarity criteria, the second prompt is generated based on the second natural language query and the first augmented pair, the second augmented pair, and/or the first corrected pair. For example, as described with respect to FIG. 25, prompter 124 generates prompt 2520 based on NL query 2510 and pairs included in pre-processed signal 2518.

VI. Example Computer System Implementation

Embodiments of synthetic data generation described herein are implemented in hardware, or hardware combined with one or both of software and/or firmware. For example, system 100, computing device 102, conversion server 104, embeddings server 106, synthetic data server 108, model server 110, engine server 112, database 114, storage 116, embedding model 128, synthetic data generator 130, generative AI model 132, database engine 134, language conversion 146, system 200, system 400, system 700, system 1300, system 1600, system 1800, system 2300, system 2500, and/or the components described therein, and/or the steps of flowcharts 300, 500, 600, 800, 900, 1000, 1100, 1200, 1400, 1700, 1900, 2000, 2100, 2200, 2400, 2600, and/or 2700, are each implemented as computer program code/instructions configured to be executed in one or more processors and stored in a computer readable storage medium. Alternatively, embedding model 128, synthetic data generator 130, generative AI model 132, database engine 134, language conversion 146, system 200, system 400, system 700, system 1300, system 1600, system 1800, system 2300, system 2500, and/or the components described therein, and/or the steps of flowcharts 300, 500, 600, 800, 900, 1000, 1100, 1200, 1400, 1700, 1900, 2000, 2100, 2200, 2400, 2600, and/or 2700 are implemented in one or more SoCs (system on chip). An SoC includes an integrated circuit chip that includes one or more of a processor (e.g., a central processing unit (CPU), microcontroller, microprocessor, digital signal processor (DSP), etc.), memory, one or more communication interfaces, and/or further circuits, and optionally executes received program code and/or include embedded firmware to perform functions.

Figure 28:
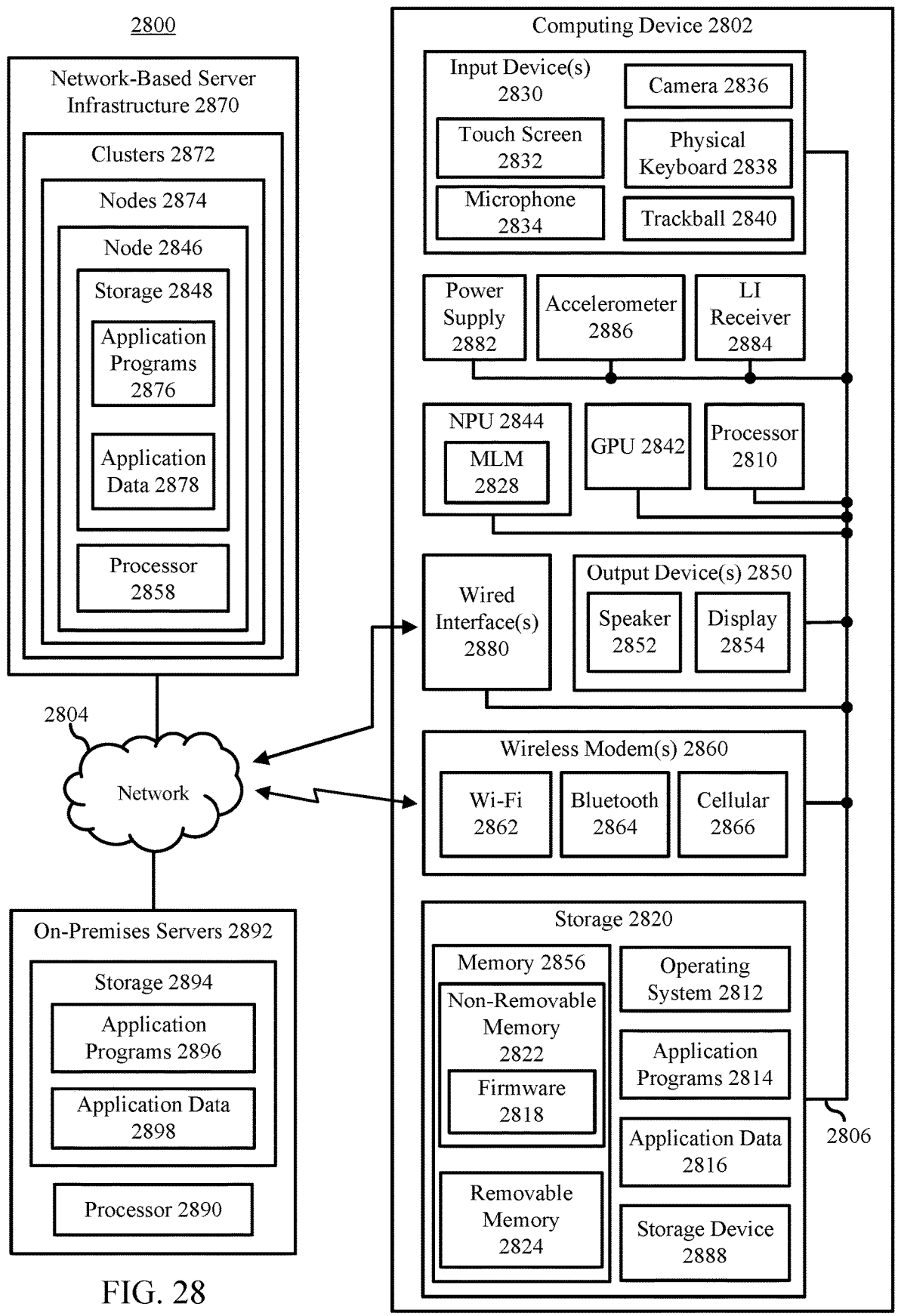
FIG. 28 shows a block diagram of an example computing environment in which embodiments may be implemented.

Embodiments disclosed herein can be implemented in one or more computing devices that are mobile (a mobile device) and/or stationary (a stationary device) and include any combination of the features of such mobile and stationary computing devices. Examples of computing devices in which embodiments are implementable are described as follows with respect to FIG. 28. FIG. 28 shows a block diagram of an exemplary computing environment 2800 that includes a computing device 2802. Computing device 2802 is an example of computing device 102, conversion server 104, embeddings server 106, synthetic data server 108, model server 110, and/or engine server 112, which each include one or more of the components of computing device 2802. In some embodiments, computing device 2802 is communicatively coupled with devices (not shown in FIG. 28) external to computing environment 2800 via network 2804. Network 2804 is an example of network 118. Network 2804 comprises one or more networks such as local area networks (LANs), wide area networks (WANs), enterprise networks, the Internet, etc. In examples, network 2804 includes one or more wired and/or wireless portions. In some examples, network 2804 additionally or alternatively includes a cellular network for cellular communications. Computing device 2802 is described in detail as follows.

Computing device 2802 can be any of a variety of types of computing devices. Examples of computing device 2802 include a mobile computing device such as a handheld computer (e.g., a personal digital assistant (PDA)), a laptop computer, a tablet computer, a hybrid device, a notebook computer, a netbook, a mobile phone (e.g., a cell phone, a smart phone, etc.), a wearable computing device (e.g., a head-mounted augmented reality and/or virtual reality device including smart glasses), or other type of mobile computing device. In an alternative example, computing device 2802 is a stationary computing device such as a desktop computer, a personal computer (PC), a stationary server device, a minicomputer, a mainframe, a supercomputer, etc.

As shown in FIG. 28, computing device 2802 includes a variety of hardware and software components, including a processor 2810, a storage 2820, a graphics processing unit (GPU) 2842, a neural processing unit (NPU) 2844, one or more input devices 2830, one or more output devices 2850, one or more wireless modems 2860, one or more wired interfaces 2880, a power supply 2882, a location information (LI) receiver 2884, and an accelerometer 2886. Storage 2820 includes memory 2856, which includes non-removable memory 2822 and removable memory 2824, and a storage device 2888. Storage 2820 also stores an operating system 2812, application programs 2814, and application data 2816. Wireless modem(s) 2860 include a Wi-Fi modem 2862, a Bluetooth modem 2864, and a cellular modem 2866. Output device(s) 2850 includes a speaker 2852 and a display 2854. Input device(s) 2830 includes a touch screen 2832, a microphone 2834, a camera 2836, a physical keyboard 2838, and a trackball 2840. Not all components of computing device 2802 shown in FIG. 28 are present in all embodiments, additional components not shown may be present, and in a particular embodiment any combination of the components are present. In examples, components of computing device 2802 are mounted to a circuit card (e.g., a motherboard) of computing device 2802, integrated in a housing of computing device 2802, or otherwise included in computing device 2802. The components of computing device 2802 are described as follows.

In embodiments, a single processor 2810 (e.g., central processing unit (CPU), microcontroller, a microprocessor, signal processor, ASIC (application specific integrated circuit), and/or other physical hardware processor circuit) or multiple processors 2810 are present in computing device 2802 for performing such tasks as program execution, signal coding, data processing, input/output processing, power control, and/or other functions. In examples, processor 2810 is a single-core or multi-core processor, and each processor core is single-threaded or multithreaded (to provide multiple threads of execution concurrently). Processor 2810 is configured to execute program code stored in a computer readable medium, such as program code of operating system 2812 and application programs 2814 stored in storage 2820. The program code is structured to cause processor 2810 to perform operations, including the processes/methods disclosed herein. Operating system 2812 controls the allocation and usage of the components of computing device 2802 and provides support for one or more application programs 2814 (also referred to as "applications" or "apps"). In examples, application programs 2814 include common computing applications (e.g., e-mail applications, calendars, contact managers, web browsers, messaging applications), further computing applications (e.g., word processing applications, mapping applications, media player applications, productivity suite applications), one or more machine learning (ML) models, as well as applications related to the embodiments disclosed elsewhere herein. In examples, processor(s) 2810 includes one or more general processors (e.g., CPUs) configured with or coupled to one or more hardware accelerators, such as one or more NPUs 2844 and/or one or more GPUs 2842.

Any component in computing device 2802 can communicate with any other component according to function, although not all connections are shown for ease of illustration. For instance, as shown in FIG. 28, bus 2806 is a multiple signal line communication medium (e.g., conductive traces in silicon, metal traces along a motherboard, wires, etc.) present to communicatively couple processor 2810 to various other components of computing device 2802, although in other embodiments, an alternative bus, further buses, and/or one or more individual signal lines is/are present to communicatively couple components. Bus 2806 represents one or more of any of several types of bus structures, including a memory bus or memory controller, a peripheral bus, an accelerated graphics port, and a processor or local bus using any of a variety of bus architectures.

Storage 2820 is physical storage that includes one or both of memory 2856 and storage device 2888, which store operating system 2812, application programs 2814, and application data 2816 according to any distribution. Non-removable memory 2822 includes one or more of RAM (random access memory), ROM (read only memory), flash memory, a solid-state drive (SSD), a hard disk drive (e.g., a disk drive for reading from and writing to a hard disk), and/or other physical memory device type. In examples, non-removable memory 2822 includes main memory and is separate from or fabricated in a same integrated circuit as processor 2810. As shown in FIG. 28, non-removable memory 2822 stores firmware 2818 that is present to provide low-level control of hardware. Examples of firmware 2818 include BIOS (Basic Input/Output System, such as on personal computers) and boot firmware (e.g., on smart phones). In examples, removable memory 2824 is inserted into a receptacle of or is otherwise coupled to computing device 2802 and can be removed by a user from computing device 2802. Removable memory 2824 can include any suitable removable memory device type, including an SD (Secure Digital) card, a Subscriber Identity Module (SIM) card, which is well known in GSM (Global System for Mobile Communications) communication systems, and/or other removable physical memory device type. In examples, one or more of storage device 2888 are present that are internal and/or external to a housing of computing device 2802 and are or are not removable. Examples of storage device 2888 include a hard disk drive, a SSD, a thumb drive (e.g., a USB (Universal Serial Bus) flash drive), or other physical storage device.

One or more programs are stored in storage 2820. Such programs include operating system 2812, one or more application programs 2814, and other program modules and program data. Examples of such application programs include computer program logic (e.g., computer program code/instructions) for implementing database 114, application 120, pre-processor 122, prompter 124, post-processor 126, embedding model 128, synthetic data generator 130, generative AI model 132, database engine 134, language conversion 146, prompt generator 202, synthetic data post-processor 204, pair queue 402, embedding model interface 404, catalog predictor 406, query parser 702, similarity evaluator 704, coverage evaluator 706, pair corrector 1602, synthetic data post-processor 1604, feedback pre-processor 1802, feedback indicator 1804, syntax validator 1806, telemetry evaluator 1808, self-correction agent 1810, eligibility verifier 1812, prompter 1814, syntax evaluator 1816, consistency validator 2302, consistency prompter 2304, consistency evaluator 2306, schema processor 2502, synthetic data filter 2504, embedding comparer 2506, and/or each of the components described therein, as well as any of flowcharts 300, 500, 600, 800, 900, 1000, 1100, 1200, 1400, 1700, 1900, 2000, 2100, 2200, 2400, 2600, and/or 2700, and/or any individual steps thereof.

Storage 2820 also stores data used and/or generated by operating system 2812 and application programs 2814 as application data 2816. Examples of application data 2816 include web pages, text, images, tables, sound files, video data, and other data. In examples, application data 2816 is sent to and/or received from one or more network servers or other devices via one or more wired or wireless networks. Storage 2820 can be used to store further data including a subscriber identifier, such as an International Mobile Subscriber Identity (IMSI), and an equipment identifier, such as an International Mobile Equipment Identifier (IMEI). Such identifiers can be transmitted to a network server to identify users and equipment.

In examples, a user enters commands and information into computing device 2802 through one or more input devices 2830 and receives information from computing device 2802 through one or more output devices 2850. Input device(s) 2830 includes one or more of touch screen 2832, microphone 2834, camera 2836, physical keyboard 2838 and/or trackball 2840 and output device(s) 2850 includes one or more of speaker 2852 and display 2854. Each of input device(s) 2830 and output device(s) 2850 are integral to computing device 2802 (e.g., built into a housing of computing device 2802) or are external to computing device 2802 (e.g., communicatively coupled wired or wirelessly to computing device 2802 via wired interface(s) 2880 and/or wireless modem(s) 2860). Further input devices 2830 (not shown) can include a Natural User Interface (NUI), a pointing device (computer mouse), a joystick, a video game controller, a scanner, a touch pad, a stylus pen, a voice recognition system to receive voice input, a gesture recognition system to receive gesture input, or the like. Other possible output devices (not shown) can include piezoelectric or other haptic output devices. Some devices can serve more than one input/output function. For instance, display 2854 displays information, as well as operating as touch screen 2832 by receiving user commands and/or other information (e.g., by touch, finger gestures, virtual keyboard, etc.) as a user interface. Any number of each type of input device(s) 2830 and output device(s) 2850 are present, including multiple microphones 2834, multiple cameras 2836, multiple speakers 2852, and/or multiple displays 2854.

In embodiments where GPU 2842 is present, GPU 2842 includes hardware (e.g., one or more integrated circuit chips that implement one or more of processing cores, multiprocessors, compute units, etc.) configured to accelerate computer graphics (two-dimensional (2D) and/or three-dimensional (3D)), perform image processing, and/or execute further parallel processing applications (e.g., training of neural networks, etc.). Examples of GPU 2842 perform calculations related to 3D computer graphics, include 2D acceleration and framebuffer capabilities, accelerate memory-intensive work of texture mapping and rendering polygons, accelerate geometric calculations such as the rotation and translation of vertices into different coordinate systems, support programmable shaders that manipulate vertices and textures, perform oversampling and interpolation techniques to reduce aliasing, and/or support very high-precision color spaces.

In examples, NPU 2844 (also referred to as an "artificial intelligence (AI) accelerator" or "deep learning processor (DLP)") is a processor or processing unit configured to accelerate artificial intelligence and machine learning applications, such as execution of machine learning (ML) model (MLM) 2828. In an example, NPU 2844 is configured for a data-driven parallel computing and is highly efficient at processing massive multimedia data such as videos and images and processing data for neural networks. NPU 2844 is configured for efficient handling of AI-related tasks, such as speech recognition, background blurring in video calls, photo or video editing processes like object detection, etc.

In embodiments disclosed herein that implement ML models, NPU 2844 can be utilized to execute such ML models, of which MLM 2828 is an example. In accordance with an embodiment, MLM 2828 is a further example of embedding model 128 and/or generative AI model 132. For instance, where applicable, MLM 2828 is a generative AI model that generates content that is complex, coherent, and/or original. For instance, a generative AI model can create sophisticated sentences, lists, ranges, tables of data, images, essays, and/or the like. An example of a generative AI model is a language model. A language model is a model that estimates the probability of a token or sequence of tokens occurring in a longer sequence of tokens. In this context, a "token" is an atomic unit that the model is training on and making predictions on. Examples of a token include, but are not limited to, a word, a character (e.g., an alpha-numeric character, a blank space, a symbol, etc.), a sub-word (e.g., a root word, a prefix, or a suffix). In other types of models (e.g., image based models) a token may represent another kind of atomic unit (e.g., a subset of an image). Examples of language models applicable to embodiments herein include large language models (LLMs), text-to-image AI image generation systems, text-to-video AI generation systems, etc. A large language model (LLM) is a language model that has a high number of model parameters. In examples, an LLM has millions, billions, trillions, or even greater numbers of model parameters. Model parameters of an LLM are the weights and biases the model learns during training. Some implementations of LLMs are transformer-based LLMs (e.g., the family of generative pre-trained transformer (GPT) models). A transformer is a neural network architecture that relies on self-attention mechanisms to transform a sequence of input embeddings into a sequence of output embeddings (e.g., without relying on convolutions or recurrent neural networks).

In further examples, NPU 2844 is used to train MLM 2828. To train MLM 2828, training data is that includes input features (attributes) and their corresponding output labels/target values (e.g., for supervised learning) is collected. A training algorithm is a computational procedure that is used so that MLM 2828 learns from the training data. Parameters/weights are internal settings of MLM 2828 that are adjusted during training by the training algorithm to reduce a difference between predictions by MLM 2828 and actual outcomes (e.g., output labels). In some examples, MLM 2828 is set with initial values for the parameters/weights. A loss function measures a dissimilarity between predictions by MLM 2828 and the target values, and the parameters/weights of MLM 2828 are adjusted to minimize the loss function. The parameters/weights are iteratively adjusted by an optimization technique, such as gradient descent. In this manner, MLM 2828 is generated through training by NPU 2844 to be used to generate inferences based on received input feature sets for particular applications. MLM 2828 is generated as a computer program or other type of algorithm configured to generate an output (e.g., a classification, a prediction/inference) based on received input features, and is stored in the form of a file or other data structure.

In examples, such training of MLM 2828 by NPU 2844 is supervised or unsupervised. According to supervised learning, input objects (e.g., a vector of predictor variables) and a desired output value (e.g., a human-labeled supervisory signal) train MLM 2828. The training data is processed, building a function that maps new data on expected output values. Example algorithms usable by NPU 2844 to perform supervised training of MLM 2828 in particular implementations include support-vector machines, linear regression, logistic regression, Naïve Bayes, linear discriminant analysis, decision trees, K-nearest neighbor algorithm, neural networks, and similarity learning.

In an example of supervised learning where MLM 2828 is an LLM, MLM 2828 can be trained by exposing the LLM to (e.g., large amounts of) text (e.g., predetermined datasets, books, articles, text-based conversations, webpages, transcriptions, forum entries, and/or any other form of text and/or combinations thereof). In examples, training data is provided from a database, from the Internet, from a system, and/or the like. Furthermore, an LLM can be fine-tuned using Reinforcement Learning with Human Feedback (RLHF), where the LLM is provided the same input twice and provides two different outputs and a user ranks which output is preferred. In this context, the user's ranking is utilized to improve the model. Further still, in example embodiments, an LLM is trained to perform in various styles, e.g., as a completion model (a model that is provided a few words or tokens and generates words or tokens to follow the input), as a conversation model (a model that provides an answer or other type of response to a conversation-style prompt), as a combination of a completion and conversation model, or as another type of LLM model.

According to unsupervised learning, MLM 2828 is trained to learn patterns from unlabeled data. For instance, in embodiments where MLM 2828 implements unsupervised learning techniques, MLM 2828 identifies one or more classifications or clusters to which an input belongs. During a training phase of MLM 2828 according to unsupervised learning, MLM 2828 tries to mimic the provided training data and uses the error in its mimicked output to correct itself (i.e., correct weights and biases). In further examples, NPU 2844 perform unsupervised training of MLM 2828 according to one or more alternative techniques, such as Hopfield learning rule, Boltzmann learning rule, Contrastive Divergence, Wake Sleep, Variational Inference, Maximum Likelihood, Maximum A Posteriori, Gibbs Sampling, and backpropagating reconstruction errors or hidden state reparameterizations.

Note that NPU 2844 need not necessarily be present in all ML model embodiments. In embodiments where ML models are present, any one or more of processor 2810, GPU 2842, and/or NPU 2844 can be present to train and/or execute MLM 2828.

One or more wireless modems 2860 can be coupled to antenna(s) (not shown) of computing device 2802 and can support two-way communications between processor 2810 and devices external to computing device 2802 through network 2804, as would be understood to persons skilled in the relevant art(s). Wireless modem 2860 is shown generically and can include a cellular modem 2866 for communicating with one or more cellular networks, such as a GSM network for data and voice communications within a single cellular network, between cellular networks, or between the mobile device and a public switched telephone network (PSTN). In examples, wireless modem 2860 also or alternatively includes other radio-based modem types, such as a Bluetooth modem 2864 (also referred to as a "Bluetooth device") and/or Wi-Fi modem 2862 (also referred to as an "wireless adaptor"). Wi-Fi modem 2862 is configured to communicate with an access point or other remote Wi-Fi-capable device according to one or more of the wireless network protocols based on the IEEE (Institute of Electrical and Electronics Engineers) 802.11 family of standards, commonly used for local area networking of devices and Internet access. Bluetooth modem 2864 is configured to communicate with another Bluetooth-capable device according to the Bluetooth short-range wireless technology standard(s) such as IEEE 802.15.1 and/or managed by the Bluetooth Special Interest Group (SIG).

Computing device 2802 can further include power supply 2882, LI receiver 2884, accelerometer 2886, and/or one or more wired interfaces 2880. Example wired interfaces 2880 include a USB port, IEEE 1394 (FireWire) port, a RS-232 port, an HDMI (High-Definition Multimedia Interface) port (e.g., for connection to an external display), a DisplayPort port (e.g., for connection to an external display), an audio port, and/or an Ethernet port, the purposes and functions of each of which are well known to persons skilled in the relevant art(s). Wired interface(s) 2880 of computing device 2802 provide for wired connections between computing device 2802 and network 2804, or between computing device 2802 and one or more devices/peripherals when such devices/peripherals are external to computing device 2802 (e.g., a pointing device, display 2854, speaker 2852, camera 2836, physical keyboard 2838, etc.). Power supply 2882 is configured to supply power to each of the components of computing device 2802 and receives power from a battery internal to computing device 2802, and/or from a power cord plugged into a power port of computing device 2802 (e.g., a USB port, an A/C power port). LI receiver 2884 is useable for location determination of computing device 2802 and in examples includes a satellite navigation receiver such as a Global Positioning System (GPS) receiver and/or includes other type of location determiner configured to determine location of computing device 2802 based on received information (e.g., using cell tower triangulation, etc.). Accelerometer 2886, when present, is configured to determine an orientation of computing device 2802.

Note that the illustrated components of computing device 2802 are not required or all-inclusive, and fewer or greater numbers of components can be present as would be recognized by one skilled in the art. In examples, computing device 2802 includes one or more of a gyroscope, barometer, proximity sensor, ambient light sensor, digital compass, etc. In an example, processor 2810 and memory 2856 are co-located in a same semiconductor device package, such as being included together in an integrated circuit chip, FPGA, or system-on-chip (SOC), optionally along with further components of computing device 2802.

In embodiments, computing device 2802 is configured to implement any of the above-described features of flowcharts herein. Computer program logic for performing any of the operations, steps, and/or functions described herein is stored in storage 2820 and executed by processor 2810.

In some embodiments, server infrastructure 2870 is present in computing environment 2800 and is communicatively coupled with computing device 2802 via network 2804. Server infrastructure 2870, when present, is a network-accessible server set (e.g., a cloud-based environment or platform). As shown in FIG. 28, server infrastructure 2870 includes clusters 2872. Each of clusters 2872 comprises a group of one or more compute nodes and/or a group of one or more storage nodes. For example, as shown in FIG. 28, cluster 2872 includes nodes 2874. Each of nodes 2874 are accessible via network 2804 (e.g., in a "cloud-based" embodiment) to build, deploy, and manage applications and services. In examples, any of nodes 2874 is a storage node that comprises a plurality of physical storage disks, SSDs, and/or other physical storage devices that are accessible via network 2804 and are configured to store data associated with the applications and services managed by nodes 2874.

Each of nodes 2874, as a compute node, comprises one or more server computers, server systems, and/or computing devices. For instance, a node 2874 in accordance with an embodiment includes one or more of the components of computing device 2802 disclosed herein. Each of nodes 2874 is configured to execute one or more software applications (or "applications") and/or services and/or manage hardware resources (e.g., processors, memory, etc.), which are utilized by users (e.g., customers) of the network-accessible server set. In examples, as shown in FIG. 28, nodes 2874 includes a node 2846 that includes storage 2848 and/or one or more of a processor 2858 (e.g., similar to processor 2810, GPU 2842, and/or NPU 2844 of computing device 2802). Storage 2848 stores application programs 2876 and application data 2878. Processor(s) 2858 operate application programs 2876 which access and/or generate related application data 2878. In an implementation, nodes such as node 2846 of nodes 2874 operate or comprise one or more virtual machines, with each virtual machine emulating a system architecture (e.g., an operating system), in an isolated manner, upon which applications such as application programs 2876 are executed.

In embodiments, one or more of clusters 2872 are located/co-located (e.g., housed in one or more nearby buildings with associated components such as backup power supplies, redundant data communications, environmental controls, etc.) to form a datacenter, or are arranged in other manners. Accordingly, in an embodiment, one or more of clusters 2872 are included in a datacenter in a distributed collection of datacenters. In embodiments, exemplary computing environment 2800 comprises part of a cloud-based platform.

In an embodiment, computing device 2802 accesses application programs 2876 for execution in any manner, such as by a client application and/or a browser at computing device 2802.

In an example, for purposes of network (e.g., cloud) backup and data security, computing device 2802 additionally and/or alternatively synchronizes copies of application programs 2814 and/or application data 2816 to be stored at network-based server infrastructure 2870 as application programs 2876 and/or application data 2878. In examples, operating system 2812 and/or application programs 2814 include a file hosting service client configured to synchronize applications and/or data stored in storage 2820 at network-based server infrastructure 2870.

In some embodiments, on-premises servers 2892 are present in computing environment 2800 and are communicatively coupled with computing device 2802 via network 2804. On-premises servers 2892, when present, are hosted within an organization's infrastructure and, in many cases, physically onsite of a facility of that organization. On-premises servers 2892 are controlled, administered, and maintained by IT (Information Technology) personnel of the organization or an IT partner to the organization. Application data 2898 can be shared by on-premises servers 2892 between computing devices of the organization, including computing device 2802 (when part of an organization) through a local network of the organization, and/or through further networks accessible to the organization (including the Internet). Furthermore, in examples, on-premises servers 2892 serve applications such as application programs 2896 to the computing devices of the organization, including computing device 2802. Accordingly, in examples, on-premises servers 2892 include storage 2894 (which includes one or more physical storage devices such as storage disks and/or SSDs) for storage of application programs 2896 and application data 2898 and include a processor 2890 (e.g., similar to processor 2810, GPU 2842, and/or NPU 2844 of computing device 2802) for execution of application programs 2896. In some embodiments, multiple processors 2890 are present for execution of application programs 2896 and/or for other purposes. In further examples, computing device 2802 is configured to synchronize copies of application programs 2814 and/or application data 2816 for backup storage at on-premises servers 2892 as application programs 2896 and/or application data 2898.

Embodiments described herein may be implemented in one or more of computing device 2802, network-based server infrastructure 2870, and on-premises servers 2892. For example, in some embodiments, computing device 2802 is used to implement systems, clients, or devices, or components/subcomponents thereof, disclosed elsewhere herein. In other embodiments, a combination of computing device 2802, network-based server infrastructure 2870, and/or on-premises servers 2892 is used to implement the systems, clients, or devices, or components/subcomponents thereof, disclosed elsewhere herein.

As used herein, the terms "computer program medium," "computer-readable medium," "computer-readable storage medium," and "computer-readable storage device," etc., are used to refer to physical hardware media. Examples of such physical hardware media include any hard disk, optical disk, SSD, other physical hardware media such as RAMs, ROMs, flash memory, digital video disks, zip disks, MEMs (microelectronic machine) memory, nanotechnology-based storage devices, and further types of physical/tangible hardware storage media of storage 2820. Such computer-readable media and/or storage media are distinguished from and non-overlapping with communication media, propagating signals, and signals per se. Stated differently, "computer program medium," "computer-readable medium," "computer-readable storage medium," and "computer-readable storage device" do not encompass communication media, propagating signals, and signals per se. Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared, and other wireless media, as well as wired media. Embodiments are also directed to such communication media that are separate and non-overlapping with embodiments directed to computer-readable storage media.

As noted above, computer programs and modules (including application programs 2814) are stored in storage 2820. Such computer programs can also be received via wired interface(s) 2860 and/or wireless modem(s) 2860 over network 2804. Such computer programs, when executed or loaded by an application, enable computing device 2802 to implement features of embodiments discussed herein. Accordingly, such computer programs represent controllers of the computing device 2802.

Embodiments are also directed to computer program products comprising computer code or instructions stored on any computer-readable medium or computer-readable storage medium. Such computer program products include the physical storage of storage 2820 as well as further physical storage types.

VII. Additional Exemplary Embodiments

A system for generating synthetic data is described herein. The system comprises a processor circuit and a memory device. The memory device stores program code to be executed by the processor circuit. The program code comprises a synthetic data generator.

In a further aspect of the foregoing system, the synthetic data generator: obtains a dataset pair comprising a first natural language query and a first query language query; utilizes the dataset pair and first predicted catalog information to generate a first prompt to cause a generative AI model to generate a variation of the dataset pair; responsive to providing the first prompt to the generative AI model, receives a first augmented pair comprising a first augmented natural language query and a first augmented query language query, the first augmented natural language query a variation of the first natural language query and the first augmented query language query a variation of the first query language query; and generates synthetic data comprising the first augmented pair.

In a further aspect of the foregoing system, the synthetic data generator: receives database embeddings and pair embeddings, the database embeddings describing a context of a portion of a database and the pair embeddings describing a context of the dataset pair; and determines the first predicted catalog information based on a similarity between the pair embeddings and a subset of the database embeddings.

In a further aspect of the foregoing system, the synthetic data generator: provides the dataset pair to an embedding model configured to generate embeddings based on input data; and receives the pair embeddings from the embedding model.

In a further aspect of the foregoing system, the synthetic data generator: provides the first prompt to the generative AI model to cause the generative AI model to generate a set of augmented pairs comprising the first augmented pair and a second augmented pair, the second augmented pair comprising a second augmented natural language query and a second augmented query language query, the second augmented natural language query another variation of the first natural language query and the second augmented query language query another variation of the first query language query; filters the second augmented pair from the set of augmented pairs to generate a set of filtered pairs; and generates the synthetic data comprising the set of filtered pairs.

In a further aspect of the foregoing system, the synthetic data generator filters the second augmented pair by: providing the second augmented query language query to a query parser configured to determine if queries are valid; and receiving an indication that the second augmented query language query is invalid.

In a further aspect of the foregoing system, the synthetic data generator filters the second augmented pair by determining a similarity between the second augmented pair and at least one of the first dataset pair, the first augmented pair, or another pre-existing dataset pair satisfies similarity criteria.

In a further aspect of the foregoing system, the second augmented pair corresponds to a portion of a data in a database, and wherein to filter the second augmented pair the synthetic data generator determines a coverage of the portion by dataset pairs corresponding to the portion satisfies coverage criteria.

In a further aspect of the foregoing system, the synthetic data generator: determines a coverage of a portion of data of a database fails to satisfy coverage criteria; and utilizes the generative AI model to generate a second augmented pair based on at least one of the first dataset pair or the first augmented pair.

In a further aspect of the foregoing system, the synthetic data generator: utilizes the first augmented pair and second predicted catalog information to generate a second prompt to cause the generative AI model to generate a variation of the first augmented pair; responsive to providing the second prompt to the generative AI model, receives a second augmented pair comprising a second augmented natural language query and a second augmented query language query, the second augmented natural language query a variation of the first augmented natural language query and the second augmented query language query a variation of the first augmented query language query; and generates the synthetic data comprising the first augmented pair and the second augmented pair.

In a further aspect of the foregoing system, the synthetic data generator: receives an indication of negative feedback for a first query language query generated by a generative AI model based on a first natural language query; generates a corrected pair based on the indication and the first natural language query, the corrected pair comprising the first natural language query and a corrected query language query, the corrected query language query a syntactically valid conversion of the first natural language query; determines the corrected pair satisfies criteria of a synthetic data store; and stores the validated corrected pair as synthetic data in the synthetic data store.

In a further aspect of the foregoing system wherein to prompt the generative AI model to generate the corrected pair, the synthetic data generator: generates a first prompt to cause the generative AI model to generate a candidate pair based on the indication and the first natural language query; determines the candidate pair is syntactically invalid; generates a second prompt to cause the generative AI model to generate the corrected pair based on the indication, the first natural language query, and said determining the candidate pair is syntactically invalid; and determines the corrected pair is syntactically valid.

In a further aspect of the foregoing system, wherein to generate the corrected pair, the synthetic data generator: identifies a second query language query executed against a database; determines the second query language query corresponds to the first natural language query; and generates the corrected pair based on the first natural language query and the second query language query.

In a further aspect of the foregoing system, to determine the corrected pair satisfies criteria of the synthetic data store, the synthetic data generator: generates a prompt to cause the generative AI model to generate a candidate natural language query based on the corrected query language query; and determines a similarity between the first natural language query and the candidate natural language query satisfies a consistency criteria.

In a further aspect of the foregoing system, to determine the corrected pair satisfies criteria of the synthetic data store, the synthetic data generator: determines a similarity between the corrected pair and a dataset pair stored in the synthetic data store fails to satisfy similarity criteria, the dataset pair comprising a synthetic natural language query and a synthetic query language query.

In a further aspect of the foregoing system, wherein the corrected pair corresponds to a portion of a data in a database, and wherein to determine the corrected pair satisfies criteria of the synthetic data store, the synthetic data generator determines a coverage of the portion by dataset pairs corresponding to the portion fails to satisfy coverage criteria.

In a further aspect of the foregoing system, wherein to generate the corrected pair, the synthetic data generator determines the first natural language query is eligible to be converted based on at least one of a permission of a user account or an available table in a database.

In a further aspect of the foregoing system, the synthetic data generator: causes a language conversion engine to utilize the synthetic data to: generate a second prompt based on a second natural language query and the synthetic data, and provide the second prompt to the generative AI model to cause the generative AI model to convert the second natural language query to a second query language query.

In a further aspect of the foregoing system, wherein to cause the language conversion engine to utilize the synthetic data to generate the second prompt, the synthetic data generator: causes the language conversion engine to: utilize the synthetic data to compare a query embedding describing the context of the second natural language query to a pair embedding describing the context of the first augmented pair, and responsive to a similarity between the query embedding and the pair embedding satisfying a similarity criteria, generate the second prompt based on the second natural language query and the first augmented pair.

In a further aspect of the foregoing system, the generative AI model is a large language model.

A first aspect of a method for generating synthetic data is described herein. In this aspect, the method comprises:

obtaining a dataset pair comprising a first natural language query and a first query language query; utilizing the dataset pair and first predicted catalog information to generate a first prompt to cause a generative AI model to generate a variation of the dataset pair; responsive to providing the first prompt to the generative AI model, receiving a first augmented pair comprising a first augmented natural language query and a first augmented query language query, the first augmented natural language query a variation of the first natural language query and the first augmented query language query a variation of the first query language query; and generating synthetic data comprising the first augmented pair.

In a further implementation of the first aspect of a method for generating synthetic data, the method further comprising: receiving database embeddings and pair embeddings, the database embeddings describing a context of a portion of a database and the pair embeddings describing a context of the dataset pair; and determining the first predicted catalog information based on a similarity between the pair embeddings and a subset of the database embeddings.

In a further implementation of the first aspect of a method for generating synthetic data, the method further comprising: providing the dataset pair to an embedding model configured to generate embeddings based on input data; and receiving the pair embeddings from the embedding model.

In a further implementation of the first aspect of a method for generating synthetic data, the method further comprising: providing the first prompt to the generative AI model to cause the generative AI model to generate a set of augmented pairs comprising the first augmented pair and a second augmented pair, the second augmented pair comprising a second augmented natural language query and a second augmented query language query, the second augmented natural language query another variation of the first natural language query and the second augmented query language query another variation of the first query language query; filtering the second augmented pair from the set of augmented pairs to generate a set of filtered pairs; and generating the synthetic data comprising the set of filtered pairs.

In a further implementation of the first aspect of a method for generating synthetic data, wherein said filtering the second augmented pair comprises: providing the second augmented query language query to a query parser configured to determine if queries are valid; and receiving an indication that the second augmented query language query is invalid.

In a further implementation of the first aspect of a method for generating synthetic data, wherein said filtering the second augmented pair comprises: determining a similarity between the second augmented pair and at least one of the first dataset pair, the first augmented pair, or another pre-existing dataset pair satisfies similarity criteria.

In a further implementation of the first aspect of a method for generating synthetic data, wherein the second augmented pair corresponds to a portion of a data in a database, and wherein said filtering the second augmented pair comprises: determining a coverage of the portion by dataset pairs corresponding to the portion satisfies coverage criteria.

In a further implementation of the first aspect of a method for generating synthetic data, the method further comprising: determining a coverage of a portion of data of a database fails to satisfy coverage criteria; and utilizing the generative AI model to generate a second augmented pair based on at least one of the first dataset pair or the first augmented pair.

In a further implementation of the first aspect of a method for generating synthetic data, the method further comprising: utilizing the first augmented pair and second predicted catalog information to generate a second prompt to cause the generative AI model to generate a variation of the first augmented pair; responsive to providing the second prompt to the generative AI model, receiving a second augmented pair comprising a second augmented natural language query and a second augmented query language query, the second augmented natural language query a variation of the first augmented natural language query and the second augmented query language query a variation of the first augmented query language query; and generating the synthetic data comprising the first augmented pair and the second augmented pair.

A second aspect of a method for generating synthetic data is described herein. In this aspect, the method comprises: receiving an indication of negative feedback for a first query language query generated by a generative AI model based on a first natural language query; generating a corrected pair based on the indication and the first natural language query, the corrected pair comprising the first natural language query and a corrected query language query, the corrected query language query a syntactically valid conversion of the first natural language query; determining the corrected pair satisfies criteria of a synthetic data store; and storing the validated corrected pair as synthetic data in the synthetic data store.

In a further implementation of the second aspect of a method for generating synthetic data, wherein said generating the corrected pair comprises: prompting the generative AI model to generate the corrected pair based on the indication and the first natural language query.

In a further implementation of the second aspect of a method for generating synthetic data, wherein said prompting the generative AI model to generate the corrected pair comprises: generating a first prompt to cause the generative AI model to generate a candidate pair based on the indication and the first natural language query; determining the candidate pair is syntactically invalid; generating a second prompt to cause the generative AI model to generate the corrected pair based on the indication, the first natural language query, and said determining the candidate pair is syntactically invalid; and determining the corrected pair is syntactically valid.

In a further implementation of the second aspect of a method for generating synthetic data, wherein said generating the corrected pair comprises: identifying a second query language query executed against a database; determining the second query language query corresponds to the first natural language query; and generating the corrected pair based on the first natural language query and the second query language query.

In a further implementation of the second aspect of a method for generating synthetic data, wherein said determining the corrected pair satisfies criteria of the synthetic data store comprises: generating a prompt to cause the generative AI model to generate a candidate natural language query based on the corrected query language query; and determining a similarity between the first natural language query and the candidate natural language query satisfies a consistency criteria.

In a further implementation of the second aspect of a method for generating synthetic data, wherein said determining the corrected pair satisfies criteria of the synthetic data store comprises: determining a similarity between the corrected pair and a dataset pair stored in the synthetic data store fails to satisfy similarity criteria, the dataset pair comprising a synthetic natural language query and a synthetic query language query.

In a further implementation of the second aspect of a method for generating synthetic data, wherein the corrected pair corresponds to a portion of a data in a database, and wherein said determining the corrected pair satisfies criteria of the synthetic data store comprises: determining a coverage of the portion by dataset pairs corresponding to the portion fails to satisfy coverage criteria.

In a further implementation of the second aspect of a method for generating synthetic data, wherein said generating the corrected pair comprises: determining the first natural language query is eligible to be converted based on at least one of a permission of a user account or an available table in a database.

In either the first or second aspects of methods for generating synthetic data, the method further comprises: causing a language conversion engine to utilize the synthetic data to: generate a second prompt based on a second natural language query and the synthetic data, and provide the second prompt to the generative AI model to cause the generative AI model to convert the second natural language query to a second query language query.

In either the first or second aspects of methods for generating synthetic data, said causing the language conversion engine to utilize the synthetic data to generate the second prompt comprises: causing the language conversion engine to: utilize the synthetic data to compare a query embedding describing the context of the second natural language query to a pair embedding describing the context of the first augmented pair, and responsive to a similarity between the query embedding and the pair embedding satisfying a similarity criteria, generate the second prompt based on the second natural language query and the first augmented pair.

In either the first or second aspects of methods for generating synthetic data, the generative AI model is a large language model.

A computer-readable storage medium encoded with program instructions that, when executed by a processor circuit, perform any of the foregoing methods described herein.

In a further embodiment of any of the foregoing systems, methods, and/or computer readable storage medium, a generative AI model other than an LLM is utilized.

VIII. Conclusion

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives modifying a condition or relationship characteristic of a feature or features of an implementation of the disclosure, should be understood to mean that the condition or characteristic is defined to within tolerances that are acceptable for operation of the implementation for an application for which it is intended. Furthermore, if the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors. Still further, where "based on" is used to indicate an effect being a result of an indicated cause, it is to be understood that the effect is not required to only result from the indicated cause, but that any number of possible additional causes may also contribute to the effect. Thus, as used herein, the term "based on" should be understood to be equivalent to the term "based at least on."

Numerous example embodiments have been described above. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

Furthermore, example embodiments have been described above with respect to one or more running examples. Such running examples describe one or more particular implementations of the example embodiments; however, embodiments described herein are not limited to these particular implementations.

Further still, example embodiments have been described with respect to LLMs; however, it is also contemplated herein that embodiments may utilize other types of generative AI models (e.g., a generative adversarial network (GAN)). Furthermore, an implementation of the described systems and/or methods may leverage a multimodal model that inputs and/or outputs more than one modality. For example, an alternative embodiment utilizes a multimodal generative AI model that generates text and images from a prompt.

Moreover, according to the described embodiments and techniques, any components of systems, computing devices, servers, applications, embedding models, synthetic data generators, generative AI models, database engines, language conversion engines, storages, and/or their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described example embodiments, but should be defined only in accordance with the following claims and their equivalents.

What is claimed is:

1. A system for generating synthetic data for use in performance benchmarking, comprising:
  a processor circuit; and
  a memory device that stores program code to be executed by the processor circuit, the program code comprising:
    a synthetic data generator that:
      obtains a dataset pair comprising a first natural language query and a first query language query;
      utilizes the dataset pair and first predicted catalog information to generate a first prompt to cause a large language model (LLM) to generate a variation of the dataset pair;
      responsive to providing the first prompt to the LLM, receives a first augmented pair comprising a first augmented natural language query and a first augmented query language query, the first augmented natural language query a variation of the first natural language query and the first augmented query language query a variation of the first query language query;
      generates synthetic data comprising the first augmented pair; and
      causes a language conversion engine to utilize the synthetic data to:
        generate a second prompt based on a second natural language query and the synthetic data, and
        provide the second prompt to the LLM to cause the LLM to convert the second natural language query to a second query language query.

2. The system of claim 1, wherein to cause the language conversion engine to utilize the synthetic data to generate the second prompt, the synthetic data generator further:
  causes the language conversion engine to:
    utilize the synthetic data to compare a query embedding describing the context of the second natural language query to a pair embedding describing the context of the first augmented pair, and
    responsive to a similarity between the query embedding and the pair embedding satisfying a similarity criteria, generate the second prompt based on the second natural language query and the first augmented pair.

3. The system of claim 1, wherein the second prompt is generated based on the first augmented pair and the program code further comprises a pair correction component that:
  receives an indication of negative feedback for the second query language query;
  generates a corrected pair based on the indication and the second natural language query, the corrected pair comprising the second natural language query and a corrected query language query, the corrected query language query a syntactically valid conversion of the second natural language query; and
  updates the synthetic data to comprise the corrected pair.

4. The system of claim 3, wherein to generate the corrected pair, the pair correction component:
  prompts the LLM to generate the corrected pair based on the indication and the second natural language query.

5. The system of claim 4, wherein to prompt the LLM to generate the corrected pair, the pair correction component:
  generates a second prompt to cause the LLM to generate a candidate pair based on the indication and the second natural language query;
  determines the candidate pair is syntactically invalid;
  generates a second prompt to cause the LLM to generate the corrected pair based on the indication, the second natural language query, and the determination that the candidate pair is syntactically invalid; and
  determines the corrected pair is syntactically valid.

6. The pair correction system of claim 3, wherein to generate the corrected pair, the pair correction component:
  identifies a third query language query executed against a database;
  determines the third query language query corresponds to the second natural language query; and
  generates the corrected pair based on the second natural language query and the third query language query.

7. The system of claim 1, wherein the synthetic data generator further:
  receives database embeddings and pair embeddings, the database embeddings describing a context of a portion of a database and the pair embeddings describing a context of the dataset pair; and
  determines the first predicted catalog information based on a similarity between the pair embeddings and a subset of the database embeddings.

8. The system of claim 7, wherein the synthetic data generator further:
  provides the dataset pair to an embedding model configured to generate embeddings based on input data; and
  receives the pair embeddings from the embedding model.

9. The system of claim 1, wherein the synthetic data generator further:
  provides the first prompt to the LLM to cause the LLM to generate a set of augmented pairs comprising the first augmented pair and a second augmented pair, the second augmented pair comprising a second augmented natural language query and a second augmented query language query, the second augmented natural language query another variation of the first natural language query and the second augmented query language query another variation of the first query language query;
  filters the second augmented pair from the set of augmented pairs to generate a set of filtered pairs; and
  generates the synthetic data comprising the set of filtered pairs.

10. The system of claim 1, wherein the synthetic data generator further:
  determines a coverage of a portion of data of a database fails to satisfy coverage criteria; and
  utilizes the LLM to generate a second augmented pair based on at least one of the first dataset pair or the first augmented pair.

11. The system of claim 1, wherein the synthetic data generator further:
  utilizes the first augmented pair and second predicted catalog information to generate a second prompt to cause the LLM to generate a variation of the first augmented pair;
  responsive to providing the second prompt to the LLM, receives a second augmented pair comprising a second augmented natural language query and a second augmented query language query, the second augmented natural language query a variation of the first augmented natural language query and the second augmented query language query a variation of the first augmented query language query; and generates the synthetic data comprising the first augmented pair and the second augmented pair.

12. A method for generating synthetic data for use in performance benchmarking, comprising:
   obtaining a dataset pair comprising a first natural language query and a first query language query;
   utilizing the dataset pair and first predicted catalog information to generate a first prompt to cause a generative artificial intelligence (AI) model to generate a variation of the dataset pair;
   responsive to providing the first prompt to the generative AI model, receiving a first augmented pair comprising a first augmented natural language query and a first augmented query language query, the first augmented natural language query a variation of the first natural language query and the first augmented query language query a variation of the first query language query;
   generating synthetic data comprising the first augmented pair; and
   causing a language conversion engine to utilize the synthetic data to:
      generate a second prompt based on a second natural language query and the synthetic data, and
      provide the second prompt to the generative AI model to cause the generative AI model to convert the second natural language query to a second query language query.

13. The method of claim 12, wherein the second prompt is generated based on the first augmented pair and the method further comprises:
   receiving an indication of negative feedback for the second query language query;
   generating a corrected pair based on the indication and the second natural language query, the corrected pair comprising the second natural language query and a corrected query language query, the corrected query language query a syntactically valid conversion of the second natural language query; and
   updating the synthetic data to comprise the corrected pair.

14. The method of claim 13, wherein to generate the corrected pair, the pair correction component:
   prompts the generative AI model to generate the corrected pair based on the indication and the second natural language query.

15. The method of claim 14, wherein to prompt the LLM to generate the corrected pair, the pair correction component:
   generates a second prompt to cause the LLM to generate a candidate pair based on the indication and the second natural language query;
   determines the candidate pair is syntactically invalid;
   generates a second prompt to cause the LLM to generate the corrected pair based on the indication, the second natural language query, and the determination that the candidate pair is syntactically invalid; and
   determines the corrected pair is syntactically valid.

16. The method of claim 12, further comprising:
   providing the first prompt to the generative AI model to cause the generative AI model to generate a set of augmented pairs comprising the first augmented pair and a second augmented pair, the second augmented pair comprising a second augmented natural language query and a second augmented query language query, the second augmented natural language query another variation of the first natural language query and the second augmented query language query another variation of the first query language query;
   filtering the second augmented pair from the set of augmented pairs to generate a set of filtered pairs by:
      providing the second augmented query language query to a query parser configured to determine if queries are valid, and receiving an indication that the second augmented query language query is invalid;
      determining a similarity between the second augmented pair and at least one of the first dataset pair, the first augmented pair, or another pre-existing dataset pair satisfies similarity criteria; or
      determining a coverage of a portion of a data in a database by dataset pairs corresponding to the portion satisfies coverage criteria, the portion corresponding to the second augmented pair; and
   generating the synthetic data comprising the set of filtered pairs.

17. The method of claim 12, wherein said causing the language conversion engine to utilize the synthetic data to generate the second prompt comprises:
   causing the language conversion engine to:
      utilize the synthetic data to compare a query embedding describing the context of the second natural language query to a pair embedding describing the context of the first augmented pair, and
      responsive to a similarity between the query embedding and the pair embedding satisfying a similarity criteria, generate the second prompt based on the second natural language query and the first augmented pair.

18. A computer-readable storage device encoded with program instructions that, when executed by a processor circuit, perform a method comprising:
   obtaining a dataset pair comprising a first natural language query and a first query language query;
   utilizing the dataset pair and predicted catalog information to generate a first prompt to cause a large language model (LLM) to generate a variation of the dataset pair;
   responsive to providing the first prompt to the LLM, receiving an augmented pair comprising an augmented natural language query and an augmented query language query, the augmented natural language query a variation of the first natural language query and the augmented query language query a variation of the first query language query; and
   causing a language conversion engine to utilize the augmented pair to:
      generate a second prompt based on a second natural language query and the augmented pair, and
      provide the second prompt to the LLM to cause the LLM to convert the second natural language query to a second query language query.

19. The computer-readable storage device of claim 18, wherein the method further comprises:
   receiving database embeddings and pair embeddings, the database embeddings describing a context of a portion of a database and the pair embeddings describing a context of the dataset pair; and
   determining the predicted catalog information based on a similarity between the pair embeddings and a subset of the database embeddings.

20. The computer-readable storage device of claim 19, wherein the second prompt is generated based on the first augmented pair and the method further comprises:
   receiving an indication of negative feedback for the second query language query;

generating a corrected pair based on the indication and the second natural language query, the corrected pair comprising the second natural language query and a corrected query language query, the corrected query language query a syntactically valid conversion of the second natural language query; and updating synthetic data to comprise the corrected pair.

* * * * *